Dec. 26, 1944. F. W. HIGGINS 2,365,701
WINDING MACHINE
Filed Feb. 7, 1942 22 Sheets-Sheet 5
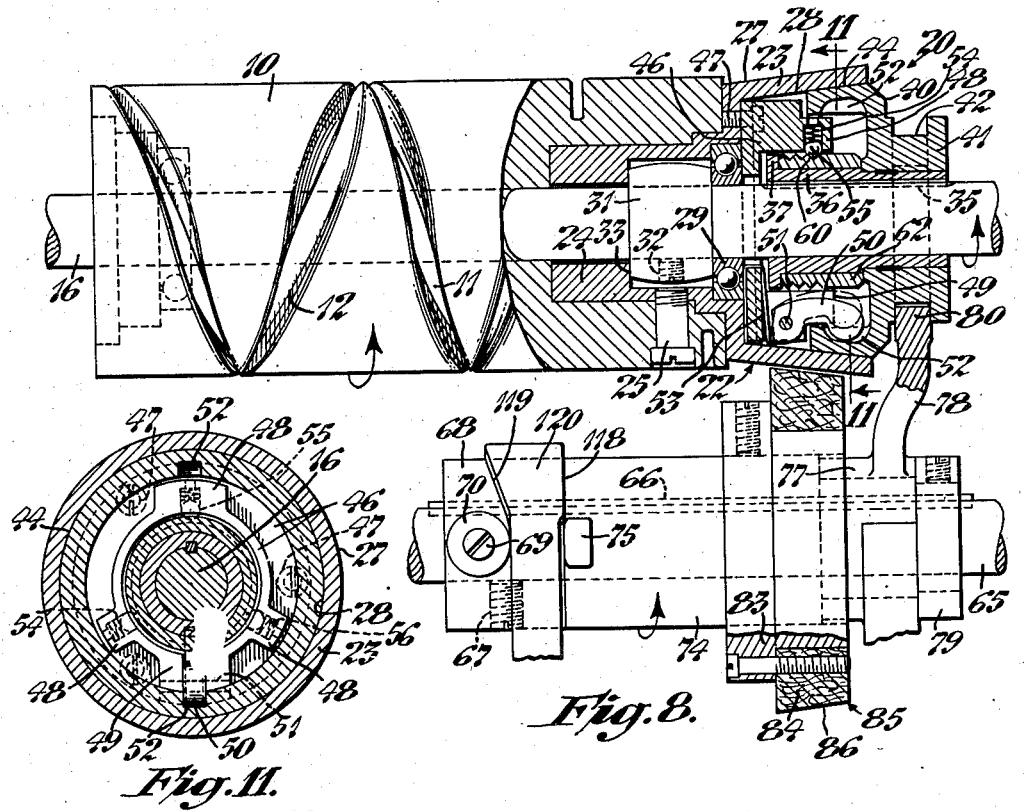
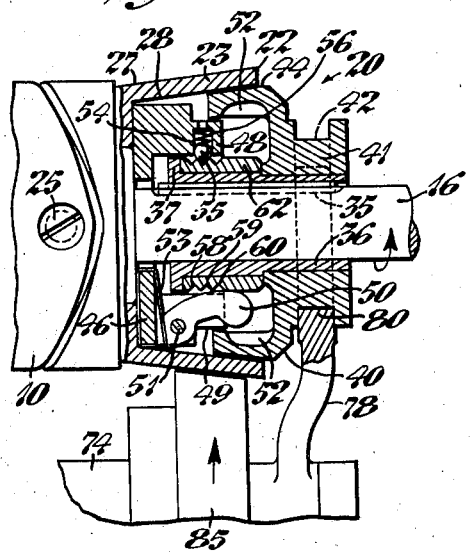
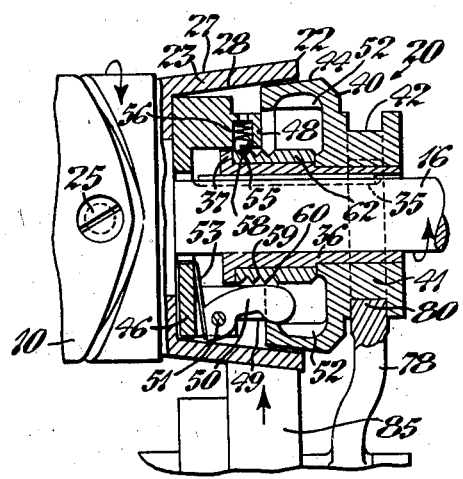
Inventor:
Frank W. Higgins
By
Watson, Cole, Grindle & Watson
Attorneys.

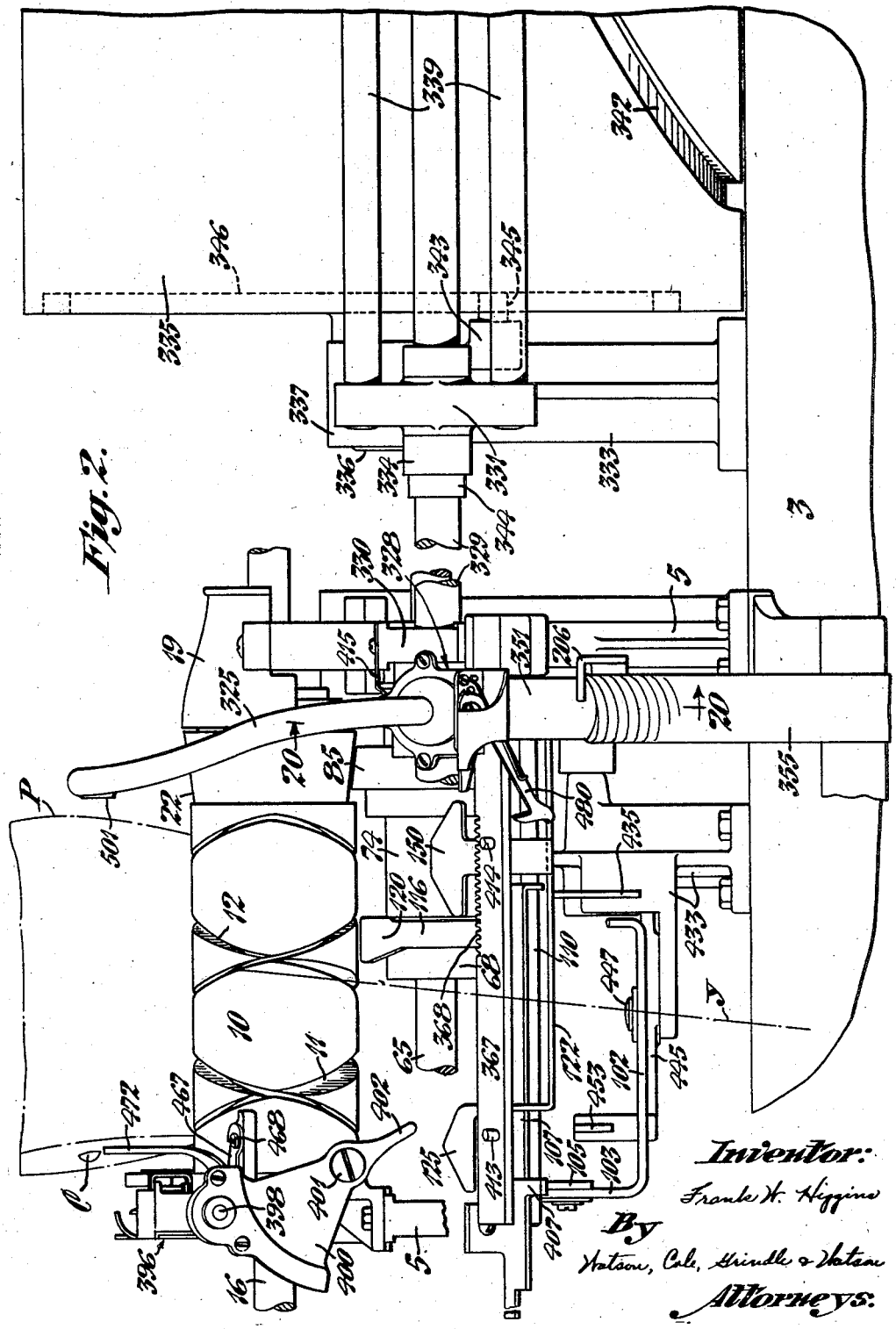

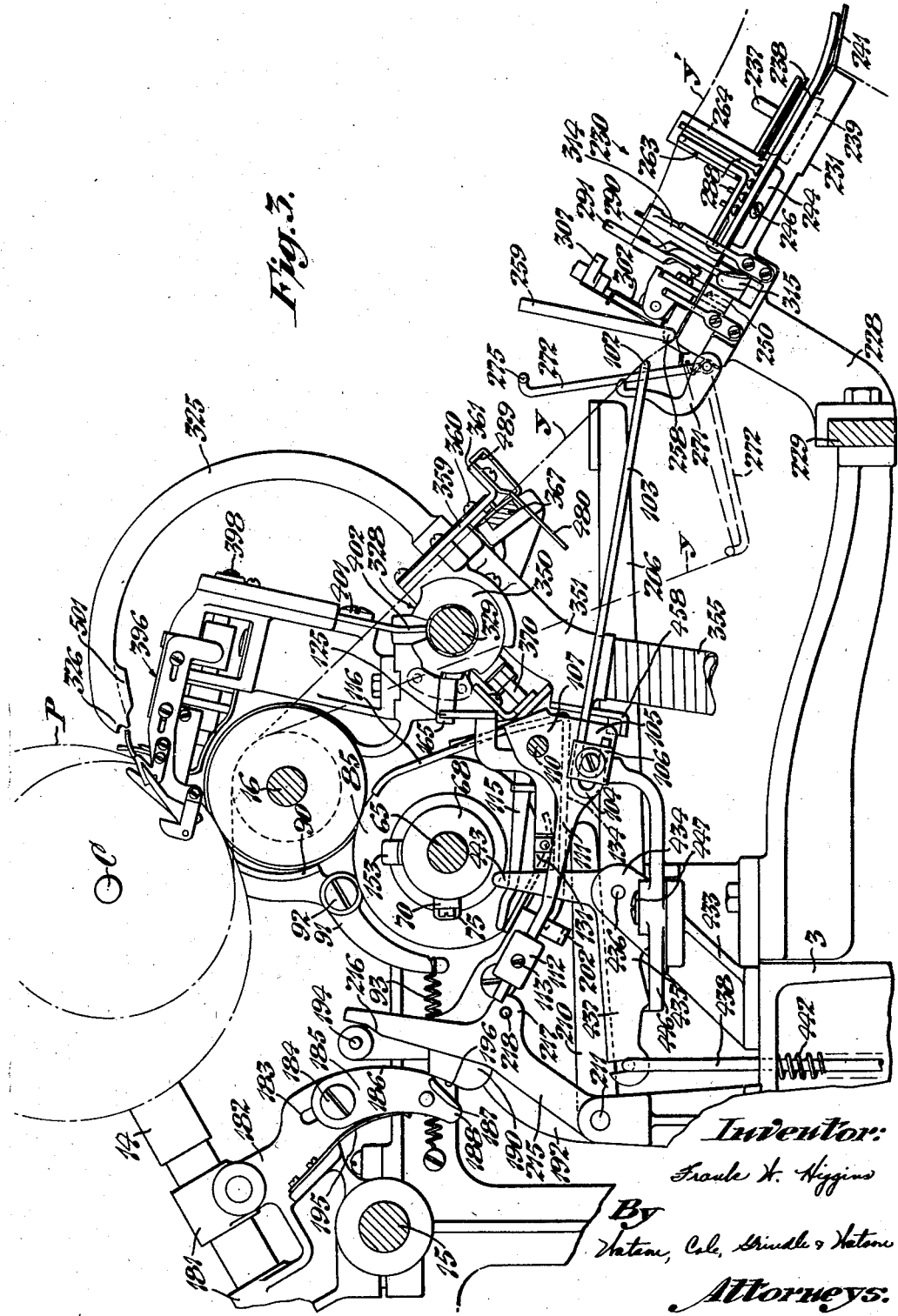

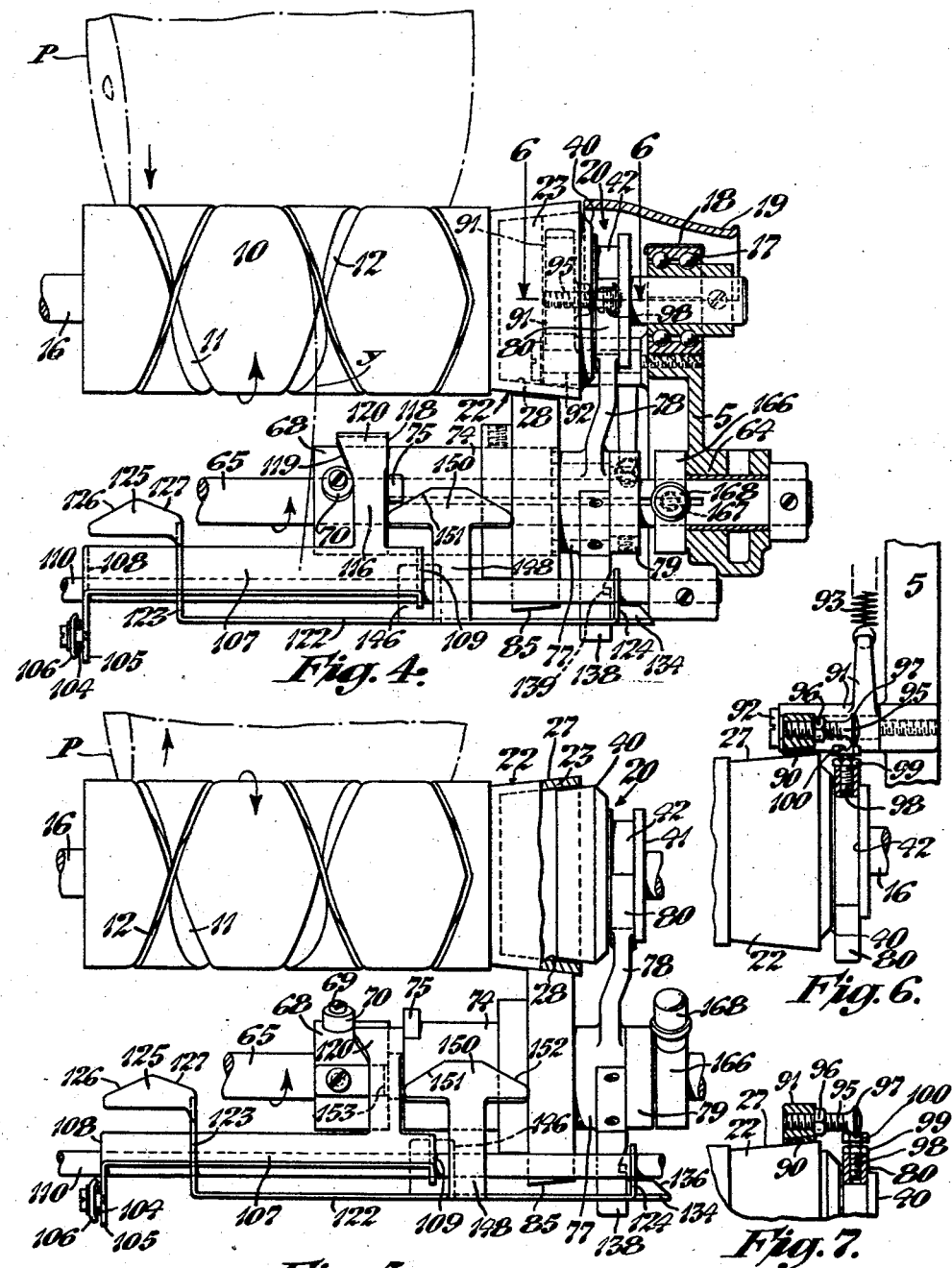

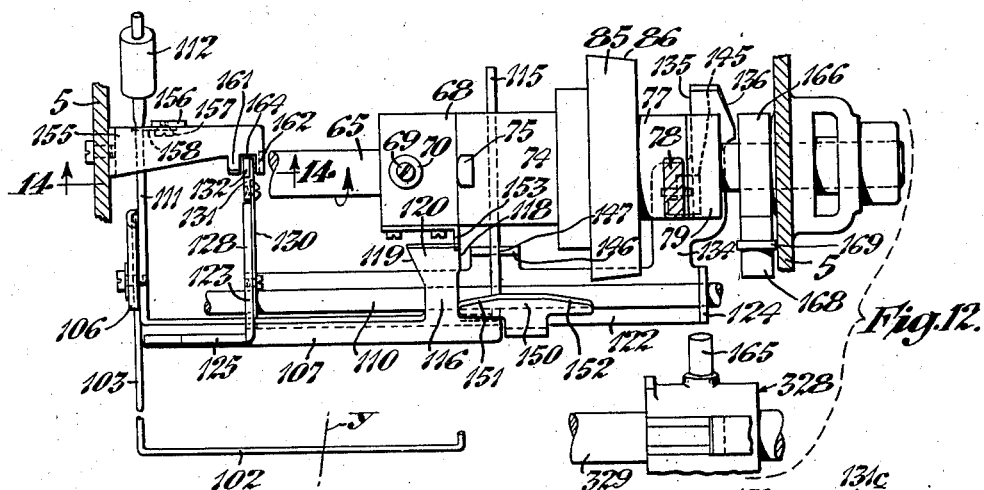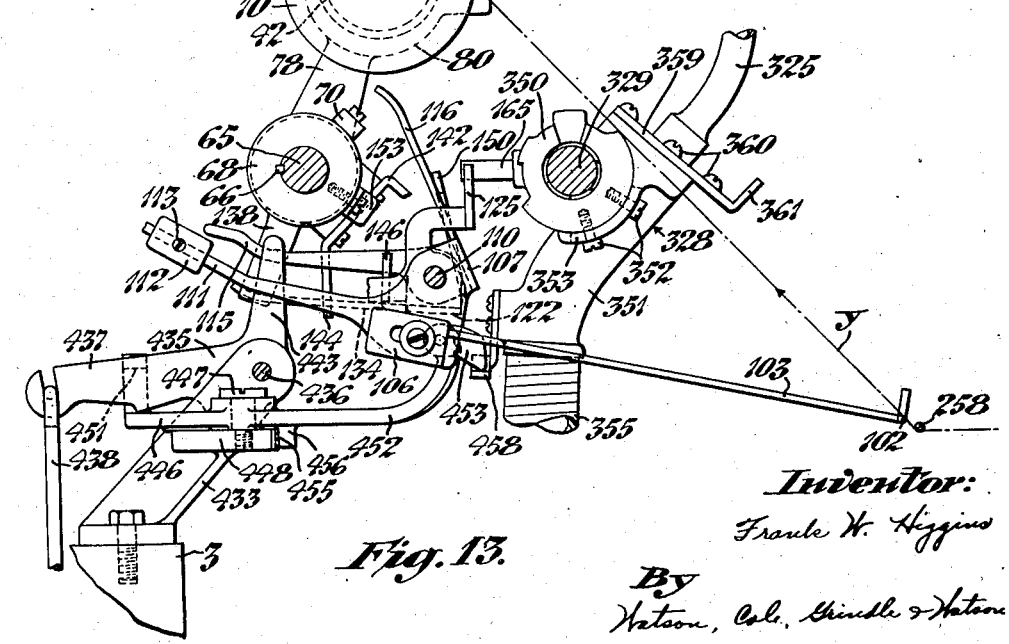

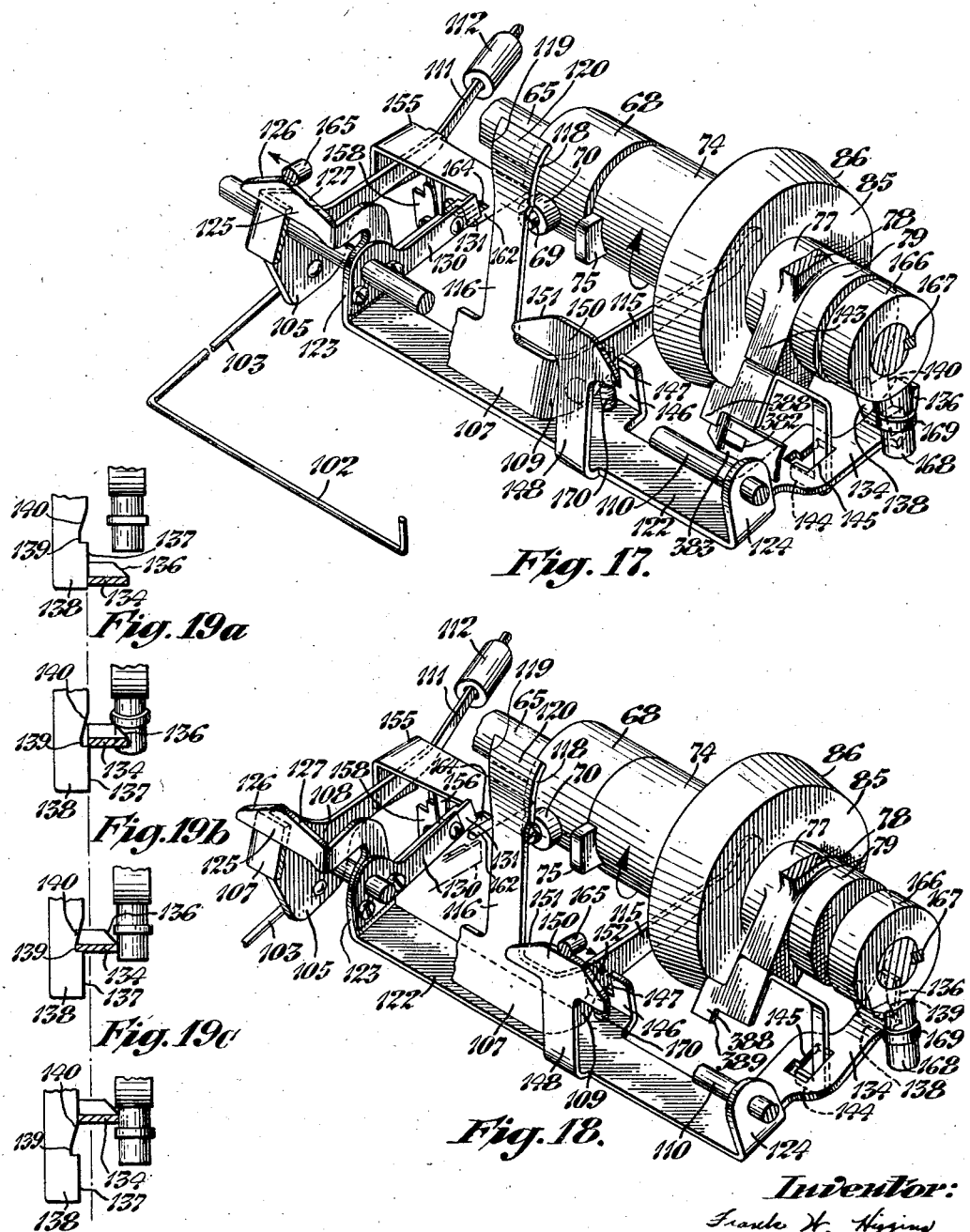

Dec. 26, 1944.   F. W. HIGGINS   2,365,701
WINDING MACHINE
Filed Feb. 7, 1942   22 Sheets-Sheet 9
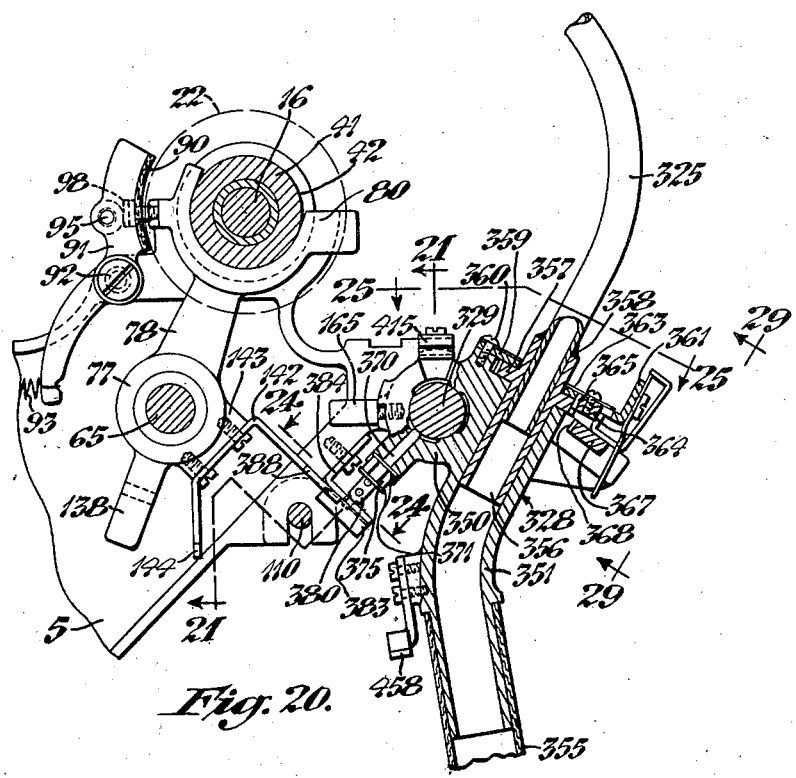
Fig. 20.
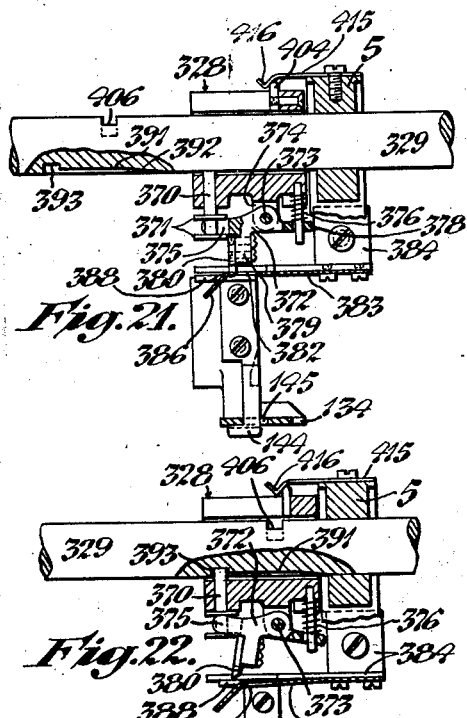
Fig. 21.
Fig. 22.
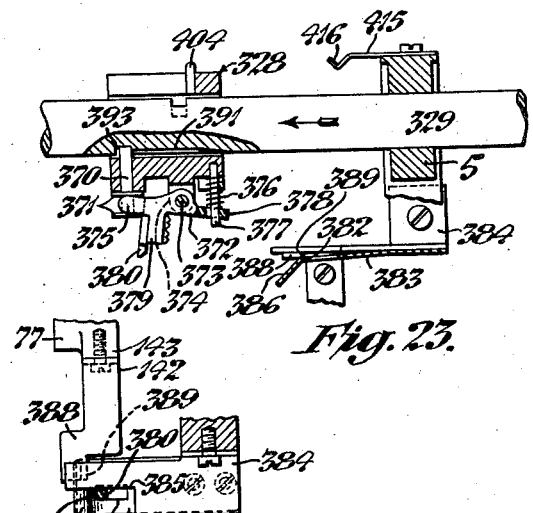
Fig. 23.
Fig. 24.
Inventor:
Frank W. Higgins
By Watson, Cole, Grindle & Watson
Attorneys.

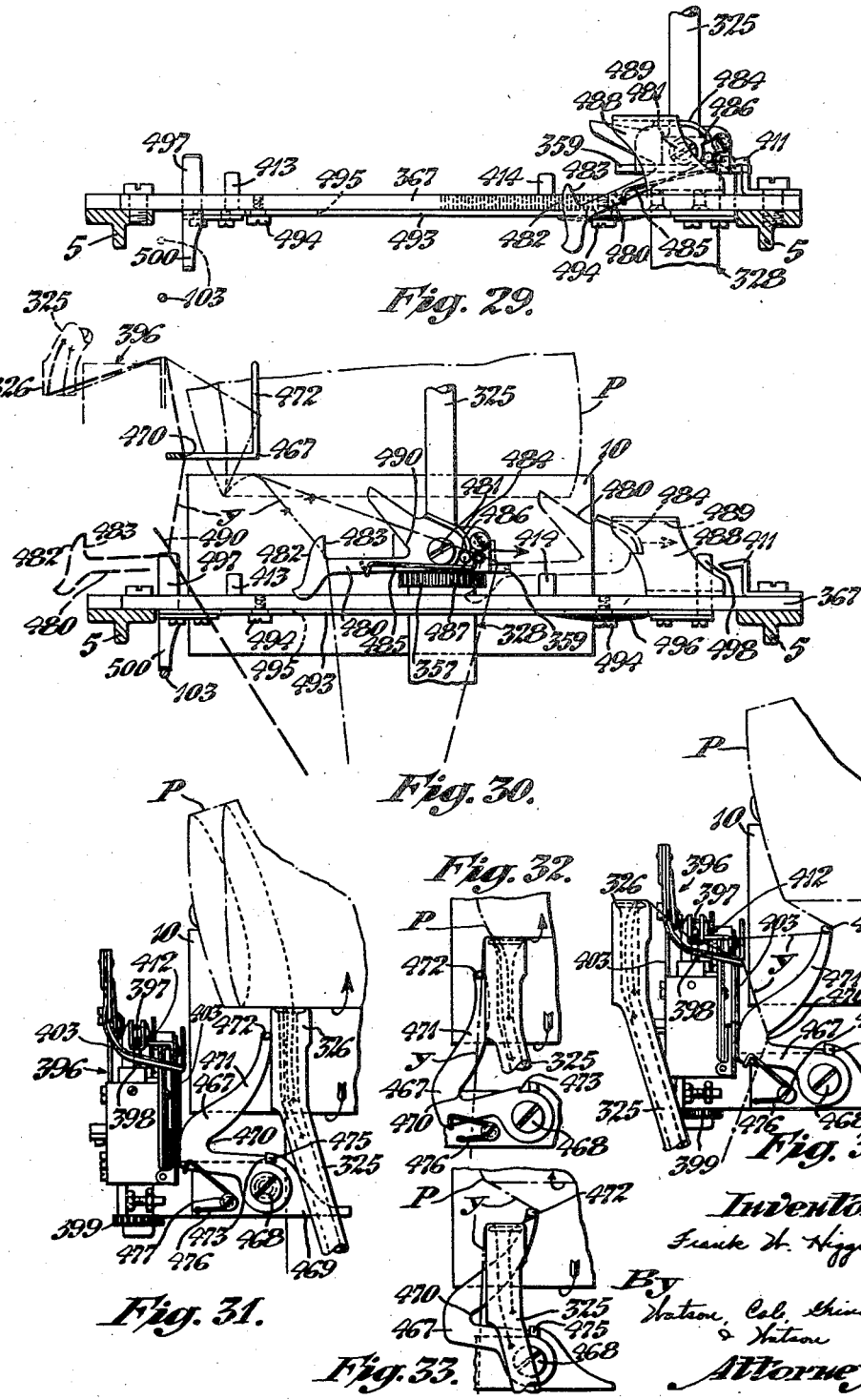

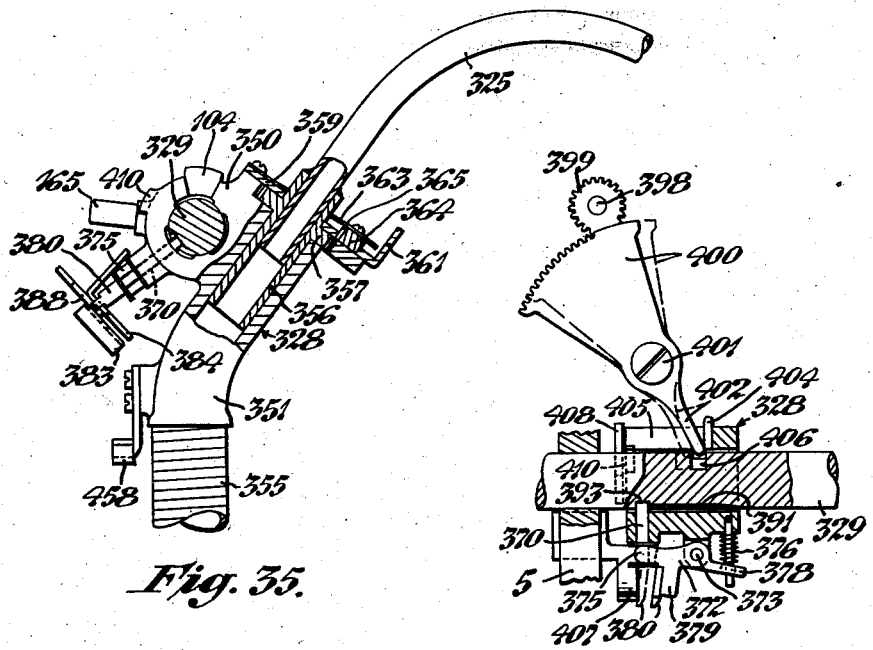
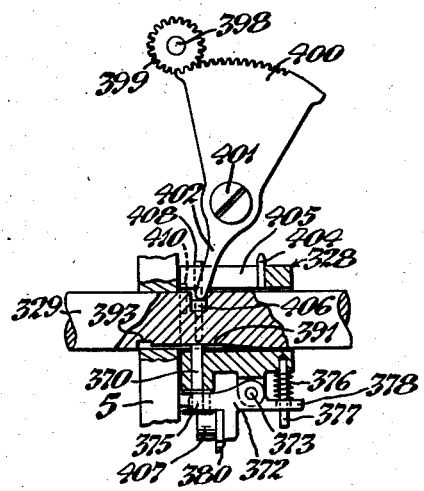

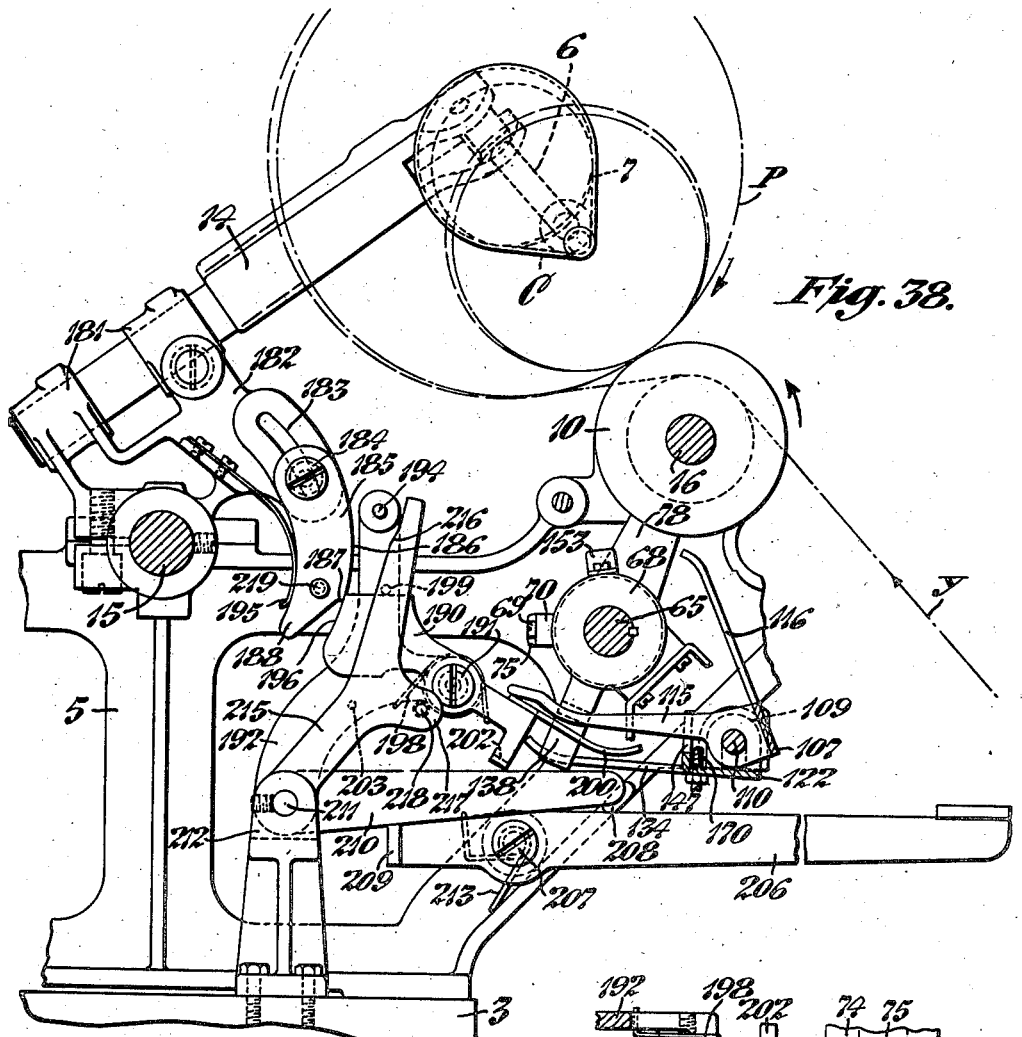

Dec. 26, 1944. F. W. HIGGINS 2,365,701
WINDING MACHINE
Filed Feb. 7, 1942 22 Sheets-Sheet 14

Inventor:
Frank W. Higgins
By
Watson, Cole, Grindle & Watson
Attorneys.

Dec. 26, 1944.  F. W. HIGGINS  2,365,701
WINDING MACHINE
Filed Feb. 7, 1942  22 Sheets-Sheet 15
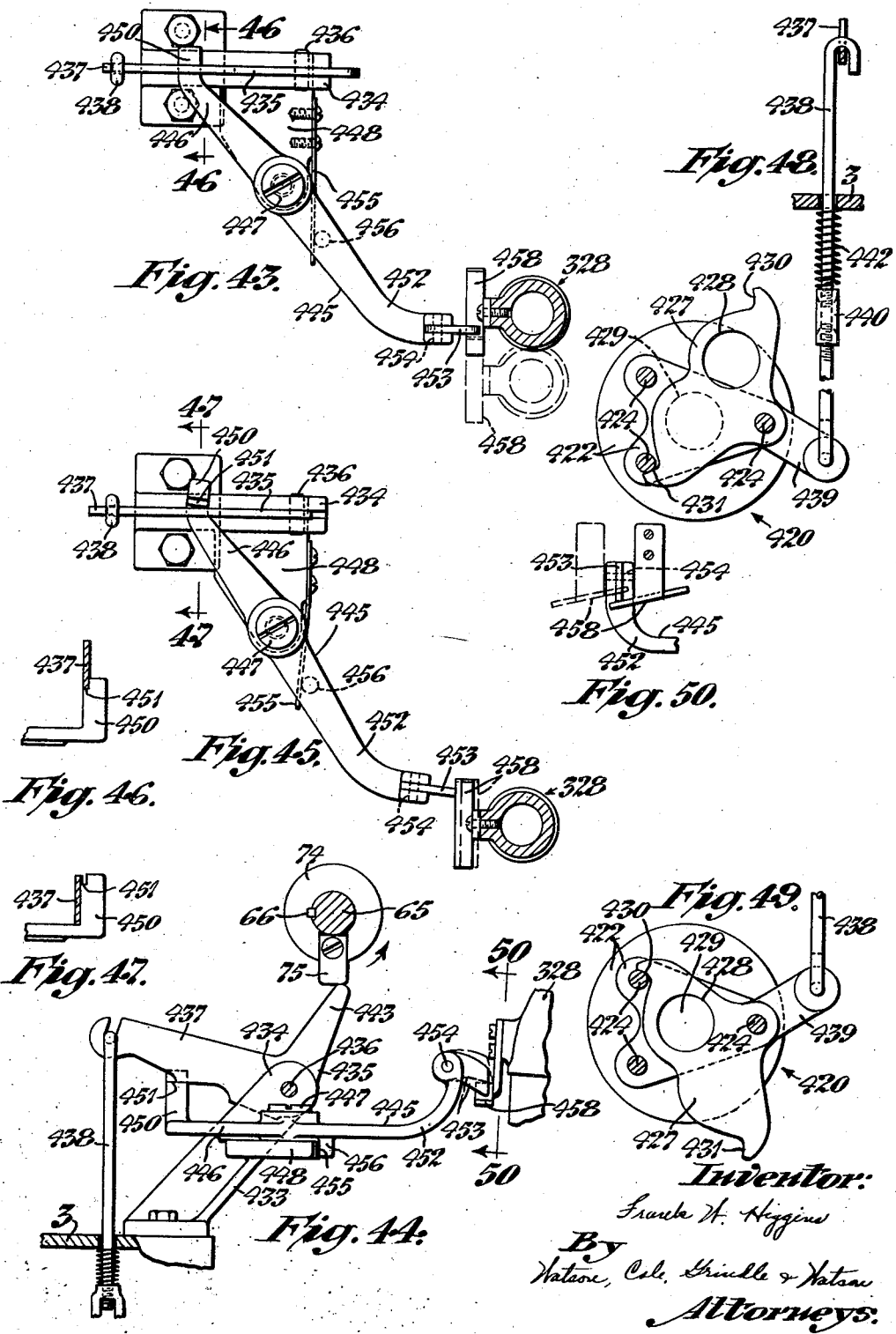

Dec. 26, 1944.　　　F. W. HIGGINS　　　2,365,701
WINDING MACHINE
Filed Feb. 7, 1942　　　22 Sheets-Sheet 16

Dec. 26, 1944.　　　F. W. HIGGINS　　　2,365,701
WINDING MACHINE
Filed Feb. 7, 1942　　　22 Sheets-Sheet 17

Inventor:
Frank W. Higgins
By
Watson, Cole, Grindle & Watson
Attorneys.

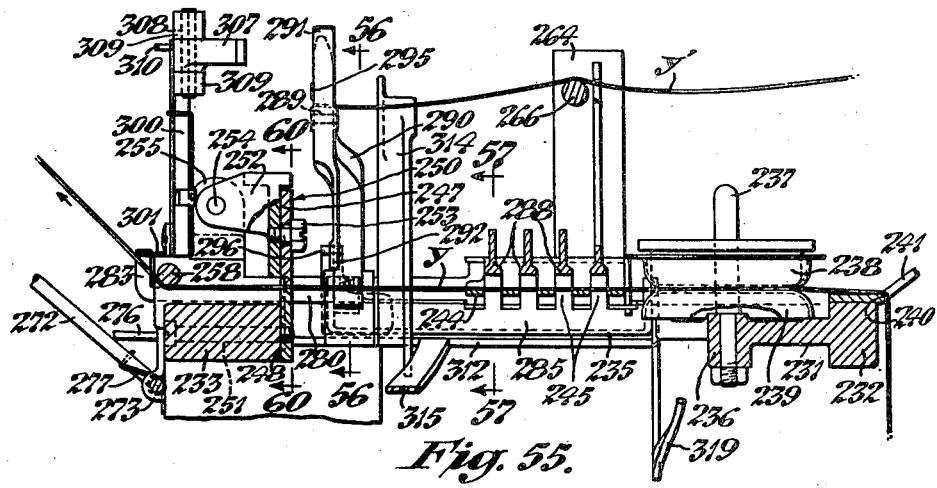
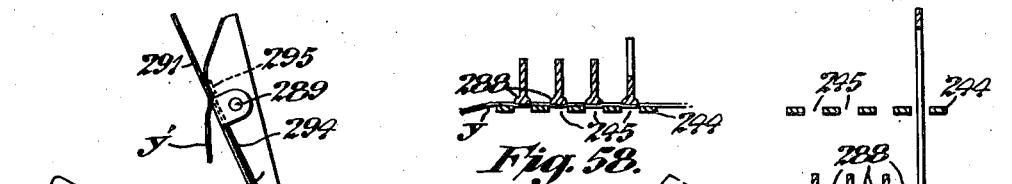
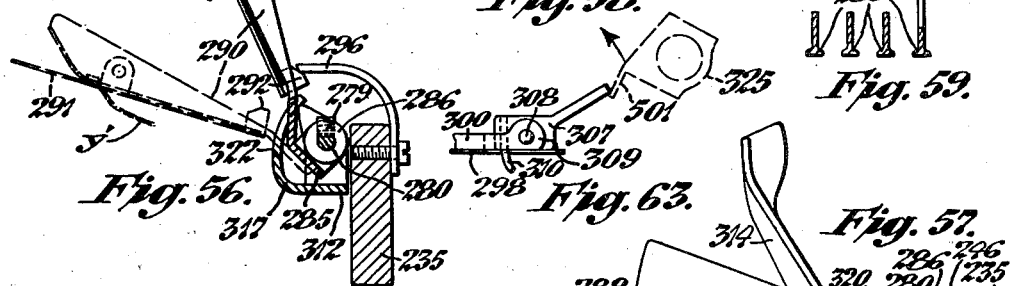
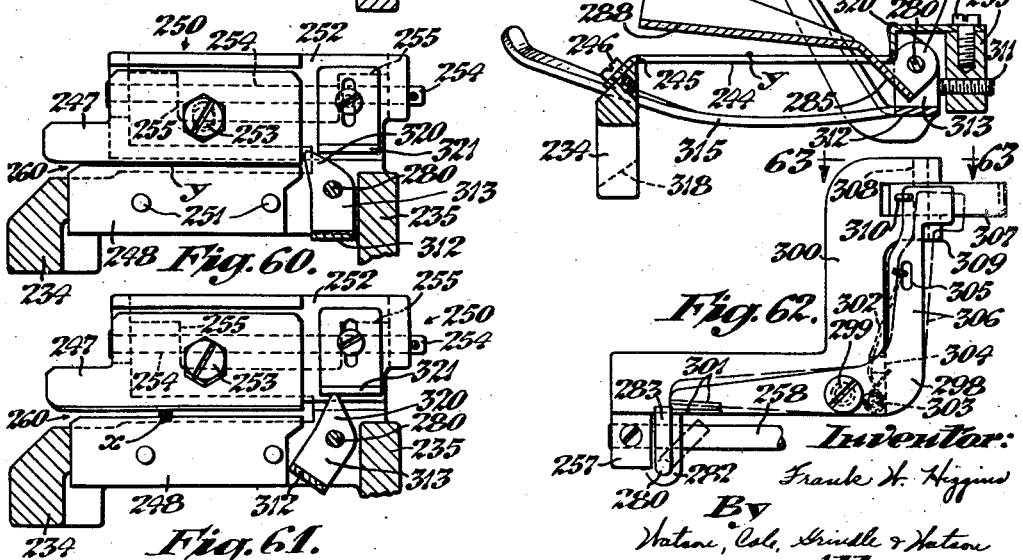

Dec. 26, 1944.  F. W. HIGGINS  2,365,701
WINDING MACHINE
Filed Feb. 7, 1942    22 Sheets-Sheet 19

Inventor:
Frank W. Higgins
By
Watson, Cole, Grindle & Watson
Attorneys.

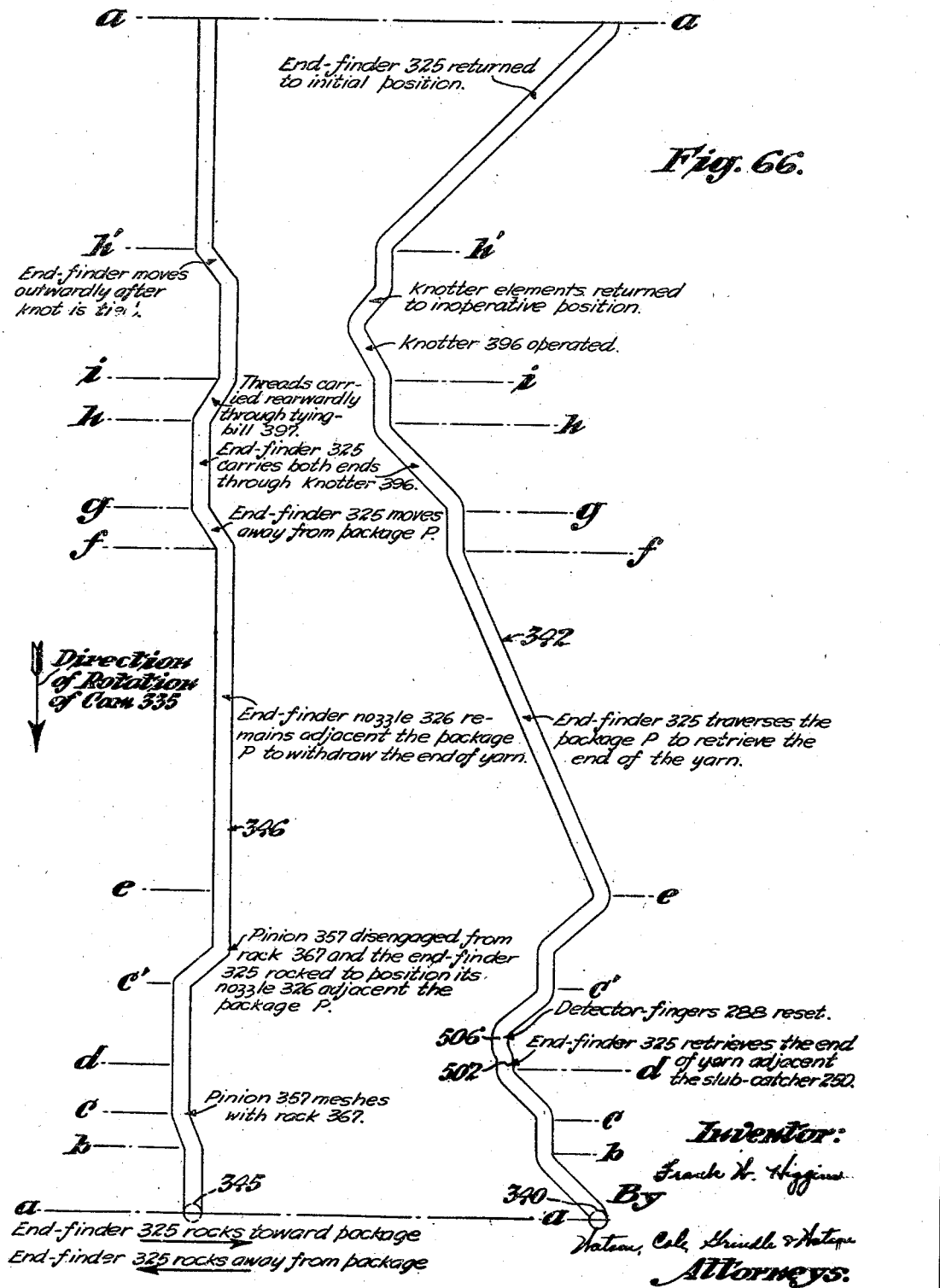

Dec. 26, 1944.　　　F. W. HIGGINS　　　2,365,701
WINDING MACHINE
Filed Feb. 7, 1942　　　22 Sheets-Sheet 21

Inventor:
Frank W. Higgins
By
Watson, Cole, Grindle & Watson
Attorneys.

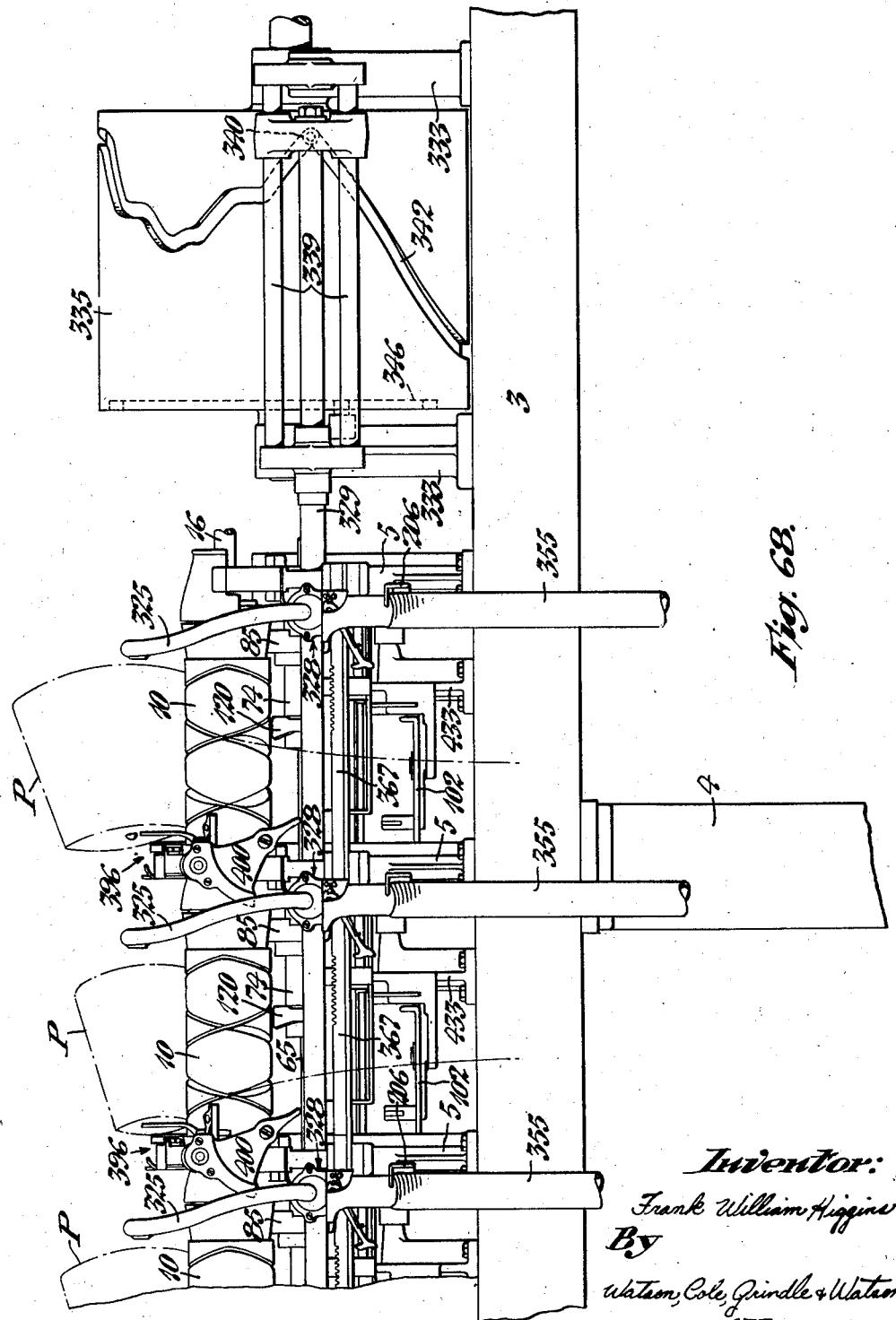

Patented Dec. 26, 1944

2,365,701

UNITED STATES PATENT OFFICE 2,365,701

WINDING MACHINE

Frank William Higgins, Cranston, R. I., assignor to Universal Winding Company, Cranston, R. I., a corporation of Massachusetts Application February 7, 1942, Serial No. 429,928

70 Claims. (Cl. 242—35.6)

This invention relates to winding machines for winding cops, cones and other forms of textile packages, and particularly to machines of the so-called "drum-driven" type in which the package is driven by peripheral contact with a rotating drive-roll or drum.

In the present specification and claims the term "package" is employed for convenience of description to apply to any usual form of wound mass of yarn and the term "yarn" is used to designate all types of strand materials.

A particular object of the invention is to provide a machine of the type indicated which is fully automatic in operation, requiring no attention on the part of the operator during its normal operation except to replenish the supplies of yarn and remove the fully-wound packages.

Another object of the invention is to provide a machine of the type indicated having means incorporated therein for detecting breakage of the winding yarn strand and means actuated thereby for retrieving the broken end of the supply-strand and uniting it to the end of the strand on the winding package.

Another object of the invention is to provide a machine of the type indicated employing a plurality of supply-bobbins, the strand from one bobbin being wound on the package while the strand from another bobbin serves as a reserve adapted to be automatically united to the end of the strand on the winding package when the first supply is exhausted.

Another object of the invention is to provide a machine of the type indicated having stationary winding units and an end-finding device for each unit, each end-finder being travelable relatively of the unit to retrieve the ends of the supply and winding strands and present them to a knot-tying mechanism located adjacent each unit.

Another object of the invention is to provide a machine of the type indicated in which the winding package remains in peripheral engagement with the drive-roll or drum during the normal winding operation and during the uniting of the ends of the strands.

Another object of the invention is to provide a machine of the type indicated in which the package-driving roll or drum is rotated in one direction during the normal winding operation to cause the strand to be wound on the package and in the opposite or unwinding direction during the end-finding operation to enable the traveling end-finder to find and withdraw the end of the strand from the package.

Another object of the invention is to provide a machine of the type indicated in which the drive-roll is normally connected to be driven from a constantly rotating shaft at a high rate of speed whereby to drive the package in a direction to wind yarn on the package and adapted, upon breakage of the yarn or exhaustion of its supply, to be driven in the opposite direction at less speed from a second shaft to cause the package to be rotated slowly in unwinding direction.

Another object of the invention is to provide a machine of the type indicated having end-finding means in the form of a suction-nozzle which is operated by a shaft having a combined reciprocating and oscillating motion with means initiated upon breakage of the winding strand or exhaustion of its supply to couple the end-finding means to the shaft.

Another object of the invention is to provide a machine of the type indicated having a suction-nozzle adapted to move into position between the slub-catcher and tension-device of the machine to retrieve the broken supply-strand and means operated by the nozzle for opening both the yarn-tensioning means and slub-catcher to release the end of the yarn so that it may be drawn into the nozzle.

Another object of the invention is to provide a machine of the type indicated in which the end-finding nozzle is resiliently urged against the periphery of the package and traversed thereacross whereby to adapt it to draw off the loose end of the yarn from the package whatever its size.

Another object of the invention is to provide a machine of the type indicated in which the yarn is maintained under control at all times so that it cannot be caught in the operating elements of the machine or become displaced across the end of the package to impede its free delivery therefrom during subsequent transfer operations.

Further objects of the invention are set forth in the following specification which describes a preferred form of construction of the machine, by way of example, as illustrated by the accompanying drawings. In the drawings:

Fig. 2 is a front elevation of the winding unit shown with the parts in the same relative position as that illustrated in Fig. 1;

Fig. 3 is a part-sectional side elevation of the winding unit as viewed from the left in Fig. 2;

Fig. 4 is a part-sectional front elevation of the grooved traverse-roll and clutch-mechanism for connecting the roll to be driven from the high-speed shaft in direction to wind yarn on the package;

Fig. 5 is a view similar to Fig. 4 showing the clutch shifted to disconnect the traverse-roll from the high-speed shaft and illustrating the means for connecting the roll to the slow-speed shaft for driving it in unwinding direction at a relatively slow rate of speed;

Fig. 6 is a plan view of the braking means for the traverse-roll, part sectional on line 6—6 of Fig. 4, showing the brake withheld from action during the winding operation;

Fig. 7 is a similar view showing the brake applied to the traverse-roll to arrest its rotation prior to driving it in the reverse or unwinding direction;

Fig. 8 is an enlarged part-sectional longitudinal view of the grooved traverse-roll showing it connected by the clutch to the high-speed shaft to adapt it to be driven in direction to wind yarn on the package;

Fig. 9 is a similar view showing the clutch shifted to disconnect the traverse-roll from rotation by the high-speed shaft;

Fig. 10 is a similar view showing the driving element on the slow-speed shaft shifted to engage a part of the traverse-roll to rotate the latter in reverse direction;

Fig. 11 is a transverse sectional view of the clutch mechanism taken on line 11—11 of Fig. 8;

Fig. 12 is a plan view of the means for controlling the drive of the traverse-roll, showing the position assumed by the parts during the winding operation;

Figure 13 is an end elevation of the parts illustrated in Fig. 12 showing the pivoted bail or drop-wire for detecting breakage or exhaustion of the winding strand and initiating the action of the end-finding and uniting means;

Fig. 14 is a transverse sectional view on line 14—14 of Fig. 12 showing certain parts of the control means;

Fig. 17 is a similar perspective view showing the control means as operative to maintain the traverse-roll and package stationary during the uniting of the two ends of the strand;

Fig. 18 is a similar view showing the control means as operative to return the driving elements to normal position to again effect rotation of the traverse-roll and package in winding direction after the knot is tied;

Figure 25:
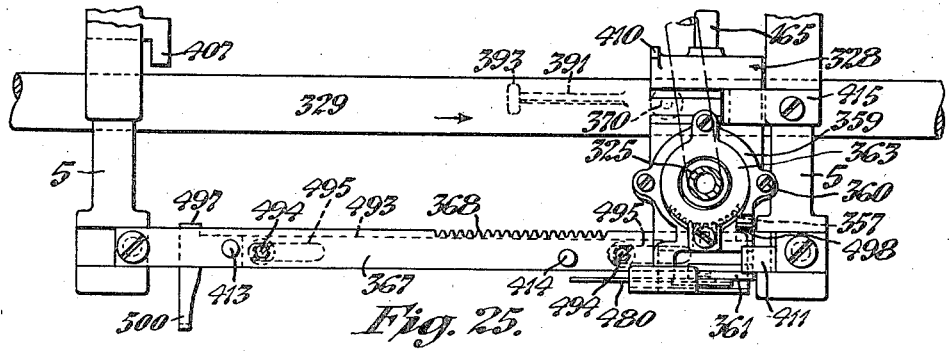
Figure 26:
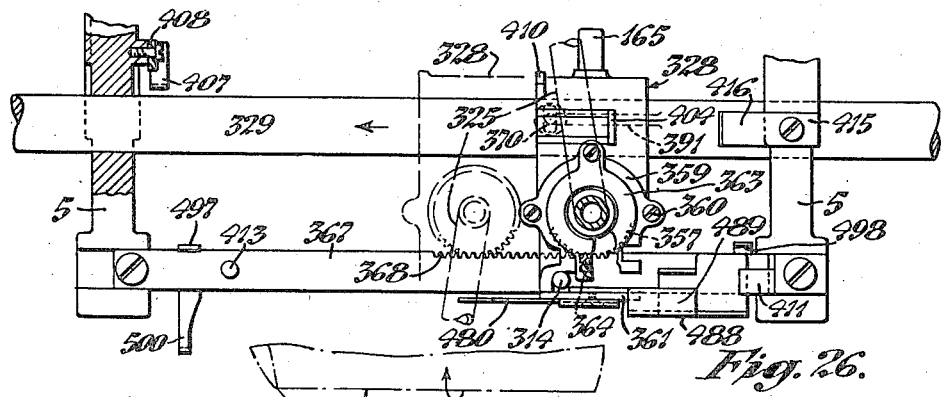
Figure 27:
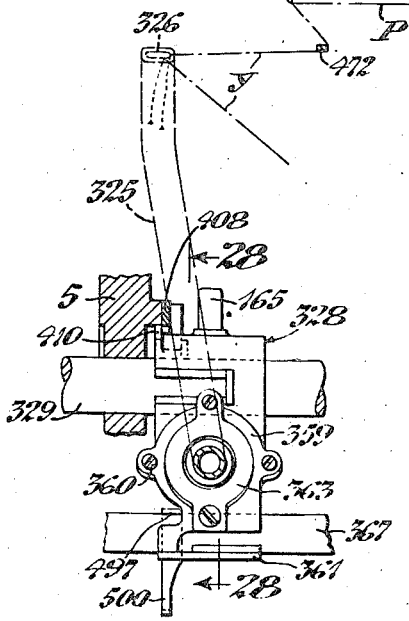
Figure 28:
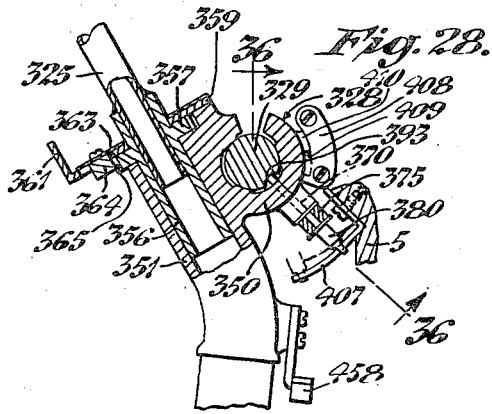
Figure 42:
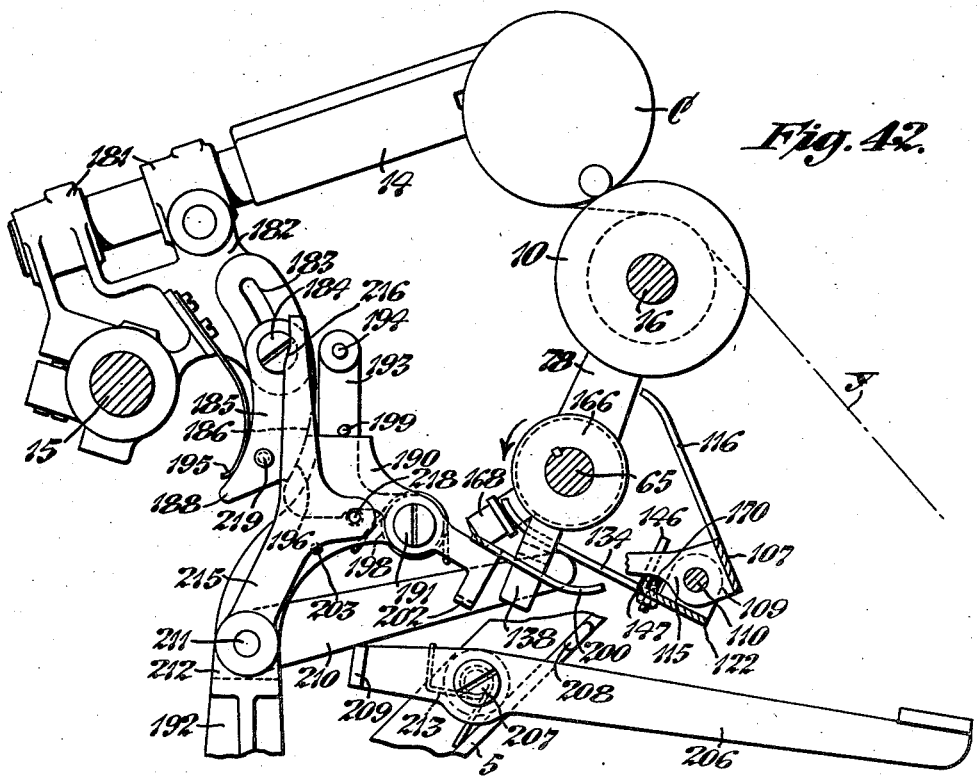
Figure 44:
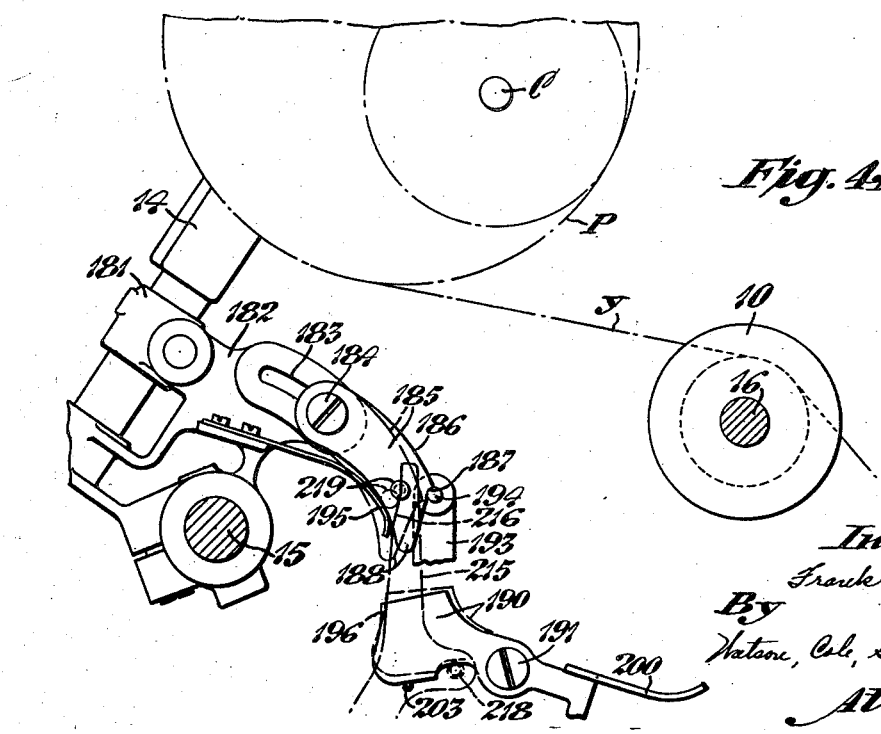
Figure 51:
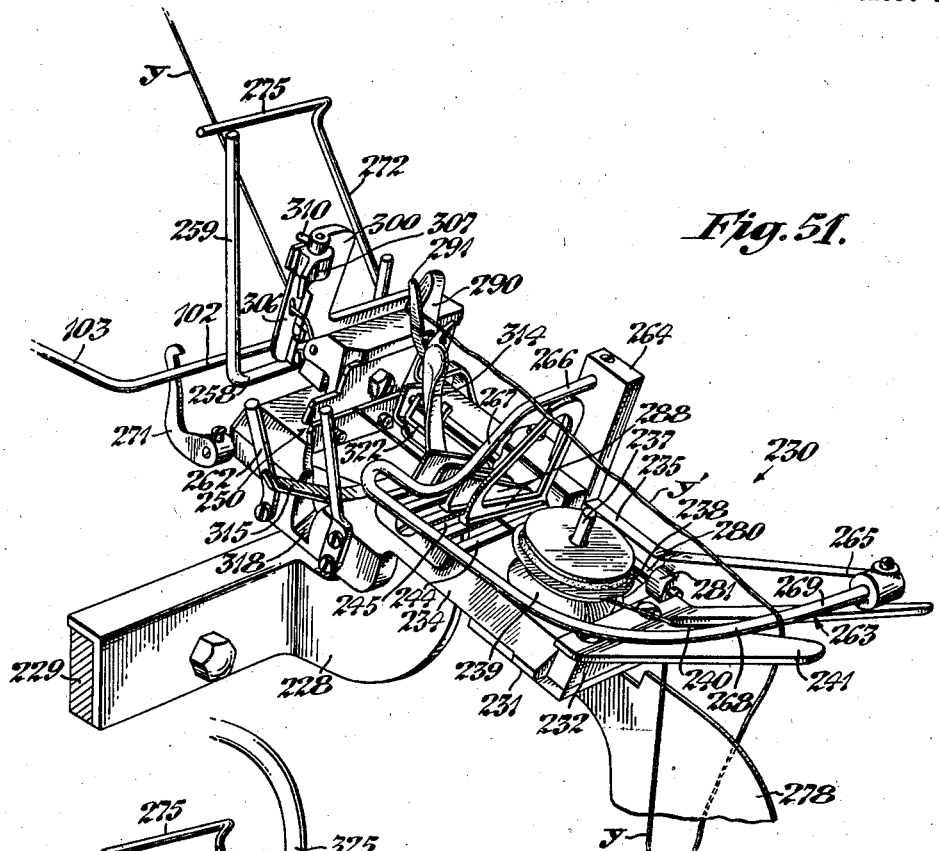
Figure 52:
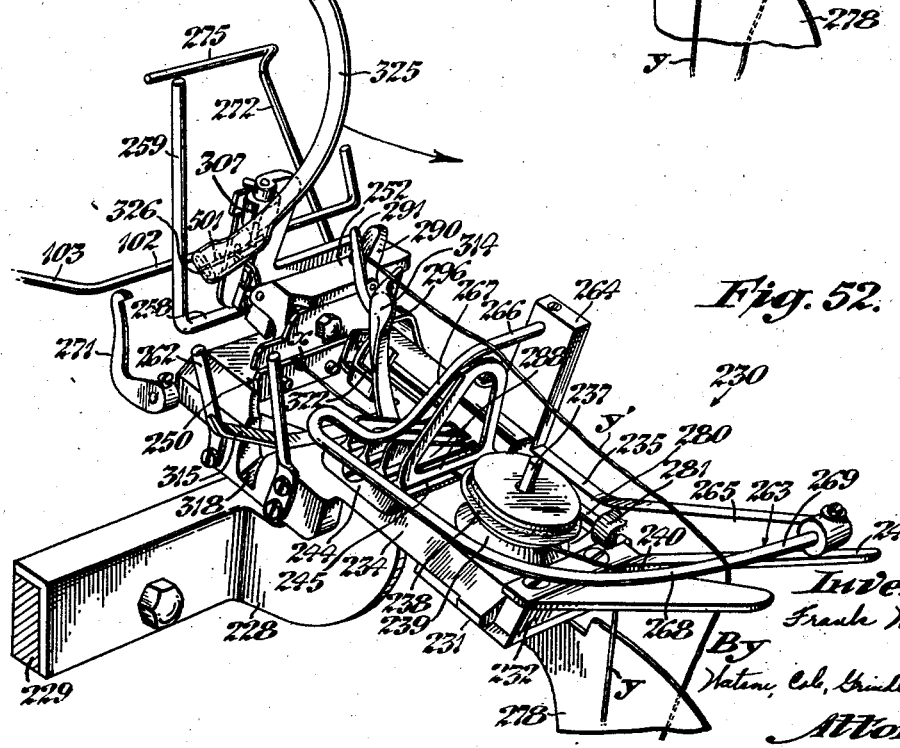
Figure 53:
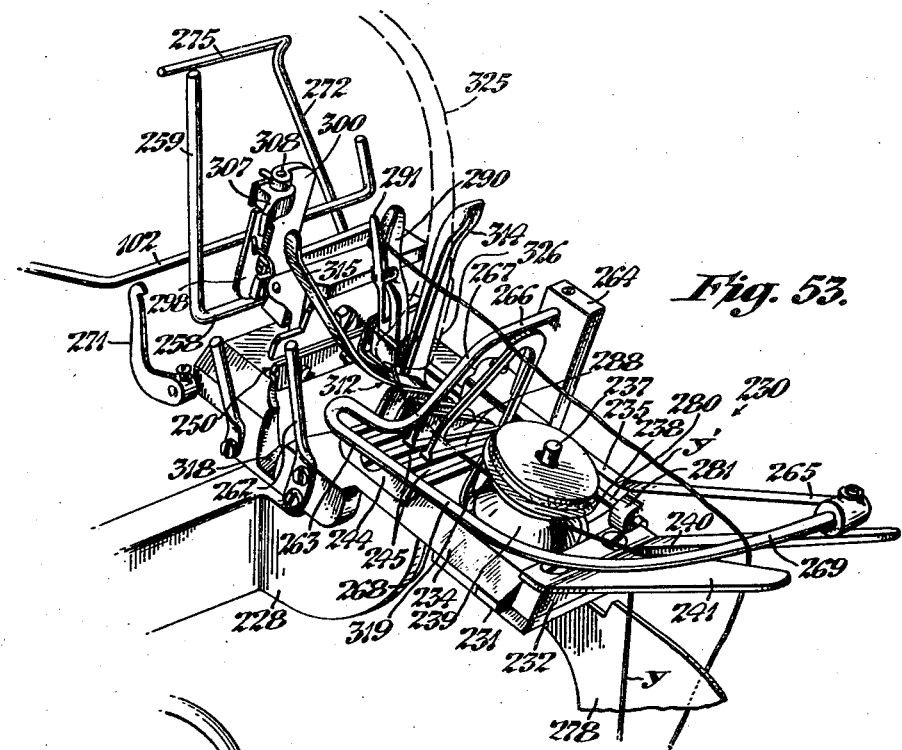
Figure 54:
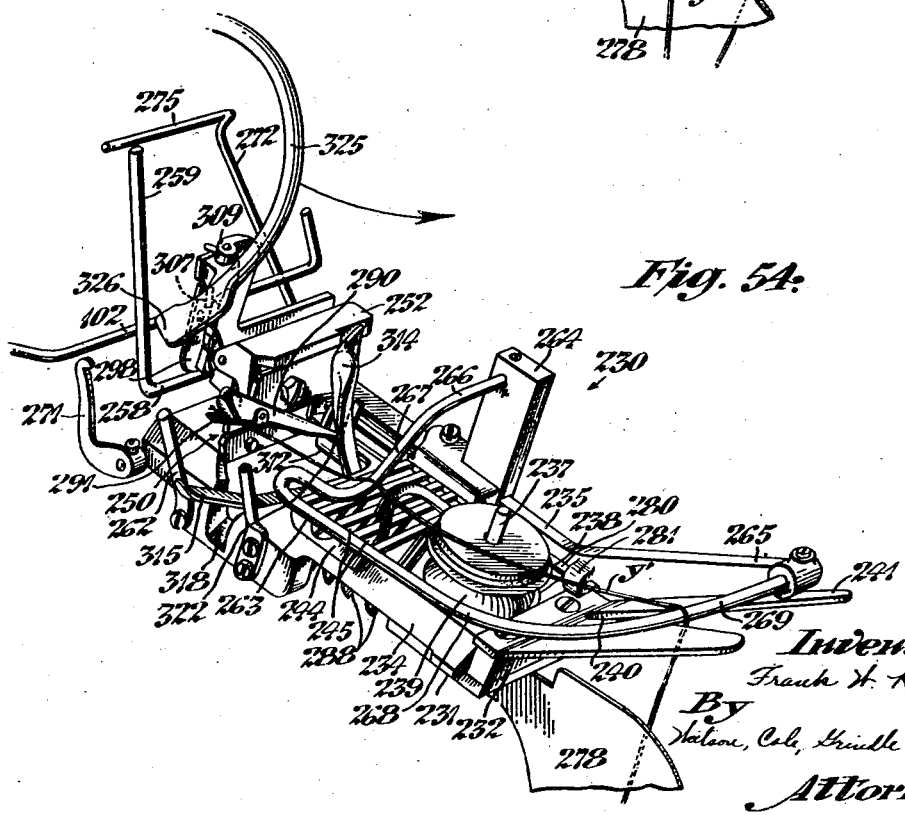
Figure 64:
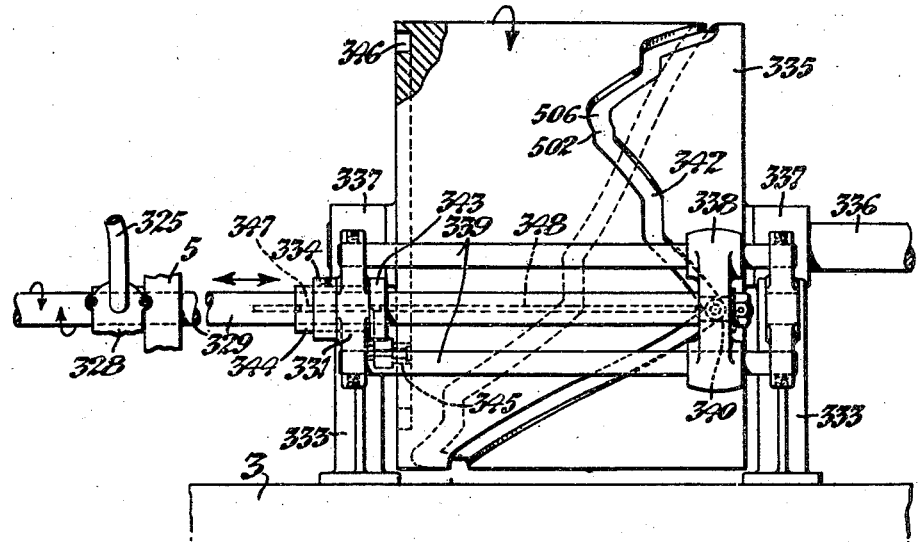
Figure 65:
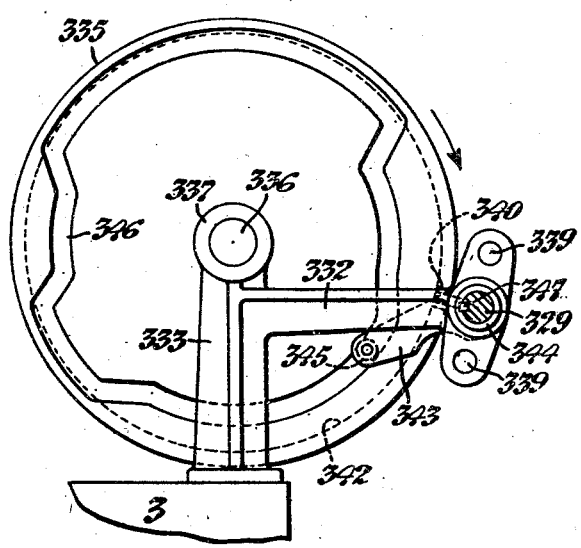

Figs. 19a, 19b, 19c, and 19d illustrate the cam-arm which functions in the manner of a wedge between the clutch-shifting fork and a constantly revolving stud to first change the rotation of the traverse-roll from reverse or unwinding direction to neutral and then from neutral to normal or winding direction;

Fig. 20 is a transverse sectional view of the end-finding nozzle and its operating parts taken on line 20—20 of Fig. 2;

Fig. 21 is a longitudinal sectional view of the hub of the end-finder nozzle taken on line 21—21 of Fig. 20 showing the latching means for connecting the nozzle for movement with its operating shaft with a combined reciprocating and oscillating motion; the latching means being illustrated as in inactive position during the normal winding operation of the machine;

Fig. 22 is a view similar to Fig. 21 showing the latch released to connect the nozzle for movement with its operating shaft when the winding strand is broken or its supply is exhausted;

Fig. 23 is a similar view showing the end-finder connected to its operating shaft to traverse it relatively of the winding unit;

Fig. 24 is a sectional plan view taken on line 24—24 of Fig. 20 showing the releasable detent-means for normally maintaining the latching means inoperative during the winding operation;

Fig. 25 is a plan view of the end-finder nozzle, part-sectional on line 25—25 of Fig. 20, illustrating the means for rocking the nozzle on its hub, the parts being shown in their inoperative position;

Figure 26 is a view similar to Fig. 25 showing the gear on the end-finder nozzle in mesh with a fixed rack for swinging the nozzle into the position indicated by dash-lines to adapt it to retrieve the end of the strand at the slub-catcher;

Fig. 27 is a fragmentary view similar to Fig. 25 showing the nozzle at the end of its traverse along the winding package for retrieving the end of the strand thereon;

Fig. 28 is a transverse sectional view taken on line 28—28 of Fig. 27 showing the means for operating the latching means after the nozzle has traversed along the package whereby to momentarily disconnect the nozzle from its operating shaft while the latter continues its axial movement to operate the knot-tying device;

Fig. 29 is a front view of a portion of the end-finding nozzle and the strand-controlling hook or "anti-stitch" device as viewed in the direction indicated by the arrows 29—29 in Fig. 20 with the parts shown in inoperative position;

Fig. 30 is a view similar to Fig. 29 showing the anti-stitch hook and indicating by dash-lines several different positions which it assumes during its travel with the nozzle;

Figs. 31 to 34, inclusive, are partial plan views of the knot-tying device and the strand-engaging member for restraining the strand leading from the package to the nozzle to prevent it from dropping or riding off from the end of the package during the uniting of the two ends of the strand, the several views illustrating the parts in different positions during their operation;

Fig. 35 is a view similar to Fig. 20 showing the end-finding nozzle as rocked by its operating shaft to mesh its gear with the teeth on the fixed rack;

Fig. 36 is a front view of the gear-segment for operating the knot-tying device with the segment shown as operatively connected to the nozzle-operating shaft;

Fig. 37 is a view similar to Fig. 36 showing the nozzle disconnected from its operating shaft as the shaft continues its longitudinal movement to operate the knot-tier;

Fig. 38 is a transverse sectional view of the winding unit similar to Fig. 3 showing the sizing device for arresting the winding operation when the package reaches a predetermined size, the parts of the device being shown as inoperative during the winding of the package;

Fig. 39 is a fragmentary view similar to Fig. 38 showing the relationship of the sizing device parts as the package reaches the predetermined size and illustrating the device as actuating the control means, illustrated in Figs. 15 to 18, to disconnect the drive for the traverse-roll and package;

Fig. 40 is a sectional plan view taken on line 40—40 of Fig. 39 showing the wedge-shaped member for operating the control means;

Fig. 41 is a view similar to Fig. 38 showing the completed package as swung upwardly from the traverse-roll and latched in raised position to facilitate its manual doffing from the winding spindle;

Fig. 42 is a view similar to Fig. 38 showing an empty cop-tube in place on the winding spindle and positioned in peripheral contact with the traverse-roll;

Fig. 43 is a plan view of the valve-actuating mechanism for connecting the suction-nozzle to or disconnecting it from the suction pump or exhaust means;

Fig. 44 is a side view of the same showing the valve-actuating lever as operated by means on the slow-speed shaft to open the valve;

Fig. 45 is a view similar to Fig. 43 showing the valve-operating parts as actuated by means on the suction-nozzle to close the valve after the ends of the strand have been united;

Fig. 46 is a transverse sectional view taken on line 46—46 of Fig. 43 showing detent-means for maintaining the valve-actuating lever raised and the valve open;

Fig. 47 is a similar sectional view taken on line 47—47 of Fig. 45 showing the valve-actuating lever as released by the detent-means to cause the valve to close;

Fig. 48 is a sectional view through the valve showing it closed;

Fig. 49 is a view similar to Fig. 48 showing the valve opened;

Fig. 50 is a detailed sectional view taken on line 50—50 of Fig. 44 showing the means on the suction-nozzle for operating the detent-means for the valve-actuating mechanism;

Fig. 51 is an enlarged perspective view of the combined tension-device and slub-detector showing one yarn-strand passing therethrough and leading to the winding mechanism and the reserve strand held in readiness to replace the first strand when its supply is exhausted;

Fig. 52 is a view similar to Fig. 51 showing the winding strand as broken with the end-finding nozzle about to move into position adjacent the slub-catcher to retrieve the end while the detector-fingers are engaging the yarn with only light pressure;

Fig. 53 is a view similar to Fig. 52 with the end-finding nozzle indicated by dash-lines in position for engaging the lever which acts to open the slub-catcher to free the end of the strand and relieve the tension on the yarn to permit the suction-nozzle to pick it up;

Fig. 54 is a view similar to Fig. 52 showing the position of the parts after the winding strand has become exhausted and the detector-fingers have been swung downwardly to shift the reserve yarn-strand into position to be picked up by the nozzle;

Fig. 55 is a longitudinal sectional view of the combined tension-device and slub-catcher illustrated in Figs. 51 to 54 with the parts shown in the same relative position as in Fig. 51;

Fig. 56 is a transverse sectional view taken on line 56—56 of Fig. 55 showing the arm or retainer member for holding the reserve strand and indicating its position by dash-lines when it is swung downwardly to shift the reserve strand into the path of the nozzle;

Fig. 57 is a transverse sectional view taken on line 57—57 of Fig. 55 showing the pivoted detector-fingers as overlying the yarn-strand drawing through the device during the winding operation and the resetting lever for restoring the detector-fingers to position after they have been swung downwardly to detect exhaustion of the yarn supply;

Fig. 58 is a fragmentary sectional view of the series of detector-fingers shown as engaged with the strand when the latter has been broken at the slub-catcher;

Fig. 59 is a view similar to Fig. 58 showing the position assumed by the detector-fingers when the winding strand is exhausted;

Fig. 60 is a transverse sectional view taken on line 60—60 of Fig. 55 showing the yarn-strand in position between the blades of the slub-catcher;

Fig. 61 is a view similar to Fig. 60 showing the movable blade of the slub-catcher as swung away from the fixed blade to free the end of the broken strand;

Fig. 62 is a rear view of the device showing the pivoted detent-lever for normally holding the detector-fingers and the reserve-yarn retainer in raised position;

Fig. 63 is a plan view of that portion of the detent-means defined by the arrows 63—63 in Fig. 62 and illustrating the detent-means as about to be released by the swinging movement of the suction-nozzle indicated by dash-lines;

Fig. 64 is a front view of the main operating cam-drum showing the form of the groove for imparting reciprocatory motion to the nozzle-operating shaft;

Fig. 65 is an end view of the drum showing the auxiliary cam-groove for oscillating the shaft;

Fig. 66 is a development of the profile of the cam-groove on the periphery of the drum and the approximate operative relation thereto of the groove on the end of the drum;

Figs. 67a to 67i, inclusive, illustrate diagrammatically the motions of the end-finding nozzle for retrieving the end of a broken strand at the slub-catcher, finding the end on the package and carrying both ends into position to be united by the knot-tying device; and Fig. 68 is a front elevational view of a multiple spindle winding machine showing several of the winding units with the essential parts of their mechanisms.

The present improved winding machine comprises, in general, a helically grooved drive-roll for rotating the package core by peripheral contact therewith and simultaneously traversing a strand longitudinally of the core to wind a package of yarn. The yarn-supplies are preferably arranged in pairs beneath each winding unit with the yarn-strand from one supply being wound onto the package-core and the strand from the other supply serving as a reserve for automatically replacing the first strand when its supply is exhausted. Detector means, normally held inoperative by the feeding of the strand to the winding package, are released when the strand is broken or its supply is exhausted to set in motion means for arresting the winding operation, retrieving the ends of the strand and tying them together. An end-finder in the form of a suction-tube having a nozzle at its end is adapted to be coupled to an operating shaft when the strand is broken or its supply is exhausted. The operating shaft has a combined reciprocating and oscillating motion to swing the suction-tube during its reciprocating movement whereof to cause its nozzle to move into position to retrieve the end of the broken strand adjacent its guiding means or slub-catcher. After this end has been retrieved the end-finding means moves along the length of the package to retrieve the loose end of the strand wound thereon and to thereafter present the two ends to a knot-tying device located adjacent each winding unit. Means are provided for normally driving the drive-roll in direction to rotate the package to wind yarn thereon and means, responsive to breakage of the yarn-strand or exhaustion of its supply, are also provided for rotating the drive-roll and package in reverse or unwinding direction during the traverse of the end-finding means along the package. The package remains in peripheral engagement with the drive-roll until it is desired to remove or doff it from the spindle. Means are also provided for resiliently urging the end-finding nozzle against the periphery of the package during its traverse therealong to cause it to lightly engage the yarn thereon regardless of the diameter of the package.

In the following detailed description of the machine the various cooperating mechanisms are described under separate headings.

It is customary in winding machines to employ a plurality of winding units arranged in gang form along either side of the machine frame. In the present machine the several winding units are identical in construction and driven from the same source of power and therefore only one unit, for example, the endmost unit of the gang, is herein shown and described.

*Winding mechanism and drive therefor*

Figure 1:
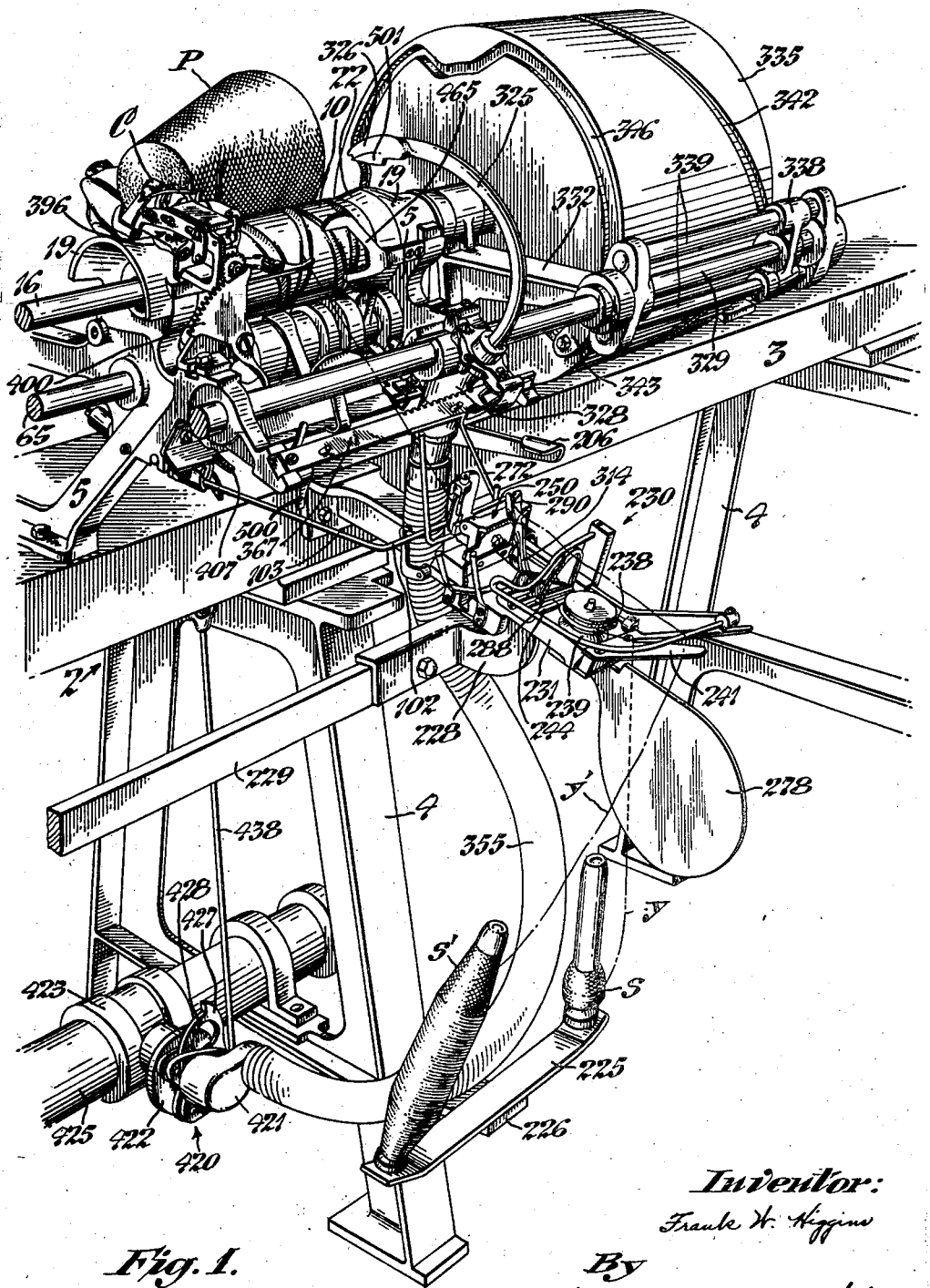
Fig. 1 is a perspective view illustrating the invention as embodied in one unit of a multi-spindle machine with the parts shown in position during the normal winding operation.

The present drawings illustrate a so-called friction-drive or drum-driven winding machine in which the cop, cone or package is rotated by contact of its surface with the periphery of a drive-roll or drum. In Fig. 1, 2 designates the main frame of a winding machine comprising a plurality of winding units arranged in gang form along a bed or table 3. The bed 3 may be supported from the floor by spaced legs 4 and carries a series of laterally-extending bearing brackets 5 spaced at intervals along its upper surface. The brackets 5 serve as supports for the various winding elements to be described as follows. The winding mechanism comprises two principal elements, namely, a rotatable winding mandrel or cop-holder 6 on which the cop-tube or package-core C is supported, see Fig. 2, and a drive-roll 10 for rotating the package by surface contact therewith. The drive-roll 10 may be constituted as the means for traversing the yarn longitudinally of the package being wound on the cop-tube C, in which case the roll is formed with crossing helical grooves 11 and 12 extending in opposite directions and adapted to receive the strand of yarn to guide it back and forth between the ends of the package. Such a form of traverse-roll is shown and described in United States Letters Patent No. 1,749,355, issued to F. A. Reece, March 4, 1930.

As shown most clearly in Figs. 38 and 42 of the present drawings, the cop-tube C is adapted to be mounted on a mandrel or holder 7 of suitable form which is rotatable on a spindle 6 carried at the end of an arm 14 pivoted on a rod or shaft 15 extending through bearings in the several bearing-brackets 5. The weight of the arm 14 and its connected parts maintains the package bearing against the roll 10 during the winding and the pivotal mounting allows the mandrel 7 to move upwardly with the growth of the package. It is the usual practice to provide means for automatically swinging the pivoted cop-supporting arm 14 upwardly to remove the package from the drive-roll to arrest the winding operation when the yarn strand is broken, its supply is exhausted or the package is completed. Contrary to this customary method of operation, in the present improved machine the package remains in contact with the drive-roll 10 until it is completed when the arm 14 may be raised manually to allow the package to be doffed.

Referring particularly to Figs. 1, 3, 4 and 8, the drive-roll 10 is mounted on a shaft 16 which extends horizontally throughout the length of the machine to serve as a support for all the drive-rolls of the several winding units. The drive-shaft 16 is driven continuously from a suitable prime mover, such as an electric motor, not herein shown, the shaft being journaled in ball-bearings 17 carried by the several brackets 5. The ball-bearings 17 are mounted in openings in the brackets 5 and held in place by sheet-metal retainers 18, being protected from dirt and lint by suitable caps or cover-members 19, see Figs. 1 and 4.

Each drive-roll 10 is mounted free to rotate on the drive-shaft 16 and arranged to be driven therefrom during the winding operation by means of a clutch-mechanism, designated generally by the reference character 20 in Figs. 4, 5, 8 to 10, inclusive. As shown in these views a clutch-member 22 comprising an annular tapered flange 23 is provided with a hub portion 24, see Fig. 8, held within the counterbored end of the drive-roll 10. The clutch-member 22 is secured fast with the drive-roll 10 by means of one or more screws 25 inserted in radial holes in the drive-roll and screwed into threaded holes in the hub 24. The flange 23 of the clutch-member 22 provides an outer tapered clutch-face 27 and a corresponding inner clutch-face 28. Mounted in a counterbore at the outer end of the hub 24 is a ball-bearing 29, the internal race of which supports the drive-roll 10 for rotation relatively of the drive-shaft 16. A collar 31 is secured to the drive-shaft 16 by a set-screw 32 between the ball-bearing 29 and a shoulder 33 on the hub 24 to locate the drive-roll 10 in the correct position on the shaft and to take the end-thrust in either direction.

Keyed to the drive-shaft 16, which may be termed the high-speed shaft, and arranged for axial sliding movement thereon is a sleeve 36 held rotatively with the shaft by a key 35 and formed with a peripheral flange 37 at its inner end, see Fig. 8. The outer end of the sleeve 36 is reduced in diameter to receive a clutch-member 40 held fast thereon by a force fit. The clutch-member 40 is provided with a hub-portion 41 formed with a peripheral groove 42 which functions for a purpose to be explained later. The clutch-member 40 is also provided with an annular flange, the periphery of which is tapered to provide a clutch-face 44 for cooperation with the clutch-face 28 on the member 22.

The clutch-member 40 is adapted to be shifted axially of the drive-shaft 16 by means to be described later, and when moved toward the left, as viewed in Figs. 4 and 8, its clutch-face 44 frictionally engages the inner clutch-face 28 of the clutch-member 22 to rotate the drive-roll 10 at a relatively high rate of speed in direction to wind yarn on the cop-tube C to form a package P.

An annulus 46 fastened to the radial flange of the clutch-element 22 by screws 47, see Fig. 8, serves as a retainer for the ball-bearing 29. The annulus 46 is formed with bosses 48 and 49, see Fig. 11, projecting from its side and the boss 49 is slotted radially to receive a pawl or latch-member 50 pivoted on a cross pin 51 held in the sides of the boss. The circular end of the pawl 50 is adapted to be received in one of a plurality of slots 52 formed in the inner face of the flange 43 of the clutch-member 40. When the clutch-member 40 first engages the clutch-element 22 to rotate the drive-roll 10 there may be some slippage therebetween, but as the roll gains speed centrifugal force will act on the pawl 50 to rock its end outwardly to engage it in one of the slots 52 to positively lock the two clutch-members together. A leaf-spring 53 carried by the annulus 46 and engaging a flat end of the latch 50 acts to yieldingly resist rocking movement of the latch to normally withhold it from engagement with the slots 52, see Fig. 9.

Slidable in radial bores 54 in the bosses 48 are balls 55 which are urged inwardly by coil springs 56 pocketed in the bores. The spring-pressed balls 55 are adapted to engage in V-shaped grooves 58, 59 and 60 formed in the periphery of an annulus or sleeve 62 carried on the sleeve 36 between its flange 37 and the inner end of the hub 41 of the clutch-member 40. With the clutch-member 40 in the position illustrated in Fig. 8 the detent-balls 55 engage in the peripheral groove 60 to maintain said member engaged with the clutch member 22.

Fig. 9 shows the clutch-member 40 shifted slightly toward the right to declutch the drive-roll 10 from the shaft 16, at which juncture the balls 55 will engage in the groove 59. Fig. 10 illustrates the member 40 shifted further in the same direction with the balls 55 engaging the groove 58 and at this juncture a rotary clutch-disk 85, to be described later, engages the outer clutch-surface 27 of the element 22 to rotate the drive-roll in reverse direction.

Journaled in bearings 64 in the brackets 5, see Figs. 1 and 4, is a shaft 65 which is continuously rotated at relatively slow speed in the same direction as the drive-shaft 16. Held rotatively with the shaft 65 by a key 66 and secured axially in place thereon by a set-screw 67, see Fig. 8, is a collar 68. Fastened to the collar 68 adjacent one end thereof by means of a screw 69 is a circular abutment 70. Mounted for axial sliding movement on the shaft 65 and held rotatively therewith by a key 66 is a sleeve 74 provided with a radially-projecting finger or abutment 75 which normally abuts one side of the collar 68. The opposite end of the sleeve 74 is reduced in diameter to receive the hub 77 of a clutch-shifting member 78. The clutch-shifter 78 is held in place on the sleeve 74 by means of a collar 79 fastened to the reduced end-portion of the sleeve abutting the side of its hub-portion 77. The clutch-shifter 78 is bifurcated at its upper end to form a fork 80 engaging in the peripheral groove 42 in the hub 41 of the clutch-member 40, see Figs. 13 and 20. Adjustably fastened to the sleeve 74 adjacent the clutch-shifter 78 is a clutch-disk 85. The disk 85 may be constructed in two parts and, as shown in Fig. 8, it comprises a hub 83 to which is fastened a ring or annulus 84 of fiber or other frictional material. The outer periphery of the ring 84 underlies the clutch-element 22 and is tapered to provide a clutch- or driving-face 86 conforming to the clutch-face 27 on the member 22.

It will be understood by reference to Figs. 8, 9 and 10 that when the sleeve 74 is slid axially toward the right to a slight extent the clutch-member 40 will be released from engagement with the clutch-member 22 to declutch the drive-roll 10 from the shaft 16; and by sliding the sleeve further to the right the clutch-disk 85 is carried into engagement with the clutch-member 22 to cause the drive-roll 10 to be driven in reverse direction at a relatively slow rate of speed whereby to unwind the yarn from the package. By reversing the operation explained above the clutch-disk 85 is first disengaged from the clutch-member 22 and the member 40 thereafter engaged therewith to cause the drive-roll 10 to be rotated in winding direction at a high rate of speed.

To check the rotation of the drive-roll 10 before its direction of rotation is reversed a brake-shoe 90 is employed. Referring to Figs. 3, 6, 7 and 20 the brake-shoe 90 is in the form of an arcuate pad constructed of suitable friction-producing material and carried at the upper end of a brake-lever 91. The lever 91 is pivoted on a stud 92 projecting from the side of the right-hand bracket 5 and is normally urged in a direction to cause the brake-shoe 90 to engage the peripheral face 27 of the clutch-element 22 by means of a helical spring 93 having one end hooked around a lower depending leg of the lever and its opposite end anchored to a pin on the bracket 5, see Fig. 3. The brake-lever 91 is actuated by the spring 93 to check the rotation of the drive-roll, but it is normally held released from the clutch-element 22 by means described as follows. Adjustable in a threaded hole at the upper end of the brake-lever 91 is a stud or follower 95, see Figs. 6 and 7, held in its adjusted position by means of a check-nut 96. The follower-stud 95 has a head 97 arranged with its outer rim in position to rest against the outer face of a stud 98 adjustable in a threaded hole in the side of the fork 80 of the clutch-shifter 78. The stud 98 is secured in adjusted position on one arm of the fork 80 by means of a check-nut 99 and is formed on its outer face with a centrally located V-shaped notch or groove 100. During the winding operation the rim 97 of the follower-stud 95 on the brake-lever 91 rests against the face of the stud 98 at the right of its V-shaped groove 100 as shown in Fig. 6. When the shifting-fork 80 and stud 98 are moved toward the right as indicated in Fig. 7 to declutch the drive-roll 10 from the shaft 16 the rim of the follower-stud 95 rides down the inclined side of the groove 100 under the action of the spring 93 and the brake-pad or shoe 90 thus will be engaged with the peripheral face 27 of the clutch-element 22 to check the rotation of the drive-roll 10. When the fork 80 is shifted farther to the right the left-hand side of the V-shaped groove 100 acts to cam the follower-stud 95 outwardly to free the brake-shoe 90 from the clutch-element 22.

The operation of the clutch-shifting means in changing the direction of rotation of the drive-roll 10 is controlled by the condition of the winding yarn-strand. Referring particularly to Figs.

1 and 3, the yarn-strand y leads upwardly from its source of supply through a tension-device and slub-catcher, described hereinafter, and passes over a laterally-extending arm 102 of a wire bail or detector-member 103. The detector-member 103 has a looped inner end 104, shown in Fig. 4, which is adjustably secured to a depending portion or arm 105 of a shiftable frame-member 107 by means of a clamping plate 106. The frame-member 107 which is shown most clearly in Figs. 3, 4, 5, 12, 13, 15, 16, 17 and 18 comprises a sheet-metal strip having its opposite ends folded at right-angles to form ears 108 and 109. The ears 108 and 109 have alined holes for pivotally mounting the member 107 on a rod 110 extending horizontally between the spaced bearing-brackets 5. The ear 108 is extended downwardly to form the depending arm 105 and rearwardly to provide a relatively long finger 111 which is narrowed at its end to receive a cylindrical counterweight 112. The counterweight 112 is adjustably secured to the finger 111 by a set-screw 113, see Fig. 3. The ear 109 at its right-hand end is extended rearwardly in a finger 115, see Fig. 15, having its end arched upwardly in offset relationship for a purpose to be explained later.

Adjacent the ear 109 the member 107 is formed with an upstanding arm 116. The arm 116 is widened at its upper end to provide a wedge-shaped head 120 having one side extended laterally as indicated at 118 in Fig. 15 and its opposite side flared outwardly to form a cam-edge 119, see also Figs. 8, 16, 17 and 18.

Figure 15:
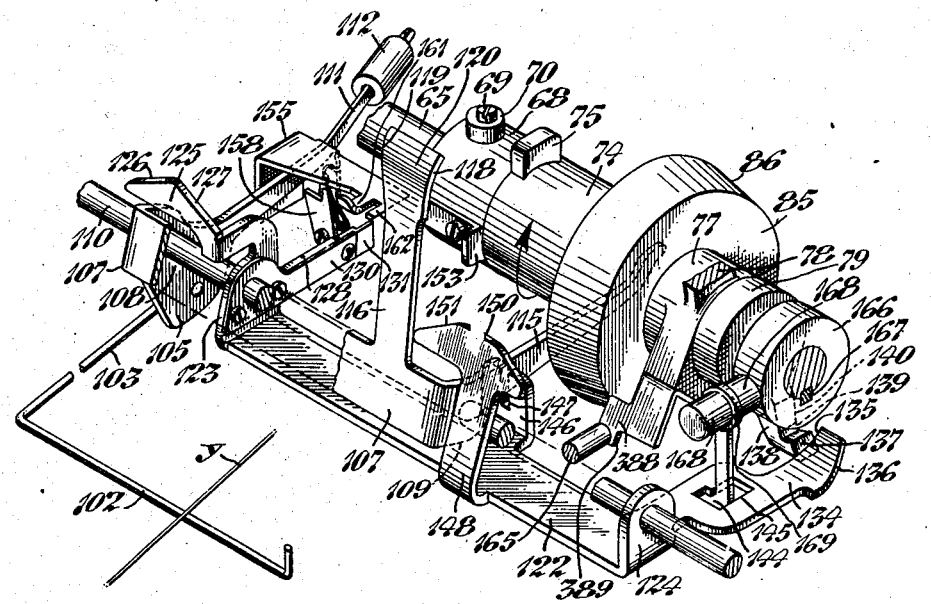
Fig. 15 is a perspective view of the mechanism illustrated in Fig. 12 with the parts shown in the position they assume during the normal winding operation.

The shiftable frame-member 107 cooperates with a second frame-member 122 as the two members are slid longitudinally along the pivot-rod 110. The frame-member 122, shown best in Figs. 15 to 18. is constructed from a sheet-metal strip and provided with upstanding ears 123 and 124 having holes for receiving the rod 110. The left-hand ear 123, as viewed in Fig. 15, is extended upwardly and forwardly and then bent laterally to provide an arm 125 having oppositely-inclined cam-faces 126 and 127. The ear 123 also extends rearwardly in a finger 128 to which is fastened an overlying leaf-spring 130. At the end of the spring 130 is a detent-plate 131 having an inclined side 132, see Figs. 12 and 14. Adjacent the opposite ear 124 of the member 122 is a rearwardly projecting arm 134, see Figs. 12 and 15, which is curved upwardly at its end. One edge 135 of the end of the arm 134 is straight while its opposite lateral edge is angular to provide a wedge 136. The straight edge 135 of the arm 134 normally bears against the vertical edge 137 of a lug 138 depending from, and formed integral with, the hub 77 of the clutch-shifter 78, see Figs. 5, 15 and 19a. As shown in Fig. 19a the lug 138 is formed with a laterally-recessed notch 139 having one face inclined outwardly toward its upper end to form a cam-surface 140 for a purpose as explained later.

The frame-member 122 is held with its arms in substantially horizontal position as illustrated in Fig. 15 during the winding operation by means of a sheet-metal member or bracket 142, see Fig. 20, fastened to an inclined boss 143 formed integral with the hub 77 of the clutch-shifter 78. The bracket 142 is provided at its lower end with a hook-like extension 144, see Fig. 15, which passes through a rectangular opening 145 in the arm 134 of the pivoted frame 122 and engages the under side of the arm to limit the downward movement of the frame. The frame 122 is adapted to be swung upwardly to the position indicated in Figs. 17 and 18 for a purpose to be explained later. The frame-member 122 is formed with an upstanding ear 146 provided with a vertical slot 147 for receiving the finger 115 of the frame-member 107. In this manner the two frame-members 107 and 122 are connected to slide as a unit back and forth along the pivot-rod 110 without restricting relative pivotal movement between the two members. The frame-member 122 is provided with an upstanding finger 148 formed at its upper end with a cross-bar 150 having oppositely inclined upper edges 151 and 152.

During the winding operation the wire bail or detector-member 103 carried by the frame-member 107 bears against the winding yarn-strand y under the action of the counterweight 112 and the various parts of the clutch-controlling mechanism assume the relationship shown in Figs. 3 and 15. When the yarn-strand y is broken or its supply is exhausted the detector 103 is swung upwardly under the action of the counterweight 112 to cause the frame-member 107 to be rocked in clockwise direction as viewed in Fig. 15 until its movement is arrested by the engagement of the arm 116 with the peripheries of the collar 68 and sleeve 74 rotating with the drive-shaft 65, see Fig. 16. As the collar 68 and sleeve 74 rotate in the direction indicated by the arrow in Fig. 16, the two abutments 70 and 75 are eventually carried into position to engage the opposite edges 118 and 119 of the wedge-shaped head 120 of the arm 116. As the shaft 65 continues its rotation the head 120 of the arm 116 will act in the manner of a wedge to force the sleeve 74 toward the right. The clutch-shifting member 78 being connected to the sleeve 74, its fork 80 will act first to shift the clutch-element 40 to declutch the drive-roll 10 from the high-speed drive-shaft 16 and to thereafter engage the driving-disk 85 with the element 22 to cause the drive-roll 10 to be driven from the slow-speed drive-shaft 65 in reverse direction. During this latter rotation of the drive-roll 10 end-finding means to be described later acts to withdraw the end of the broken strand from the winding package in the manner as explained hereinafter.

Figure 16:
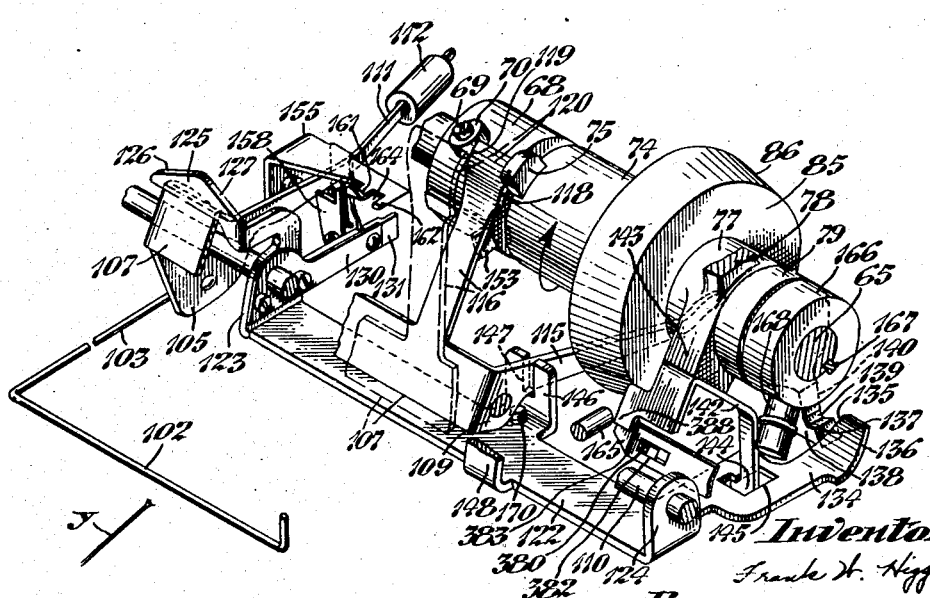
Fig. 16 is a view similar to Fig. 15 showing the control means as operative to change the direction of rotation of the traverse-roll after the winding strand has been broken or its supply exhausted.

After the frame-member 107 has acted to slide the sleeve 74 to reverse the rotation of the drive-roll 10 in the manner explained above a projecting lug or striker 153 on the collar 68 will engage the rearward face of the arm 116 to swing the frame-member 107 in counterclockwise direction, as viewed in Figs. 16 to 18, to return said member to inoperative position. Attached to the left-hand bearing-bracket 5 is an angular sheet-metal bracket 155, see Figs. 12, 14 and 15, having a depending leg 156, at the lower end of which is a latch or pawl 158 pivoted on a stud 157. The leg 156 is formed with a stop-lug 159 against which the side of the latch 158 is yieldably held by means of a spring 160, shown best in Fig. 14. The bracket 155 is also provided with a pair of spaced ears 161 and 162 forming a slot 164 therebetween, the edge of the innermost ear 162 being chamfered or beveled on its under side as shown in Figs. 14 and 16.

During the winding operation the weighted finger 111 on the frame-member 107 is positioned at the left of the pawl or latch 158 and elevated thereabove, while the spring-plate 131 on the finger 128 of the other frame-member 122 is held below the opening 164 in the bracket 155. When the strand is broken, however, the finger 111 will swing downwardly to the position indicated by the dash lines and designated by the reference character 111a in Fig. 14. When the frame-members 107 and 122 are shifted toward the right to reverse the direction of rotation of the drive-roll 10, the finger 111 and plate 131 will occupy the respective positions indicated by dash lines at 111b and 131a in Fig. 14. At another stage in the operation, when the frame-member 107 is rocked to initial position by the lug 153 on the collar 68 the finger 111 will be swung upwardly as indicated by dash lines at 111c while the plate 131 will remain in the position indicated by dash lines at 131a in Fig. 14.

The mechanism as thus far described operates to reverse the rotation of the drive-roll 10 from winding direction to unwinding direction at reduced speed and during the latter rotation an end-finding mechanism retrieves the end of the strand on the unwinding package. After the end of the strand on the package and the end of the supply-strand have been retrieved and united or tied together by the knotter the clutch-controlling mechanism is shifted in the opposite direction to again cause the drive-roll 10 to be driven from the shaft 16 in winding direction. Adjacent the end of the traverse of the end-finder in a left-hand direction, as viewed in Figs. 1 and 2, an operating pin or follower 165, shown in Figs. 15 to 18 and 20, carried by the end-finder rides along the inclined edge 127 of the cam-arm 125, see Fig. 17, thereby causing the latter to be depressed. The frame-member 122 will thus be tilted in counterclockwise direction, as viewed in Fig. 17, to carry the detent-plate 131 at the inner end of its finger 128 upwardly to the position indicated by dash lines at 131b in Fig. 14. It will be understood by reference to Fig. 14 that during the upward movement of the detent-plate 131 its cam-face 132 will be cammed over the end of the ear 162 on the bracket 155 until the plate is finally positioned directly above the ear, see also Fig. 18. Through this provision the frame-member 122 is prevented from tilting back to the position shown in Fig. 16. During this last-mentioned tilting motion of the flame 122 the inner end of the cam-arm 134 at its right-hand end is raised from the position shown in Figs. 15, 16 and 19a to that shown in Figs. 17 and 19b to aline it with the cam-slot 139, previously described as formed in the face of the lug 138 depending from the hub 77 of the clutch-shifter 78.

A collar 166 fast on the shaft 65 at 167, see Figs. 12 and 15, carries a radially-projecting follower-stud 168 formed with a peripheral flange 169 midway of its length. After the cam-arm 134 has been alined with the notch 139 in the depending lug 138 of the member 78 the stud 168 in revolving with the shaft 65 will engage the cam-edge 136 of the arm and force the latter toward the left as viewed in Figs. 17 and 19c. Movement of the cam-arm 134 in this direction will first cause it to enter the notch 139 and engage the bottom thereof to force the clutch-shifting member 78 toward the left to a slight extent whereby to declutch the drive-roll 10 from the shaft 16 and permit the brake-shoe 90 to be applied thereto to check its rotation. As the two frame-members 122 and 107 are thus shifted laterally the detent-plate 131 will slide along the ear 162 and the finger 111 will be moved to a position where it will no longer be held from tilting downwardly by the pawl or latch 158. To hold the finger 111 from such tilting motion and to cause the detector 103 to be depressed, the frame-member 122 carries a screw or other abutment 170, see Figs. 38 and 42, which is adapted to engage the under side of the arm 115 to retain the frame-member 107 in the position shown in Fig. 17.

The various parts remain in the last-explained relationship until the yarn-strands have been tied together and the end-finder has nearly completed its return traverse in a right-hand direction, at which time its pin or follower 165 will engage the inclined edge 151 of the cross-bar 150 on the arm 148 of the frame 122 which has previously been rocked into the position shown in Fig. 17. As the follower 165 slides along the cam-surface 151 of the arm 148 the frame-member 122 will be rocked in counterclockwise direction, as viewed in Fig. 15, to swing the arm 134 upwardly along the cam-face 140 of the notch 139 in the lug 138 of the member 78 to the position shown in Fig. 18. Now, as the revolving follower-stud 168 again engages the cam-edge 136 of the arm 134 it forces the latter farther toward the left in the manner indicated in Figs. 18 and 19d. This latter movement of the parts acts to shift the clutch-member 40 into engagement with the clutch-member 22 to cause the drive-roll to be driven in winding direction at a high rate of speed, see Fig. 8. When the frame-members 122 and 107 are shifted in this manner the detent-plate 131 will overlie the opening 164 in the bracket 155 as shown at 131c in Fig. 14 to permit the finger 128 to drop therethrough after the stud 168 has revolved beyond the cam-edge 136 on the arm 134 whereby to allow the frame-member 122 to return to the position shown in Fig. 15. The lower hooked end 144 of the bracket 142 which then engages the arm 134 acts as a stop to limit further tilting movement of the member 122. The yarn-strand y which has now been taken up by the winding package will act to hold the detector 103 slightly depressed and to also withhold the wedge 120 from engagement with the rotating abutments 70 and 75 until the yarn is broken again or its supply is exhausted.

*Package-sizing mechanism*

The means for arresting the winding operation when the winding package reaches a predetermined size is constructed and arranged as shown in Figs. 3 and 38 to 41, inclusive. In the present winding machine, when the package reaches a predetermined diameter the sizing mechanism acts to arrest the winding operation by shifting the clutches for the drive-roll to neutral or inoperative position.

The arm 14 which supports the package P is mounted in spaced bearing-bosses 181 on a holder or carrier 182 pivotally supported on the rod 15, previously described as extending longitudinally throughout the several winding units. The holder 182 has a projecting portion provided with an arcuate slot 183 arranged concentric with the axis of the rod 15. A stud 184 projecting through the slot 180 is adapted to be clamped in adjusted position on the holder 182 by means of a nut at its end, see Fig. 39. A sizing member 185 pivotally supported on the stud 184 is provided with an arcuate edge 186 formed at its lower end with a curved detent-shoulder 187 and reaching downwardly from the shoulder in a foot or extension 188.

Cooperating with the sizing member 185 is a second sizing- or knock-off lever 190 which is pivoted on a stud 191 held in a bracket or stanchion 192. The stanchion 192 is supported from the bed 3 of the machine-frame 2 and extends upwardly in an arm 193 carrying a detent-pin 194 projecting from its side. When the arm 14 is rocked upwardly manually to permit doffing of the package P the sizing member 185 is swung in counterclockwise direction, as viewed in Fig. 38, under the action of a leaf-spring 195 fastened to the holder 182 with its end bearing against the side of the member. As the arm 14 is raised the detent-shoulder 187 will be engaged with the fixed pin 194 to releasably hold the arm 14 in elevated position as shown in Fig. 41.

During the winding operation the curved edge 186 of the sizing member 185 bears against a similar curved face 196 on the knock-off lever 190 as shown in Figs. 3, 38 and 42. The lever 190 is controlled by a spring 198 to cause it to rock on the stud 191 in counterclockwise direction to maintain its curved face 196 bearing against the arcuate edge 186 of the sizing member 185. The spring 198 is coiled around the stud 191 with one end engaging a part of the stanchion 192 and its other end bearing against the lower edge of the lever 190. The spring 195 is somewhat stronger than the spring 198 so that the member 185 tends to rock the lever 190 in clockwise direction, but such movement is prevented by the engagement of the upper edge of the lever 190 with a pin 199 projecting laterally from the stanchion 192. The knock-off lever 190 is formed with a forwardly-extending arm 200 which, as shown in Fig. 40, is of wedge-shape with one of its lateral edges flared outwardly to form a cam-face 201 for a purpose to be explained later. An extension on the side of the arm 200 is folded downwardly and then laterally to form a shelf or rest 202.

The sizing mechanism is adjustable to adapt the machine to wind packages of any desired size by loosening the nut, shown by dotted lines in Fig. 39, on the stud 184 and then sliding the sizing member 185 to the correct position along the arcuate slot 183, after which the nut is tightened. As the package increases in diameter during the winding the arm 14 swings upwardly to cause the arcuate edge 186 of the sizing member 185 to slide along the curved face 196 of the knock-off lever 190, see Figs. 3 and 38. When the package reaches the predetermined size the lower end of the arcuate edge 186 of the sizing member 185 will ride off from the curved face 196 of the knock-off lever 190. The spring 195 will then rock the member 185 from the position indicated in dash lines to that shown in full lines in Fig. 39 to cause its foot 188 to seat on the upper straight portion of the member 190 as the arcuate edge 186 of the member 185 brings up against the detent-pin 194 to limit its movement in this direction. Simultaneously with this movement of the member 185 the knock-off lever 190 will be rocked from the position indicated by dash lines to that shown in full lines in Fig. 39 with its lower edge bringing up against a stop-pin 203 on the side of the stanchion 192. During this latter movement of the knock-off lever 190 its arm 200 swings upwardly to the position shown in Fig. 39 to locate its wedge-shaped end in the path of movement of the two abutments 70 and 75 on the collar 68 and sleeve 74, previously described as rotating with the slow-speed drive-shaft 65, see also Fig. 40. As the abutments 70 and 75 revolve during the rotation of the shaft 65 the straight side of the arm 200 will engage with the head of the screw 69 which fastens the abutment 70 to the collar 68, while its opposite inclined side 201 will engage with the abutment 75. As the shaft 65 continues to rotate, the wedge-shaped end of the arm 200 will tend to pry the two abutments 70, 75 apart and since the collar 68 is fixed on the shaft, the sleeve 74 will be shifted to the right as viewed in Figs. 1, 2 and 40. The extent of sliding movement imparted to the sleeve 74 in the manner explained above is substantially half of that imparted to the sleeve as caused when the winding strand is broken in the manner previously explained, so that the clutch-member 40 is merely declutched from the member 22, as shown in Fig. 9, and the brake 90 then applied to the drive-roll 10 to check its rotation, see Fig. 7. When the knock-off lever 190 is in the position shown in Fig. 39 its shelf 202 provides a rest against which the arm 115 of the shifting frame-member 107 engages as indicated by dash lines in Fig. 39. Through this provision the frame-member 107 is prevented from swinging into position to cause its wedge 120 to engage between the abutments 70 and 75 to cause the drive-roll 10 to be driven in reverse direction and the end-finding means to operate after the package P has reached the required size.

After the package P has reached the predetermined size and the operation of the winding mechanism has been arrested the operator may raise the package away from the drive-roll 10 by swinging the arm 14 upwardly to the position shown in Fig. 41 so that the curved detent-shoulder 187 will snap over the detent-pin 194 to maintain the package in elevated position. The operator may then sever the yarn-strand, doff the full package P and place an empty cop-tube or core C on the cop-holder 6 at the end of the arm 14. The end of the yarn-strand y is suitably attached to the empty tube C and the winding of a new package may be started by depressing a starting-handle 206 shown in Figs. 1, 3, 38 and 42. The starting-handle 206 is pivoted on a stud 207 fastened in the side of the right-hand bracket 5 and is normally held in inoperative position with its upper edge engaging a stop-boss 208 on the side of the bracket under the action of a helical spring 213 coiled around the stud 207, see Fig. 38. The laterally-bent inner end 209 of the starting-handle 206 is adapted to engage the lower edge of an arm 210 which is fastened to a horizontal rod 211. The rod 211 is pivoted in the side of a bifurcated portion 212 of the stanchion 192 and carries a resetting-arm 215. The arm 215 extends upwardly from the rod 211 and is formed adjacent its upper end with a rearward inclined cam-face 216. Midway between its ends the arm 215 is formed with a boss 217 carrying a projecting pin 218.

When the forward end of the starting-handle 206 is depressed to the position illustrated in Fig. 42 its inner bent end 209 will engage with and rock the arm 210 upwardly. The arm 215 being connected to the arm 210 by the rod 211 will be swung from the position shown in Fig. 38 to that shown in Fig. 42 to cause its upper end to engage a pin 219 on the side of the sizing-member 185 to rock the latter against the action of the leaf-spring 195. By this action the shoulder 187 on the sizing-member 185 may be released from the detent-pin 194 to permit the arm 14 to descend under the action of gravity. As the arm 14 rocks downwardly the pin 219 on the member 185 will ride along the cam-face 216 of the arm 215 to cause said member to be rocked in clockwise direction, as viewed in Fig. 42. Simultaneously with the release of the member 185 from the detent-pin 194, the pin 218 on the arm 215 will engage the lower edge of the knock-off lever 190 and rock it in clockwise direction against the action of the spring 198 until its upper edge brings up against the stop-pin 199 in the side of the stanchion 192. With the parts in the positions last described the arcuate edge 186 of the sizing member 185 will slide downwardly along the curved face 196 of the lever 190 to the position shown in Fig. 42 to place the cop-tube C in peripheral contact with the drive-roll 10. As the knock-off lever 190 is rocked to the position last described its wedge-shaped arm 200 will be removed from engagement with the abutments 69 and 75. Simultaneously with the displacement of the arm 200, the outer end of the arm 210 will engage the under side of the arm 134 and raise the latter into position to cause its cam 136 to act between the lug 138 of the clutch-shifting member 78 and the revolving follower-stud 168, see Figs. 17 and 18, whereby to shift the clutch-member 40 from neutral position into engagement with the clutch-member 22 as shown in Fig. 8 to start rotation of the drive-roll 10 in direction to cause the yarn-strand y to be wound onto the cop-tube C. As the starting-handle 206 is released the various resetting or starting elements will assume the relationship shown in Figs. 3 and 38.

As before explained, when the package P reaches its predetermined size the sizing members 185 and 190 are swung automatically to the position shown by full lines in Fig. 39 while the package P remains in contact with the drive-roll 10. Should the operator attempt to restart the winding operation without first doffing the completed package P and replacing it with a fresh cop-tube C, depression of the starting-handle 206 will act through the mechanism described above to momentarily shift the driving elements to winding position and the members 185 and 190 will assume the positions indicated by dash lines in Fig. 39. When the starting-handle 206 is released, however, the parts will immediately return to the position shown in full lines in Fig. 39 with the arm 200 engaging the abutments 69 and 75 to arrest the rotation of the drive-roll 10.

*Yarn-supplying means*

As before explained, the yarn feeds to the winding mechanism from a suitable source of supply arranged below the mechanism. Referring first to Fig. 1 of the drawings, the yarn-strand y is drawn upwardly from one of a plurality of supply-bobbins s and s' which may be impaled on suitable skewers or spindles, not herein shown. The supply-spindles are mounted in substantially erect position on a holder 225 supported from the leg 4 of the machine-frame 2 by means of a bracket 226. In the present drawings, a pair of supply-bobbins s and s' are shown with the yarn y leading upwardly from one of the bobbins, for example, that designated by the reference character s, and passing through a combined yarn-tensioning and slubbing device indicated generally at 230 in Figs. 1, 3, 51 and 55, inclusive. The yarn y', which leads from the other supply-bobbin s' constitutes a reserve strand which is held within the device 230 in readiness for automatically replacing the first strand y when its supply is exhausted.

The device 230, shown in detail in Figs. 51 to 63, comprises a substantially rectangular frame 231 having forward and rearward crossbars 232 and 233 connected by sides 234 and 235. As shown in Fig. 1, the frame 231 is carried by a bracket 228 fastened to a horizontal bar 229 extending longitudinally of the machine. Held in a boss 236 adjacent the forward end of the frame 231 is an upright stud or spindle 237 on which a pair of tension-disks 238 and 239 are mounted. The supply-strand y is arranged to feed upwardly from the supply-bobbin s through the flaring mouth or re-entrant notch 240 in a guide-plate 241 fastened to the forward cross-bar 232 of the frame 231. After passing through the notch 240 and between the tension-disks 237 and 238 the strand y leads across the top of a detector-plate 244 having a series of slots or openings 245 therein, see Figs. 51, 55 and 57. The detector-plate 244 is secured to the opposite site sides 234 and 235 of the frame 231 by screws 246. From the detector-plate 244 the yarn-strand y leads between the upper and lower plates or blades 247 and 248 of a slub-catcher 250. The lower blade 248 of the slub-catcher 250 is fixedly secured to the rearward cross-bar 233 of the frame 231 by screws 251, see Fig. 55, while the upper blade 247 is mounted to adapt it for adjustment on a member 252 by a screw 253 passing through a slot in the blade, see Figs. 60 and 61. The member 252 is pivotally mounted on a pin 254 extending between spaced ears 255 on the frame 231, see Figs. 55 and 60, and is adapted to be swung upwardly to the position illustrated in Fig. 61 to open the slub-catcher in the manner and for a purpose as explained hereinafter. Held in suitable lugs 257, see Fig. 62, at the rear of the frame 231 is a horizontal guide-rod 258, the lower surface of which is positioned in horizontal alinement with the opening between the slub-catcher blades 247 and 248. The rod 258 has its end portion bent upwardly to provide a vertical finger or guide 259, see Fig. 51, against which the yarn-strand y bears when being drawn upwardly to the winding mechanism by the end-finding mechanism. The strand y is adapted to slide down the side of the guide 259 and laterally under the rod 258 to be automatically threaded between the slub-catcher blades 247 and 248, the corners of the blades being chamfered to provide a re-entrant opening 260 therebetween. One or more guides 262 may be provided on the frame 231 for guarding against displacement of the yarn-strand. A guard-wire 263 having a horizontal portion 266 fastened at its end in an upright arm 264 on the side of the frame 231 is curved downwardly as indicated at 267 and then bent rearwardly and folded back on itself in a loop to extend forwardly in a portion 268. The portion 268 is curved upwardly and laterally as shown at 269 to overlie the notched plate 241, this extremity of the wire 263 being held in a boss on an arm 265 projecting forwardly from the frame 231. In threading the yarn through the device the strand is passed through the notch 240 of the plate 241, over the wire 263 and drawn downwardly along the upright guide 259. As the strand is drawn in under the guide-rod 258 it will slide along the curved portion 269 of the wire 263 and be threaded automatically into position between the tension-disks 238 and 239 and between the edges of the slub-detector blades 247 and 248.

The arm 102 of the detector-member 103, previously described, normally lies in parallel relation to and adjacent the guide-rod 258 to adapt the yarn-strand y to pass thereover to normally maintain the detector-member depressed in the position shown in Fig. 3. The arm 102 overlies a curved lever 271 carried by an angular bail-wire 272. The lower horizontal portion of the bail-wire 272 is pivoted in bearings 273 at the rearward end of the frame 231, see Fig. 55, and is provided at its end with a laterally-extending finger 275 shown in Fig. 51. The bail 272 is normally held in the positon shown in Figs. 3 and 51 against a stop 276, see Fig. 55, by means of a spring 277 coiled around the wire with one end bearing against the rearward end of the frame 231 and its opposite end engaging the under side of the bail. When the yarn-strand is broken and its end is retrieved by the end-finder at the slub-catcher and drawn upwardly to the winding mechanism, as later set forth, the detector-member 103 is swung downwardly in the manner explained previously. The arm 102 of the detector-member 103 will thus engage and depress the lever 271 against the force of the spring 277 to cause the bail-finger 275 to draw the yarn downwardly in a loop whereby to take up the slack therein until the winding operation is restarted. As the winding operation is started the detector-member 103 will be swung upwardly to release the bail-wire 272 to allow it to return to the position shown in Fig. 3 under the action of the spring 277.

Referring now to Figs. 53, 55, 56, 57, 60 and 62, a shaft 280 is journaled in bearing-bosses 281 and 282 at the forward and rearward ends of the frame 231. The shaft 280 projects beyond the rearward end of the frame 231 and is bent upwardly in a finger 283. Secured to the shaft 280 by means of a set-screw 279, see Fig. 56, is a detector-frame 285 constructed from sheet-metal with ears 286 pierced with holes for receiving the shaft. The detector-frame 285 is provided wth a series of fingers 288 slightly less in width than that of the openings 245 in the detector-plate 244. The frame 285 is also provided with a weighted transfer-arm 290, see Fig. 56, which carries a pin 289 for pivotally supporting a yarn-gripping element 291. The yarn-gripper 291, constructed from spring-metal, is provided at its lower end with an ear 292. A sheet-metal strip 294 soldered or otherwise fastened to the face of the arm 290 is formed with an ear bent laterally and sharpened along its lower end to form a knife 295.

The detector-frame 285 is normally held in the position shown in Figs. 51, 55 and 56 with its arm 290 elevated. In this position the ear 292 of the yarn-gripper 291 bears against the end of an arcuate abutment 296 fastened to the frame 231 and acting to apply tension to the gripper. With the arm 290 in raised position the reserve strand y' may be applied thereto in the manner as next explained. The strand y' is drawn upwardly from its supply-bobbin s', passed across the forward end 269 and straight portion 268 of the guide-wire 263. The end of the strand y' is then entered through the flaring or re-entrant opening between the members 294 and 291 and drawn downwardly beneath the knife 295. Then by drawing the strand y' upwardly its end may be severed at the knife 295. The reserve yarn-strand y' may thus be securely gripped between the fixed member 294 and the resilient member 291 where it assumes the position illustrated in Figs. 51, 55 and 56. The two supply-strands y and y' may be separated below the device 230 by means of a plate 278, see Fig. 1, so that they will not interfere, one with the other, during their delivery to the tension and slubbing device.

The yarn-holding arm 290 is normally maintained in the position shown by full lines in Fig. 56 by a detent-lever 298, shown in detail in Fig. 62, which cooperates with the finger 283 at the end of the shaft 280. The detent-lever 298, which is in the form of a bell-crank, is pivoted on a stud 299 held in a standard 300 fastened to the rearward end of the frame 231. The lever 298 has a laterally-projecting latch-finger 301 at the end of its horizontal arm, see Fig. 62, against which the finger 283 on the shaft 280 normally bears due to the weight of the arm 290 and detector-fingers 288. The lever 298 is urged in a direction to maintain its latch 301 in engagement with the side of the finger 283 by means of a spring 302 coiled around a screw 303 with one end bearing against a lug 304 on the standard 300 and its opposite end hooked through an opening 305 in the vertical arm 306 of the lever.

The detent-lever 298 is operated when the winding strand y is broken or its supply is exhausted to release the shaft 280 whereof to permit the detector-fingers 288 and arm 290 to swing downwardly. This is accomplished by means of a lever 307, see Fig. 55, pivoted on a pin 308 extending vertically through ears 309 on the standard 300. Projecting laterally from the side of the lever 307 is a curved wire finger 310, see Fig. 63. The detent-elements last described normally assume the position shown in Figs. 62 and 63, but when the yarn-strand y is broken or its supply is exhausted an end-finder 325, indicated in dash lines in Fig. 63 and described later, swings downwardly to position its end or nozzle in close relation to the device 230 to adapt it to retrieve the broken end of the winding strand y or, in other instances, to pick up the end of the reserve strand y'. During this movement of the end-finder 325 an extension or ear 501 on the latter will engage the lever 307 and rock it on its pivot 308. Pivotal movement of the lever 307 in this manner will cause its finger 310 to rock the bell-crank lever 298 to the position indicated by dash lines in Fig. 62 to disengage its latch 301 from the side of the finger 283 and permit the shaft 280 to rock. The arm 290 and the detector-fingers 288 will thus be released to rock downwardly. Breakage of the winding strand y occurs at the slub-catcher in most instances, due to the presence of slubs or enlargements thereon, so that the yarn-strand remains positioned across the top of the detector-plate 244 and as the detector-fingers drop they will engage the strand in the manner indicated in Figs. 52 and 58. Due to the slight clearance between the sides of the detector-fingers 288 and the sides of the openings 245 in the plate 244 the strand acts as a stop to prevent the fingers from rocking through the openings. When the yarn-supply is exhausted, however, the detector-fingers 288 are free to descend through the openings 245 to the position shown in Figs. 54 and 59. This latter movement of the detector-fingers 288 will cause the shaft 280 to rock sufficiently to swing the transfer-arm 290 carried thereby to the position illustrated in full lines in Fig. 54 and indicated by dash lines in Fig. 56. The end of the reserve strand y' thus will be positioned in the path of movement of the end-finding nozzle 326, indicated by dash lines in Fig. 53, to adapt it to be picked up thereby and substituted for the strand $y$. As the transfer-arm 290 descends to the position shown in Fig. 54 and indicated by dash lines in Fig. 56 the ear 292 of the yarn-gripper 291 will move away from the abutment 296 and the tension of the gripper against the strand will be relieved so that the end-finder 325 may retrieve the end of the strand from the transfer-arm 290 and draw it into the nozzle 326 by suction.

Means are provided for resetting the transfer-arm 290 after the end-finder has retrieved the end of the strand. This means comprises a resetting-frame 312 having ears 313 pivoted on the shaft 280, see Fig. 57, and provided with a resetting-arm 314 projecting upwardly at an angle. The frame 312 also has a curved horizontal arm 315, the outer end of which is received in a vertical slot 318 in the side 234 of the frame 231. Referring to Fig. 56, an ear 317 constructed integral with the frame 231 is formed with a slot 322 in which the arm 290 is adapted to slide during its pivoting movement. The rearward ear 313 of the resetting frame 312 engages a set-screw 311 in the side 235 of the frame 231, see Fig. 57, to limit the downward swinging movement of the resetting frame.

As the end-finder nozzle 326 is swung into position adjacent the slub-catcher 250 as indicated by dash lines in Fig. 53 it will engage the arm 314 to rock the arm 315 upwardly to cause the strand $y$ or $y'$ to be raised to a position closely adjacent the mouth of the nozzle. After the arm 290 has descended to position the reserve strand $y'$ in the path of the end-finder nozzle 326 and the strand has been retrieved thereby, the tilting action of the frame 312 will cause the end of the slot 322 in the ear 317, see Fig. 56, to engage the arm 290 and raise it to the position shown in Figs. 51 and 53. By this action the shaft 280 is rocked to raise the detector-fingers 288 above the plate 244 and the finger 283 on the shaft is reengaged with the spring-pressed latch 301.

A hook-shaped leg 319, see Figs. 53 and 55, which depends from the resetting frame 312 is adapted to engage the rim of the upper tension-disk 238 to raise the latter slightly to relieve the tension exerted on the broken yarn-strand so that the end-finding nozzle 326 may readily pick up the strand. When a strand is broken at the slub-catcher the slub or enlargement on the yarn is caused to wedge in between the blades 247 and 248 as shown in Fig. 52 and the present invention provides means for opening the slub-catcher so that the end of the strand is released thereby to adapt it to be picked up by the end-finder 325. Referring to Figs. 60 and 61, the rearward ear 313 of the resetting-frame 312 is provided with an extension in the form of a cam 320. The cam 320 normally underlies an abutment 321 mounted for adjustment on the side of the upper slub-catcher blade holder 252 and when the frame 312 is rocked to reset the mechanism, as explained above, the cam 320 will engage the abutment and swing the blade 247 upwardly on its pivot 254 to displace its edge away from the blade 248 as shown in Figs. 53 and 61 so as to free the end of the strand.

After a reserve strand $y'$ has replaced an exhausted winding strand $y$ the operator has only to remove the empty supply-bobbin $s$ or $s'$, as the case may be, and replace it with a full bobbin. The strand from the fresh supply, which then constitutes the reserve strand $y'$, is drawn upwardly and its end attached to the transfer-arm 290 in the manner as explained above.

End-finding and uniting means

Referring now to Figs. 1, 2, 3, 20, 25 to 28 and 35, the end-finding means comprise a curved suction-tube 325 which is mounted on a traveling carriage 328. The carriage 328 is mounted on a reciprocable and rockable shaft 329 supported to slide in bearings 330 on the brackets 5 and in bearings 331 adjacent the end of the machine frame. The bearings 331, see Figs. 64 and 65, are formed at the outer end of the arms 332 projecting horizontally from standards 333 bolted to the machine-bed 3. The shaft 329 may extend along the entire length of the machine to support and operate a series of the end-finder carriages 328, one for each winding unit. The shaft 329 is arranged to be continuously reciprocated and oscillated by means of a cam-drum 335 which is fast on a shaft 336 journaled in bearings 337 at the upper ends of the standards 333 as shown in Figs. 64 and 65. The shaft 336 may be driven from a suitable electric motor, not herein shown, or connected through gearing or the equivalent to the main drive of the machine; and preferably the shaft is rotated at a relatively slow rate of speed. The shaft 329 carries a crosshead 338 which is slidable on guide-rods 339 extending between the arms 332 of the two standards 333. The crosshead 338 has a roller or cam-follower 340 engaging in a cam-groove 342, to be described later in detail, formed in the periphery of the drum 335. Rotation of the cam-drum 335 acts to reciprocate the crosshead 338 and thereby the shaft 329 longitudinally of the machine. As shown in Figs. 64 and 65, an arm or lever 343 has an elongated sleeve-like hub 344 mounted on the shaft 329 and journaled in the left-hand bearing 331. The hub 344 is held in place in the bearing 331 by a collar 334 secured thereto in abutting relation to the side of the bearing. At the end of the arm or lever 343 is a roller or cam-follower 345 which engages a cam-groove 346, to be later described in detail, formed in the end face of the cam-drum 335, see Fig. 65. The hub or sleeve 344 of the lever 343 is provided with a key 347 engaging in a relatively long keyway 348 in the shaft 329 so that when the cam-drum 335 is rotated oscillating motion will be imparted to the shaft by the lever.

The end-finder carriage 328 shown most clearly in Figs. 20 to 23 and 25 to 28, comprises a hub or sleeve-portion 350 which surrounds the shaft 329 and is provided with a depending tubular portion 351 formed integral therewith as shown in Fig. 20; or it may be secured to the side of the hub for adjustment thereon as shown in Fig. 13 by means of screws 352 passing through slots in a flange 353 of the tubular portion and screwed into holes in the side of the hub. The lower end of the tubular-portion 351 of the carriage 328 is suitably connected to a flexible, armored suction-hose 355. The hose 355 is connected with a vacuum tank, not herein shown, through the means of a valve to be described later. Journaled for rotation on the carriage 328 is a pinion-gear 357, see Figs. 25 and 26, having its hollow hub or sleeve-portion 356 fitted to turn in the tubular portion 351 of the carriage as shown in Fig. 20. The lower end of the curved end-finding tube 325 is fitted within the upper end of the hub 356 and secured thereto by soldering or welding as shown at 358 in Fig. 20. As shown in Figs. 3, 20 and 25 the pinion 357 is held in place on the carriage 328 by means of an overlying retainer-plate 359 fastened to the top of the carriage by screws 360. The plate 359 has an upstanding flange 361 at its forward end employed for a purpose to be explained later.

A leaf-spring 363 having one end fastened to the rearward screw 360 has a central hole through which the hub of the pinion 357 projects and at its outer end is a key 364 formed with gear-teeth 365 normally engaging the teeth of the pinion to prevent rotation of the latter. The key 364 which projects downwardly through an opening in the plate 359 is adapted to be released from engagement with the pinion 357 to permit rotation of the latter and the suction-tube 325 connected thereto.

Fastened at its ends to the spaced bearing-brackets 5 is a flat bar 367 which, as shown in Figs. 1, 2, 25 and 26, is provided with a series of rack-teeth 368 on its rearward edge. The end-finding carriage 328 is positioned adjacent the right-hand bracket 5 as shown in Figs. 25 and 29 during the winding operation, but when the winding strand is broken or its supply is exhausted the carriage is keyed or latched to the reciprocating and oscillating shaft 329 to move the end-finder toward the left as viewed in Fig. 25. When the carriage 328 reaches a position opposite the rack-teeth 368 on the bar 367 it is rocked with the shaft 329 to the position illustrated in Figs. 26 and 35 to engage the teeth of the pinion-gear 357 with the teeth on the rack-bar. During this rocking movement of the carriage 328 the toothed key 364 will be engaged with the upper surface of the rack-bar 367 to release it from the teeth of the pinion 357 as shown in Fig. 35. As the shaft 329 continues to move toward the left the pinion-gear 357 will be rotated, due to its engagement with the rack-bar 367, so as to swing the end-finder tube 325 forwardly until its end or nozzle 326 is positioned adjacent the combined yarn-tension and slub-catcher device 230 as indicated by dash lines in Figs. 26 and 53. After the end of the yarn-strand y or y' has been retrieved by the end-finder nozzle 326 the direction of longitudinal and oscillating movement of the shaft 329 is reversed to return the carriage 328 to its initial position.

Referring now to Figs. 20 to 24, inclusive, a latch-pin 370 mounted for sliding movement in a radial hole in the hub 350 of the carriage 328 is formed with a pair of spaced peripheral flanges 371. A lever 372 pivotally mounted on a pin 373 held in spaced ears 374 on the hub 350 has a forked end 375 straddling the sides of the latch-pin 370 between the flanges 371. The latch-pin 370 is urged upwardly to maintain its end bearing against the periphery of the shaft 329 by means of a spring 376, see Fig. 21, coiled around a pin 377 on the hub 350 of the carriage 328 and bearing against the rearward arm 378 of the lever 372. The lever 372 has a depending arm 379 provided with a detent-finger 380 projecting downwardly through a rectangular opening 382 in a detent-plate 383. The detent-plate 383, preferably constructed from spring-metal, is fastened at one end to an angular bracket 384 supported from the right-hand frame-bracket 5. The bracket 384 has an edge or shoulder 385, see Fig. 24, against which the detent-finger 380 engages when positioned in the opening 382 so as to limit the swinging movement of the carriage 328 in clockwise direction as viewed in Fig. 20.

The detent-plate 383 has its free end bent downwardly at an angle to provide an inclined surface 386, see Fig. 21. The bracket 142, previously described as carried by the hub 77 of the clutch-shifting member 78, has a forwardly-extending arm 388, shown in Fig. 24, which is offset at its end and chamfered on one side to provide a cam-face 389.

The end-finder operating shaft 329 is provided with a keyway 391, see Fig. 21, having its bottom sloping radially outwardly at one end as shown at 392 and its opposite end merging into a deeper laterally-elongated opening or recess 393 shown in Figs. 25, 26 and 28. During the winding operation the inner end of the latch-pin 370 rests against the periphery of the shaft 329 as shown in Figs. 20 and 21. When the yarn-strand is broken the clutch-shifting member 78 is slid into position to reverse the direction of rotation of the drive-roll 10 in the manner previously explained and during this sliding movement of the clutch-shifting member the cam-face 389 on the arm 388 engages between the bracket 384 and the inclined face 386 of the detent-plate 383 to pry the latter downwardly as shown in Figs. 22, 23 and 24. In this manner the edge 394 of the opening 382 in the detent-plate 383 is disengaged from the end of the detent-finger 380 as shown in Fig. 22. When the shaft 329 is moved toward the right as viewed in Fig. 2 and rocked into position for the latch-pin 370 to register with the opening 393 the latch-pin will be projected thereinto under the action of the spring-pressed lever 373 as shown in Fig. 22 to couple the end-finder to the shaft. When the longitudinal movement of the shaft is reversed the end-finder being latched thereto, is carried therewith toward the left.

Figure 67A:
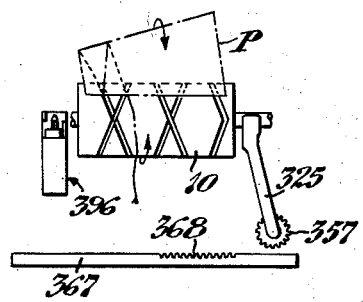
Figure 67B:
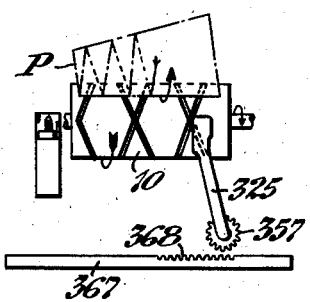
Figure 67C:
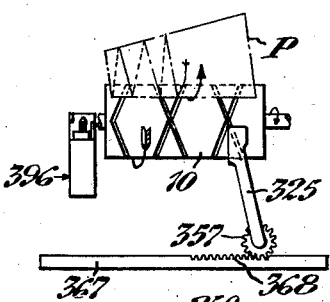

After the end-finder 325 has retrieved the end of the broken winding strand or the end of the reserve strand, as the case may be, and has been returned to initial position adjacent the right-hand bearing bracket 5 the shaft 329 is rocked to swing the nozzle 326 to the position shown in Fig. 67c. The end-finder 325 is moved longitudinally of the winding unit to adapt its nozzle to traverse the full length of the winding package P, see Fig. 31. It will be noted that since the opening or recess 393 in the shaft 329 is much longer than the diameter of the latch-pin 370 the latter has a limited lateral movement relatively of the shaft. The flexible tube or hose 355 curves downwardly and rearwardly, as illustrated in Fig. 1, and when suction or vacuum is created therein the helical convolutions of its armored covering are caused to contract or draw together. The curved portion of the armored hose 355 thus has a tendency to straighten and under this influence the upper end of the hose is urged outwardly or forwardly. Due to this provision the end-finder 325 will be rocked relatively of the shaft 329 to cause its nozzle 326 to press lightly against the package P whatever the diameter of the latter may be and to follow the contour of the package when the latter extends at an angle to the axis of the drive-roll 10 as in the case of a conical package. The suction in the tube 325 also acts to draw its nozzle 326 lightly against the package so that it may retrieve the end of the strand without any tendency to abrade the yarn on the surface of the package.

As the end-finder traverses the package P the latter is rotated in unwinding direction and the end of the strand is drawn off from the surface of the package and into the tube 325. When the end-finder reaches the left-hand end of the package P as shown in Fig. 32 it is rocked forwardly to the position shown in Fig. 33. The end-finder is then moved further toward the left by the shaft 329 and swung rearwardly to the position shown in Fig. 34 to carry the two ends of yarn through a strand-uniting device or knot-tier indicated generally by the reference character 396.

The knot-tying device 396 may be of any suitable type and the device herein shown is of substantially the same construction as that described in United States Letters Patent No. 2,071,525, issued February 23, 1937, to Frank W. Higgins et al. A detailed description of the knotter is therefore unnecessary. Suffice it to state that the knot-tier comprises opposite tension-plates 403 between which the two yarn-strands are drawn by the end-finder 325 into position to be operated upon by a tying-bill 397, see Figs. 31 and 34. The tying-bill is operated from a shaft 398 which carries a gear 399 in meshing engagement with a gear-segment 400, shown in Figs. 1, 36 and 37, rockably mounted on a stud 401 fast in a bracket attached to the frame-bracket 5, see Fig. 2. The gear-segment 400 has a depending tailpiece 402 with its lower end positioned adjacent the upper surface of the operating shaft 329. As the carriage 328 approaches the limit of its traversing movement toward the knotter 396 an abutment 404 positioned at the inner end of a slot 405 in the carriage hub 350 will engage the tailpiece 402 to rock the latter downwardly into a recess 406 in the shaft 329 as shown in Fig. 36. A curved abutment 407, shown in Figs. 28, 36 and 37, is fastened to the left-hand bracket 5 in position to engage the detent-finger 380 on the lever 372 carried by the carriage 328 so as to tilt the lever slightly to the position illustrated in Fig. 37 against the action of the spring 376. The end of the latch-pin 370 thus will be released from the opening 393 in the shaft 329 and caused to enter the keyway 391. As the shaft 329 continues its movement toward the left it is rocked slightly and through the engagement of the latch-pin 370 with the keyway 391 the carriage 328 and suction-tube 325 will be rocked to properly position the two yarn-strands in the knot-tier 396. Referring to Figs. 26, 27, 28, 36 and 37, an arcuate plate 408 having a detent projection 409 at its lower end is fastened to the left-hand bracket 5. The plate 408 cooperates with the side of the bracket 5 in providing a guideway or channel, see Fig. 36, into which a lug 410 on the carriage 328 is entered as explained later. As the shaft 329 continues its movement toward the left the gear-segment 400 is rotated through a part of a revolution and due to its meshing engagement with the gear 399 the latter will be rotated. Rotation of the gear 399 and shaft 398 causes actuation of the tying-bill 397 to tie the two ends of the yarn-strands together, and a yarn-severing means, indicated generally at 412 in Fig. 31, acts to sever the ends of the yarn projecting from the tied knot. The released severed ends of the yarn-strands are drawn into the suction-tube 325 and through the hose 355 to the vacuum-tank, not herein shown.

After the two yarn-strands are retrieved and united in the manner explained above the operation of the various parts is reversed. That is to say, the shaft 329 is rocked to swing the suction-tube 325 forwardly and then moved longitudinally to return the gear-segment 400 to inoperative position and restore the end-finder to initial position adjacent the right-hand frame-bracket 5 as shown in Figs. 1 and 2. As the carriage 328 approaches this latter position it will act to rock the frame-member 122 by the engagement of its pin or follower 165 with the cam 150 on the member 122, see Fig. 18. As before explained, tilting of the member 122 acts to slide the clutch-shifter 78 toward the left to engage the clutch-members 40 and 22, see Fig. 8, and cause the package P to be driven in winding direction. Shifting of the member 78 in this manner also withdraws the bracket 384 from engagement with the detent-plate 383 and the latter is caused to spring upwardly to the position shown in Fig. 21. As the operating shaft 329 continues its movement toward the right the end of the detent-finger 380 will ride against the inclined face 386 of the detent-plate 383 and finally snap into position in the detent-opening 382. When the shaft 329 again starts its movement toward the left it will act to move the carriage 328 in the same direction until the detent-finger 380 is engaged with the edge of the opening 382 at which time the lever 372 will be rocked to withdraw the upper end of the latch-pin 370 from the opening or recess 393 in the shaft. In this manner the carriage 328 will be disconnected from the shaft 329 and caused to remain in inoperative position adjacent the right-hand frame-bracket 5 until the winding strand is broken again or its supply is exhausted.

The latch-pin 370 fits relatively loosely in the opening 393 of the shaft 329, and therefore means are provided for rocking the carriage 328 on the shaft to insure that the detent-finger 380 will positively enter the detent-opening 382. Preferably, this means consists in an abutment or finger 411 fastened to the right-hand bearing bracket 5, see Figs. 25, 26, 29 and 30, and formed with an offset portion having a beveled or wedge-shaped end. The beveled end of the finger 411 is adapted to engage the upper surface of the plate 359 to swing the carriage 328 in counterclockwise direction, as viewed in Fig. 20, with the side of the detent-finger 380 bringing up against the edge 385 of the bracket 384 as shown in Fig. 24. It is also necessary that the carriage 328 be prevented from rocking on the shaft 329 during the time that its pin 165 is in engagement with the cam-faces 126 and 151 on the frame-member 122. This is accomplished by means of pins 413 and 414, see Figs. 2 and 25, projecting upwardly from the rack-bar 367 and engageable with the under side of the plate 359 of the carriage.

Referring particularly to Figs. 21, 22 and 23, a leaf-spring 415 attached to the right-hand bearing-bracket 5 has its free end overlying the shaft 329 and bent into V-shape to provide a detent-portion 416. The detent 416 is adapted to engage across the side of the abutment 404 on the carriage 328 when the latter is in its inoperative position adjacent the right-hand bracket 5 as shown in Fig. 21. As before explained, when the yarn-strand y is broken or its supply is exhausted the detent-finger 380 is released from the opening 382 in the detent-plate 383. Should this happen during the movement of the shaft 329 toward the left the carriage 328 would be moved in this direction as caused by the frictional engagement of its spring-pressed latch-pin 370 with the periphery of the shaft. The spring detent 416 will act to resist such movement of the carriage 328 until the end of the latch-pin 370 enters the opening 393 in the shaft 329. When the latch-pin 370 enters the opening 393 and the shaft 329 starts its movement toward the left the spring 415 will yield to release the abutment 404 and permit the carriage 328 to move with the shaft.

Suction-controlling means for end-finder

Referring to Fig. 1, the lower end of the flexible suction-hose 355 is joined to an offset branch 421 of a valve 420. The valve 420 is fastened to the flange 422 of a T 423 by means of studs or bolts 424, see Figs. 48 and 49. The T 423 is jointed to a pipe or header 425 extending longitudinally beneath the several winding units and connected to a vacuum-tank from which air is exhausted by means of a suction pump; these last-mentioned parts not being shown herein as they may be of any usual arrangement. Pivoted on one of the studs 424 is a shutter or valve-closure 427 having an opening 428 adapted to register with similar openings 429 in the flange 422 and branch 421 when the shutter is rocked downwardly from the position shown in Fig. 48 to that shown in Fig. 49. Stop-shoulders 430 and 431 on the valve-closure 427 are adapted to engage one or the other of the two studs 424 to limit the swinging movement of the closure in either direction.

Referring to Figs. 3, 13, 43 and 44, a bracket 433 fastened to the top of the bed 3 has a bearing 434 which is slotted to receive a bell-crank lever 435. The lever 435 is pivoted on a pin 436 held in the sides of the bearing 434 and extending across its slot. The end of the horizontal arm 437 of the lever 435 is slotted to engage the upper hooked end of a connecting link 438, the lower end of which is hooked through a hole at the outer end of an arm 439 projecting radially from the valve-closure 427, see Fig. 48. As shown in this latter view the link 438 is constructed in two sections joined together by a turnbuckle 440 to provide for adjusting its length. A spring 442 coiled around the link 438 has one end bearing against the turnbuckle 440 and its other end engaging against the under side of the bed 3 so that it tends to force the link 438 downwardly to the position shown in Fig. 48 to maintain the valve-closure 427 in closed position. The valve 420 is opened by rocking the bell-crank lever 435 by engagement therewith of the abutment 75, previously described as carried by and rotated with the sleeve 74 on the shaft 65, see Fig. 44. The abutment 75 is adapted to engage the upper end of the vertical arm 443 of the bell-crank 435 after the sleeve 74 is shifted axially due to breakage of the yarn-strand or exhaustion of its supply.

The bell-crank lever 435 normally assumes the position illustrated in Figs. 3 and 13 with the lower edge of its arm 437 resting against the rearward arm 446 of a detent-lever 445. The detent-lever 445 is pivoted on a stud 447 held in a ledge or shelf 448 on the bracket 433. At the end of the rearward arm 446 of the detent-lever 445 is an upstanding lug 450 provided with a shouldered latching-seat or rest 451, see Figs. 44 and 47. The forward arm 452 of the lever 445 is curved upwardly with its end slotted to receive a pawl or finger 453 pivoted on a pin 454 extending across the slot. The detent-lever 445 is urged to rock in counterclockwise direction, as viewed in Figs. 43 and 45, under the action of a leaf-spring 455 attached to the side of the shelf 448 with its free end engaging the side of a lug or boss 456 on the under side of the lever.

When the rotating sleeve 74 is shifted axially to the position shown in Figs. 5 and 16 its abutment 75 will engage the arm 443 of the bell-crank lever 435 to rock the latter from the position illustrated in Figs. 3 and 13 to that shown in Fig. 44. The arm 437 of the lever 435 thus will be raised and through the link 438 the valve-closure 427 will be rotated to the position shown in Fig. 49 to open the valve to cause vacuum to be created in the hose 355 and suction-tube 325. During this rocking movement of the bell-crank lever 435 the detent-lever 445 will be rocked in clockwise direction, as viewed in Fig. 45, under the action of the leaf-spring 455 to carry its rest or seat 451 in under the lower edge of the arm 437 of the lever 435 as shown in Fig. 46 to maintain the valve open during the end-finding and knot-tying operations.

A sheet-metal striker or bunter 458 on the rearward side of the end-finder carriage 328 has an inclined end portion as shown in Figs. 44 and 50 to adapt it to slide in under the pawl 453 as shown in Fig. 50 to rock the latter upwardly on the detent-lever 445 near the end of the traversing motion of the carriage toward the knot-tier 396. As the end-finder 325 is rocked to the position shown in Fig. 34 to carry the ends of the strand through the elements of the knotter 396 the pawl 453 will rock downwardly to the position indicated by full lines in Fig. 44. After the ends of the strand have been united the carriage 328 is rocked by the shaft 329 to cause the inner edge of the bunter 458 to press against the end of the pawl 453. Due to this action the detent-lever 445 will be rocked in clockwise direction, as viewed in Fig. 45, to remove its seat 451 from under the lower edge of the bell-crank lever 435. When the bell-crank lever 435 is released in this manner the link 438 will be forced downwardly by the spring 442 to rock the valve-closure 427 to the position shown in Fig. 48 so as to close the valve and thereby disconnect the suction-tube 325 from the source of vacuum. In the meantime the clutch-shifting mechanism will have been actuated to neutral position to maintain the drive-roll 10 inoperative and the abutment 75 out of alinement with the arm 443 of the bell-crank lever 435 so that the valve 420 will remain closed until the yarn-strand is broken again or its supply is exhausted.

Yarn-controlling means

It is essential that the yarn-strands be kept under control during the end-finding and knot-tying operations. That is to say, the strands must be guarded against catching in the operating parts of the machine or from sliding off and drawing across the ends of the winding package. It is also desirable that the strand be maintained relatively taut following the knot-tying operation so that it will be taken up by the winding package without sudden strain on the yarn.

Referring to Fig. 1 of the drawings, a guard-element 465 having a forked end is fastened to the right-hand bearing bracket 5. When the winding strand is broken or its supply is exhausted its free length trailing from the package P is apt to fly upwardly and toward the right as viewed in Fig. 1. In such event the guard-element 465 will act to catch the strand to prevent it from moving beyond the right-hand end of the package P.

Means are also provided for preventing the yarn-strand from becoming displaced beyond the left-hand end of the package P and uncoiling from the package as it is taken up by the end-finder 325 and carried into the knotter 396. This means consists in a bifurcated member 467, see Figs. 31 to 34, pivotally mounted on a stud 468 held in a shelf 469 carried by the knot-tying device. The member 467 is provided with a notch 470 and a rearwardly-extending curved arm 471 which terminates in an upstanding finger 472. The member 467 is formed with a shoulder 473, see Fig. 31, maintained in engagement with a stop-lug 475 on the shelf 469 by means of a spring 476 having one of its ends held in a hole in the shelf. The spring 476 is coiled around a screw 477 on the shelf 469 with its free end engaging the side of the member 467 to maintain the latter normally in the position shown in Fig. 31.

After the end-finder 325 has retrived the end of the broken yarn-strand or the end of the reserve strand it is traversed along the package as the latter rotates in unwinding direction. During the travel of the suction-tube 325 along the package P its nozzle 326 acts to retrieve the free end of the strand on the package, see Fig. 31. As the suction-tube 325 approaches the end of the package P the flattened side of its nozle 326 will engage the upstanding finger 472 of the member 467 to rock the latter against the action of the spring 476 to move it to the position shown in Fig. 32. It will be noted by reference to this latter view that the yarn-strand y extending from the slub-catcher 250 to the nozzle 326 is carried into the notch 470 of the member 467. After the end-finder 325 has completed its traverse along the package P and retrieved the end of the strand thereon, the shaft 329 will be rocked to swing the nozzle 326 forwardly to the position shown in Fig. 33. During this latter movement the finger 472 will ride off from the end of the nozzle 326 and be returned to initial position under the action of the spring 476 to engage the strand leading from the package P to the nozzle. The strand is thus caused to loop around the finger 472 as shown in Fig. 33 so that as the package continues to rotate in unwinding direction the coils of yarn thereon will be prevented from sliding off or falling over its end in loose loops or what are known as "stitches." The end-finding nozzle 326 is next shifted from the position shown in Fig. 33 to that indicated in Fig. 34 to carry the two ends of yarn through the knot-tying device 396. During this movement the two yarn-strands are held under control and guided in the notch 470 and by the finger 472 of the member 467 as indicated in Fig. 34.

After the ends of the two yarn-strands have been united, the ends from the knot severed and the unitary strand released by the knotter there may be considerable slack in the yarn. To take up this slack in the strand another thread-engaging member or "anti-stitch" hook 480 is provided. The hook 480 is pivoted on a stud 481 in the upright portion of the plate 359 of the carriage 328, see Figs. 3, 29 and 30. The anti-stitch hook 480 is provided with a curved outer end 482 and a shoulder or yarn-engaging edge 483 adjacent thereto. The member 480 is also formed with a notch 490 for receiving the yarn-strand in a manner explained later. A spring 485 on the plate 359 engages the lower edge of the member 480, tending to normally rock the latter in clockwise direction as viewed in Fig. 30, and a shoulder 486 on the member is adapted to engage against a stop-pin 487 to limit its movement in this direction.

Above the pivot-stud 481 the member 480 is formed with a curved flange 484. A sheet-metal bracket 488 fastened to the rack-bar 367 at its right-hand end is formed with a shelf 489. When the carriage 328 is moved toward the right, as viewed in Fig. 30, the flange 484 on the member 380 will engage the shelf 489 to cause the member to be rocked to swing its hook-shaped end downwardly to its inoperative position shown in Fig. 29.

During the traverse of the end-finder 325 toward the left to position the two yarn-strands in the knotter 396 the anti-stitch hook 480 will move with it in the same direction to cause the yarn-strand leading from the slub-catcher 250 through the notch 470 in the member 467 to ride over the curved end 482 of the hook. The yarn thus will be positioned in the notch 490 as shown by heavy dash lines in Fig. 30 and after the two strands are united by the knotter 396 and released therefrom the member 480 will be returned to initial position by the carriage 328. During this return movement of the parts the shoulder or edge 483 of the member 480 will engage the yarn-strand and shift it toward the right to the position shown by light dash lines in Fig. 30. In this manner the yarn-strand is prevented from riding over the left-hand end of the package P when the latter is again rotated in winding direction. In addition to guiding the yarn relatively to the package P the member 480 functions to take up the slack in the strand by forming a loop therein. When the member 480 arrives at the position indicated by the light dash lines in Fig. 30 its curved flange 484 will engage the under side of the shelf 489 of the bracket 488. Further movement of the parts in this direction will then cause the flange 484 to ride in under the shelf 489 to swing the member 480 downwardly against the action of the spring 485. This last-noted movement of the member 480 will release the yarn-strand to permit it to be taken up by the package P which starts to rotate in winding direction as the carriage approaches the end of its return traverse.

It has been explained previously that the bail-wire 272 also operates to take up slack in the yarn-strand. The bail-wire 272, see Figs. 3, 51 and 52, is operated by the detector-member 103 to cause it to swing downwardly to draw out a loop in the yarn-strand and to slide the strand downwardly along the upright portion 259 of the guide-rod 258. The detector-member 103 is held in position to maintain the bail-wire 272 depressed by the operation of detent-means described as follows. Referring to Figs. 25, 29 and 30, a sheet-metal bar or slide 493 is slidably mounted on the under side of the rack-bar 367 by means of studs 494. The studs 494 pass through elongated openings 495 in the slide 493 and are screwed into threaded holes in the rack-bar 367 with their heads abutting the under side of the slide. Between the head of one stud 494 and the under side of the slide 493 is a bowed leaf-spring 496, see Fig. 30, which functions to yieldingly maintain the slide in the positions to which it is shifted relatively of the rack-bar 367. The slide 493 is provided with upstanding fingers 497 and 498 at its opposite ends and adjacent its left-hand end, as viewed in Fig. 29, is a depending curved leg 500.

When the end-finder 325 is in inoperative position as shown in Fig. 29 the slide 493 will be restrained from movement by the leaf-spring 496. As the end-finder 325 approaches the left-hand end of the winding unit, the detector-member 103 will be shifted toward the left with the frame-member 107 and depressed, in the manner already explained; and as the end-finder continues its movement in this direction the edge of its plate 359 will engage the finger 497 on the slide 493 and shift the latter toward the left to position the end of its leg 500 above the detector-member 103 as shown in Fig. 30 so as to maintain the latter depressed and the frame-member 107 inoperative. When the end-finder 325 returns to initial position its plate 359 will engage the opposite finger 498 to shift the slide 493 to the position shown in Fig. 29 so as to withdraw its leg 500 from engagement with the detector-member 103. The member 103 then will be swung upwardly under the action of the counterweight 112 to engage the yarn strand leading upwardly to the package P as shown in Fig. 3.

*Method of operation of the complete winding unit*

Since all the several winding units of the machine are of the same construction and operate in the same manner, the method of operation of a single unit only is explained herein.

To prepare the winding unit for operation the arm 14 carrying the cop-holder 7 is swung upwardly and latched in the position illustrated in Fig. 41 by the engagement of the shoulder 187 on the sizing member 185 with the fixed detent-pin 194. With the arm 14 thus held in elevated position a suitable yarn-receiver, for example, a conical cop-tube C, is placed on the cop-holder 7. Supply-bobbins s and s' are placed on the supply-holder 225, shown in Fig. 1, and the end of yarn y from one bobbin, for example the bobbin s, is drawn upwardly from the supply and threaded between the tension-disks 238 and 239. The yarn y is then passed through the detector-device 244 and the opening in the slub-catcher 250, from which point it is led under the guide-wire 258, see Fig. 3, and across the lateral bar 102 of the detector-member 103. From the detector-member 103 the yarn-strand y is drawn upwardly to the winding spindle and its end attached to the cop-tube C in any suitable manner.

The reserve yarn-strand y' is drawn upwardly from the supply-bobbin s' and led across the forward and rearward portions 269 and 266 of the guide-wire 263, see Figs. 1 and 51. The end of the strand y' is attached to the transfer-arm 290 by drawing it down between the thread-gripping member 291 and the strip 294 where its projecting end is severed by the knife 295, see Fig. 56. As explained above, the yarn-strand y' constitutes a reserve held by the transfer-arm 290 in readiness for automatically replacing the strand y when the latter is broken or its supply is exhausted, the transfer-arm being held in the position shown in Fig. 51 to adapt it to receive the strand by the engagement of the ear 301 on the detent-lever 298 with the finger 283 on the shaft 280, see Figs. 55 and 62. With the shaft 280 thus held in latched position the detector-fingers 288 carried thereby are maintained elevated above the detector-plate 244 to permit the yarn-strand y to pass between the plate and fingers as shown in Fig. 55.

With the arm 14 in raised position the clutch-shifter 78 is in position to maintain both clutch-members 40 and 85 disengaged from the clutch-member 22 and the brake-shoe 90 in engagement with the member 22 as shown in Fig. 7 to prevent rotation of the drive-roll 10.

To start the winding operation, the operator simply depresses the starting-handle 206, see Fig. 42, to cause its rearward end 209 to tilt the arm 210 upwardly. The arm 210, acting through the shaft 211, will operate the resetting arm 215 to cause it to rock in counterclockwise direction as viewed in Fig. 42. During this rocking movement of the arm 215 its pin 218 will engage the lower edge of the knock-off member 190 so as to raise the latter and the cam-edge 216 at its upper end will act against the pin 219 of the sizing-member 185 to disengage the latter from the detent-pin 194 as shown by dash lines in Fig. 41. Consequently, the arm 14 will be permitted to swing downwardly under the action of gravity to the position shown in Fig. 42 to effect contact of the cop-tube C with the periphery of the drive-roll 10.

During the resetting of the sizing-members 190 and 185 in the manner explained above the arm 200 of the member 190 will be swung downwardly to the position shown in Fig. 42 to remove its wedge-shaped end, see Fig. 40, from engagement with the abutments 69 and 75 of the rotating collar 68 and sleeve 74 respectively. Simultaneously with this movement of the member 190, the end of the arm 210 will engage under the cam-arm 134 of the frame-member 122 and rock the latter to the position shown in Figs. 18 and 42. The inner end of the cam-arm 134 thus will be positioned adjacent the upper end of the cam-surface 140 in the notch 139 in the clutch-shifter 78. Then as the stud 168 is revolved with the shaft 65 it will engage the cam-arm 134 as shown in Figs. 18 and 19d and force the clutch-shifter 78 toward the left. This last explained movement of the clutch-shifter 78 will release the brake-shoe 90 from the clutch-member 22 and engage the clutch-member 40 therewith to cause the drive-roll 10 to be rotated from the drive-shaft 16 at relatively high rate of speed and the cop-tube C to be driven therefrom in direction to wind the yarn-strand y thereon.

The tilting movement of the frame-member 122, explained previously, acts through the engagement of the set-screw 170 with the arm 115, see Figs. 17 and 42, to rock the frame-member 107 into position to swing the detector-element 103 downwardly. During this downward swinging movement of the detector-element 103 it will engage the lever 271 and rock the bail-wire 272 to cause its finger 275 to engage the yarn-strand y and draw it downwardly in a loop as indicated by dash lines in Fig. 3, so as to take up the slack therein. Referring to Fig. 38, when the starting-handle 206 is released the arm 210 will be rocked downwardly to release the frame-member 122 to permit it to swing back to the position shown in Fig. 15 with its cam-arm 134 engaging the side 137 of the lug 138 on the clutch-shifter 78, see Fig. 19a. The frame-member 107 thus will be released and caused to rock to the position indicated in Figs. 3 and 15 under the action of the counterweight 112. This latter movement of the frame-member 107 will swing the portion 102 of the detector-element 103 upwardly into engagement with the winding strand y and allow the bail-wire 272 to rock back to its inoperative position shown in Fig. 3.

As the winding operation is started in the manner explained above the yarn-strand y will enter into one or the other of the crossing helical grooves 11 and 12 of the rotating drive-roll 10 and caused to be traversed thereby back-and-forth longitudinally of the cop-tube C to deposit it thereon in overlying layers which build up to form the package P.

When a slub or enlargement, such as indicated at x in Figs. 52 and 61, occurs on the yarn-strand it will wedge in between the blades of the slub-catcher 250 and cause the strand to be broken. When the strand y is broken the outer end of the detector-element 103 will be released to swing upwardly under the influence of the weight 112 on the finger 111 and the frame-member 107 will be rocked to the position shown in Fig. 16. This movement of the frame-member 107 will position the wedge-shaped head 120 of the arm 116 against the periphery of the collar 68 and sleeve 74 which rotate with the drive-shaft 65, see Fig. 4. Consequently, the rotation of the shaft 65 will cause the head 120 of the arm 116 to wedge between the fixed abutment 70 and the abutment 75 carried by the slidable sleeve 74, as shown in Figs. 5 and 16, to shift the sleeve and clutch-shifter members 78 toward the right. By this action the frame-member 107 will be shifted to the right and through the engagement of its arm 115 in the slot 147 in the frame-member 122 the latter will be shifted to the position shown in Fig. 5.

As the sleeve 74, clutch-shifter 78 and frame-members 107 and 122 are moved toward the right the fork 80 on the shifter 78 will shift the clutch-member 40 to disengage it from the clutch-member 22 and disconnect the drive between the shaft 16 and drive-roll 10. Simultaneously with the de-clutching of the roll 10 from the shaft 16 the rim 97 of the stud 95 carried by the brake-lever 91, see Fig. 6, will be caused to enter the notch 100 in the stud 98 on the clutch-shifter 78 under the action of the spring 93 so as to engage the brake-shoe 90 with the periphery of the clutch-member 22 to check the rotation of the drive-roll 10. As the sleeve 74 continues its sliding movement toward the right the driving-member 85 will engage the periphery of the clutch-member 22 to rotate the drive-roll 10 in reverse direction so as to cause the package P to be rotated in unwinding direction. As the member 85 is engaged with the clutch-member 22 the movement of the clutch-shifter 78 will cause the stud 95 on the brake-lever 91 to be cammed rearwardly by the inclined side of the notch 100 so as to release the brake-shoe 90 from the member 22. When the frame-members 107 and 122 are in the position shown in Fig. 16 the finger 111 and spring-plate 131 will occupy the positions shown at 111b and 131a, respectively, in Fig. 14. As the shaft 65 continues its rotation the lug 153 on the collar 68 will strike the arm 116 of the member 107, see Fig. 12, to tilt the latter to the position indicated in Fig. 13 with the finger 111 swinging upwardly to the position indicated at 111c in Fig. 14. The frame-member 107 thus will be held in the position last described by the pawl or latch 158 engaging under the finger 111.

When the sleeve 74 is shifted toward the right its rotating abutment 75 will engage the upstanding arm 443 of the bell-crank lever 435 and rock the latter in clockwise direction to the position shown in Fig. 44. Consequently, the link 438 will be drawn upwardly to swing the valve-closure 427 to the position shown in Fig. 49 to open the valve 420 to cause vacuum to be created in the suction-hose 355 and tube 325. As the bell-crank lever 435 is actuated in this manner the detent-lever 445 will be rocked by the spring 455 in counterclockwise direction, as viewed in Fig. 43, to engage its seat or rest 451 in under the lower edge of the bell-crank, see Figs. 44 and 46, to maintain the latter elevated and the valve 420 open.

Simultaneously with the movement of the clutch-shifter 78 toward the right, see Fig. 5, the cam-edge 389 on the arm or bracket 142 carried with the clutch-shifter, see Fig. 20, will be slid in between the detent-plate 383 and the bracket 384, as shown in Fig. 23, to pry the plate downwardly and free the detent-finger 380 on the end-finder carriage 328 from the opening 382, see Fig. 22.

The operating shaft 329, as explained previously, is reciprocated and oscillated from the continuously rotating cam-drum 335. When the cam-followers or rollers 340 and 345 are engaged in the cam-grooves 342 and 346 at points as shown in Figs. 64, 65 and 66 the shaft will be positioned at the extreme limit of its right-hand traverse. In this position the shaft 329 will have been oscillated to aline its elongated opening or recess 393 with the latch pin 370 on the carriage 328 and the pin will then have been slid into the recess 393 in the shaft under the action of the spring-actuated lever 372 as shown in Fig. 22.

The complete cycle of operation of the end-finder 325, as controlled by the cam-drum 335 and shaft 329, is represented diagrammatically in Figs. 66 and 67a to 61i. When the cam-followers 340 and 345 are in the positions noted above and indicated by the line a—a in Fig. 66, the end-finder 325 will be positioned as shown in Fig. 67a. When the followers are engaged in the cam-grooves 342 and 346 at points indicated on the line b—b in Fig. 66 the end-finder will have been carried to the position illustrated in Fig. 67b; the steps in the movement of the end-finder during its complete cycle of operations being illustrated in Figs. 67a to 67i and the points of engagement of the followers 340 and 345 with the cam-grooves 342 and 346 at corresponding times being designated by the related reference characters a to i in Fig. 66.

Figure 67D:
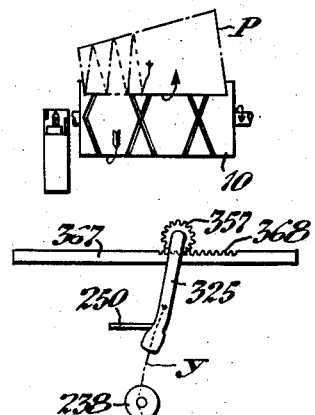

It will be observed by reference to Figs. 66 and 67a to 67i that the end-finder 325 is first moved laterally to the position shown in Fig. 67b to locate its pinion-gear 357 opposite the rack-teeth 368 on the bar 367. Axial movement of the shaft 329 will be then momentarily arrested and the shaft rocked to engage the gear-teeth of the pinion 357 with the rack-teeth 368 as shown in Figs. 35 and 67c. After the teeth of the pinion 357 are meshed with the rack-teeth 368 the shaft 329 is moved longitudinally again to carry the end-finder 325 to the position shown in Fig. 67d. During this latter movement of the shaft 329 the pinion 357 will travel along the rack-teeth 368 and be rotated to cause the end-finder 325 to swing on the axis of the pinion to position it as shown in Fig. 67d.

As the end-finder 325 is swung downwardly and forwardly from the position shown in Fig. 67c to that shown in Fig. 67d the ear 501 on the side of its mouth or nozzle 326, see Figs. 1 and 63, will engage the lever 307 to rock the detent-lever 298 to the position shown by dash-lines in Fig. 62 so as to release the finger 283 on the shaft 280 and allow the arm 290 and detector-fingers 288 mounted on the shaft to rock downwardly to the position shown in Figs. 52 and 58. The detector-fingers 288 will thus be caused to engage the broken yarn-strand y which extends across the openings 245 in the detector-plate 244 to prevent the fingers from dropping through the openings. The cam-groove 342 in the drum 335 is provided with a straight portion or dwell shown at 502 in Fig. 66 to cause the end-finder 325 to halt momentarily during its swinging movement while the detector-fingers 288 are dropping. As the end-finder 325 continues its downward swinging movement its nozzle 326 will engage the arm 314 of the resetting-frame 213 and rock the latter on the shaft 280 to the position shown in Fig. 53. The ear 317 on the frame 312 thus will be engaged with the arm 290 of the detector-frame 285 to restore the latter to its initial position with its fingers 288 elevated above the yarn-strand y as shown in Fig. 51. As the resetting-frame 312 is rocked upwardly in this manner its hook-shaped leg 319, see Fig. 55, will engage the rim of the upper tension-disk 238 and lift the latter as shown in Fig. 53 to relieve the tension on the strand. At the same time the cam 320 on the ear 313 of the frame 312, see Fig. 61, will engage the abutment 321 on the member 252 and rock the upper blade 247 of the slub-catcher 250 upwardly to enable the end-finder to withdraw the end of the yarn y from the slub-catcher and into its nozzle 326. During the movement of the end-finder 325 to the position shown by dash-lines in Fig. 53 it will engage the arm 314 of the resetting-frame 372 and swing it upwardly to raise its arm 315 and position the yarn-strand y closely adjacent the end of the nozzle 326 to insure that it will be positively retrieved thereby. It will be noted by reference to Fig. 66 that the cam-groove 342 is provided with a second straight portion or dwell 506 so that the end-finder 325 will be caused to remain in the position shown in Figs. 53 and 67d for a short period to enable it to draw a length of the yarn-strand y into its nozzle. As the end-finder next is moved into position at the side of the slub-catcher 250 it will draw any lint and foreign matter into its suction-tube 325 and thus function to maintain the slub-catcher and and detector-fingers clean.

Figure 67E:
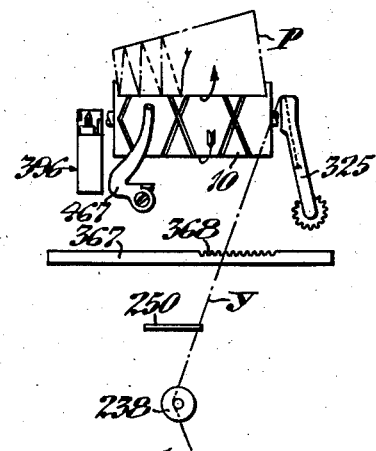

At this juncture the motions of the end-finder will be reversed by the cam-grooves 342 and 346 to cause it to be rocked upwardly and returned to its initial position adjacent the right-hand bearing-bracket 5 as shown in Fig. 67e. As the end-finder 325 swings upwardly from the position indicated by dash-lines in Fig. 53 the resetting-frame 312 will be released to allow it to swing downwardly until one of its ears 313 engages against the stop-screw 311 in the frame 231, as shown in Fig. 57. In this manner the tension-disk 239 and slub-catcher blade 247 will be released to return to operative position. It will be observed by reference to Fig. 67e that the end-finder 325 is swung upwardly by the shaft 329, see Fig. 20, to carry its nozzle rearwardly to position it substantially in alinement with the periphery of the package P. The shaft 329 next will be slid longitudinally under the action of the cam-groove 342 to traverse the end-finder nozzle 326 along the periphery of the unwinding package P toward the left-hand end thereof. As the nozzle 326 rides along the surface of the package P it will be held thereagainst by suction and caused to retrieve the broken end of the strand thereon and draw a length thereof into the tube 325.

During the movement of the end-finder 325 toward the knotter 396 the pin or follower 165 on the carriage 328, see Fig. 13, will engage the cam-arm 125 and rock the frame-member 122 to the position shown in Fig. 17. Consequently, the set-screw 170 on the frame 122, see Fig. 38, will engage with the arm 115 of the frame 107 to rock the latter to the position shown in Fig. 17. This rocking movement of the frame-member 122 will swing the finger 130 upwardly to position its detent-plate 131 above the ear 162 on the bracket 155 as shown at 131b in Fig. 14. As the frame-member 122 is rocked the cam-arm 134 at its right-hand end will be swung upwardly to the position shown in Figs. 18 and 19b so that the stud 168 revolving with the shaft 65 will engage the end of the arm and force it into the notch 139 in the side of the lug 138 on the clutch-shifter 78, see Fig. 19c. The clutch-shifter 78 thus will be slid toward the left to the position shown in Fig. 18. In this manner the fork 80 on the clutch-shifter 78 will act to disengage the clutch-member 85 from the clutch-member 22 and release the brake-shoe 90 to cause it to engage the member 22 to check the rotation of the drive-roll 10 and the package P driven thereby. The frame-member 122 will be prevented from rocking downwardly by the engagement of its detent-plate 131 with the ear 162 on the bracket 155, see Figs. 14 and 17.

Figure 67F:
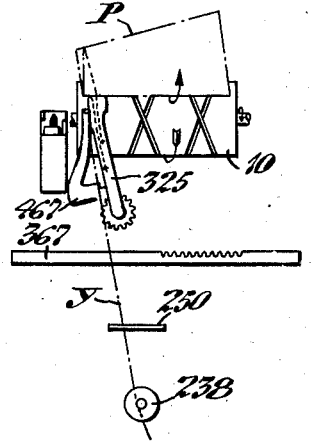
Figure 67G:
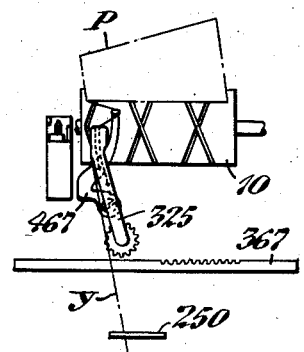
Figure 67H:
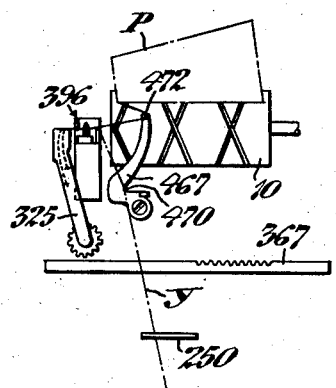

As the end-finder 325 arrives in position adjacent the left-hand end of the package P its nozzle will engage the member 467 and rock it to the position shown in Figs. 32 and 67f. Subsequently, the shaft 329, see Fig. 65, will be rocked by the lever 343 under the action of the follower 345 in the groove 346 in the cam 335 to swing the end-finder 325 outwardly to the position shown in Figs. 33 and 67g to cause it to release the member 467. The spring 476, see Fig. 31, then will swing the member 467 on its pivot to engage its finger 472 with the length of yarn-strand y leading from the package P to the nozzle 326 as shown in Fig. 33, so as to prevent the strand from being drawn across the end of the package. Thereafter, the shaft 329 will be slid longitudinally to carry the end-finder nozzle 326 beyond the knotter 396 to the position shown in Fig. 67h so as to draw the two ends of the yarn-strand through the tension-plates 403 of the knotter. The end-finder nozzle 326 thus will function as a vacuum- or suction-cleaner for removing lint and other foreign matter from the parts of the knotter. As the end-finder approaches the position shown in Fig. 67h the abutment 404 on the carriage 328 will engage the tailpiece 402 of the gear-segment 400 as shown in Fig. 36 and swing it downwardly into the recess 406 in the shaft 329. At the same time the detent-finger 380 on the carriage 328 will be rocked on its pivot 373 to the position shown in Fig. 37 by its engagement with the curved plate or abutment 407 on the left-hand bracket 5. The end of the latch-pin 370 thus will be withdrawn from the opening 393 and transferred to the keyway 391 in the shaft 329 as the latter continues its movement to the left.

Figure 67I:
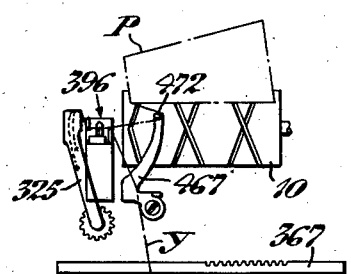

The shaft 329 next will be rocked by the action of the cam-groove 346 and due to the engagement of the latch-pin 370 in the keyway 391 the end-finder 325 will be moved rearwardly thereby to draw the yarn-strands through the guides and tensioning means of the knotter 396, see Figs. 34 and 67i. During this last-mentioned rocking motion of the end-finder 325 the lug 410 on the carriage 328, see Figs. 27 and 28, will be rocked into position at the side of the curved retainer-plate 408 on the bracket 5. After the end-finder 325 has moved to the position shown in Fig. 67i the shaft 329 will continue its movement longitudinally toward the left and through the engagement of the tailpiece 402 in the recess 406 of the shaft the gear-segment 400 will be rocked on the stud 401 to the position shown in Fig. 37.

As a result, the pinion-gear 399 and shaft 398 will be rotated so as to cause the tying-bill 397 to join the ends of the yarn-strand together and the severing means to snip off the ends of the strand adjacent the knot.

At this juncture the direction of movement of the carriage 328 and end-finder 325, controlled by the cam-grooves 342 and 346 and the shaft 329, is reversed. It will be understood by reference to Fig. 66 that the parts of the knot-tying mechanism will be reset to first position by the initial sliding movement of the shaft 329 toward the right.

During the first part of the sliding movement of the shaft 329 in this direction the lug 410 on the carriage 328 engages with the projection 409 on the retainer-plate 408 so as to prevent the carriage from moving with the shaft. However, when the shaft 329 has been slid into position to aline its opening 393 with the end of the spring-pressed latch-pin 370 and the latter has been projected thereinto, the shaft will be rocked to disengage the lug 410 from the side of the projection 409. In this way the carriage 328 will be released to permit it to move with the shaft 329 during the return stroke of the latter toward the right-hand side of the winding unit. The carriage 328 thus will be recoupled to the shaft 329 and when the latter is rocked in the manner explained above the end-finder nozzle 326 will be moved forward from the position shown in Fig. 67i to that indicated in Fig. 67h. During this last-mentioned rocking motion of the end-finder 325 the bunter 458 on the carriage 328, see Figs. 44 and 45, will be carried against the end of the finger 453 mounted on the detent-lever 445 to rock the latter and move its seat or rest 451 laterally from the position shown in Fig. 46 to that indicated in Fig. 47. Consequently, the bell-crank lever 435 will be released and under the action of the spring 442 the link 438 will swing the valve-closure 427 to the position illustrated in Fig. 48 to close the valve and shut off the suction in the hose 355 and end-finder 325.

During the traverse of the end-finder 325 toward the knotter in the manner explained first the anti-stitch member or hook 480 will be carried to the position indicated by heavy dash-lines in Fig. 30 and the strand leading from the slub-catcher 250 to the end-finder nozzle 326 will slide over its curved end 482 and into the notch 490 thereof. The edge of the plate 359 on the carriage 328, see Fig. 26, then will engage with the left-hand finger 497 on the slide 493 to shift the latter toward the left to move its depending leg 500, see Figs. 29 and 30, in the same direction to overlie the detector-member 103 and prevent it from rising. Consequently, the frame-member 107 is prevented from tilting rearwardly to actuate the clutch-shifting mechanism. On the other hand, when the end-finder 325 is moved toward the right the yarn-strand will be engaged by the shoulder 483 on the hook 480 and drawn toward the center of the winding unit to the position indicated by the dot-and-dash line in Fig. 30 so as to adapt the strand to be entered into the traverse grooves 11 or 12 in the drive-roll 10; these grooves not being shown in Figs. 30 to 34 as such showing would tend to confuse the drawings.

As the end-finder 325 approaches the end of its traverse toward the right the operating-pin or follower 165 on the carriage 328, see Fig. 20, will engage the cam-arm 150 on the frame-member 122 and rock the latter to the position shown in Fig. 18. The end of the arm 134 at the right-hand end of the member 122 thus will be carried upwardly along the cam-surface 140 of the notch 139 in the member 78 and when the stud 168 revolves into position to engage the cam-edge 136 of the arm, see Fig. 12, the arm is shifted toward the left to the position shown in Figs. 18 and 19d. The fork 80 on the clutch-shifter 78 thus will shift the clutch-member 40 into engagement with the clutch-member 22 and, concurrently, the brake-shoe 90 will be released therefrom, see Figs. 4 and 6. The drive-roll 10 and package P will then be driven from the driveshaft 16 in winding direction at a high rate of speed to cause the yarn-strand to be wound on the package. As the frame-member 122 is rocked and shifted laterally in the manner explained above it will act through the set-screw 170 and slot 147, see Fig. 16, to rock and then shift the frame-member 107 to the position shown in Fig. 18. The detector-member 103 will be rocked downwardly by the frame-member 107 to engage the lever 271 and depress the bail-wire 272 to cause its finger 275 to engage the yarn-strand and move it downwardly along the upright portion 259 of the guide-wire 258 to the position indicated by dash-lines in Fig. 3 so as to take up the slack in the strand. Due to the tension applied to the yarn as it passes around the vertical guide 259 and through the anti-stitch hook 480 to the winding package P, when the strand reaches the lower end of the guide it will be caused to slide laterally under the wire 258 and into place between the edges of the blades 247 and 248 of the slub-catcher 250 as shown in Figs. 55 and 60. After the yarn-strand is positioned in the slub-catcher 250 in the manner explained above the curved flange 484 of the anti-stitch hook 480, see Fig. 30, will move in under the flange or shelf 489 on the bracket 488 to cam the hook downwardly to the position shown in Fig. 29 so as to release the yarn leading to the package P. When the parts are in the relationship last explained the detector-member 103 will be prevented from swinging upwardly again to initial operative position by its engagement with the depending leg 500 of the slide 493 as shown in Fig. 30. Concurrently, the plate 131 carried by the spring 130 on the frame-member 122, see Fig. 18, will be in the position indicated at 131c in Fig. 14 so that when the pin 165 rides off from the cam-arm 150 the frame-member will be permitted to tilt rearwardly to return to the position indicated in Fig. 15 with the plate passing through the opening 164 in the bracket 155.

The shifting movement of the frame-member 122 toward the left will remove the arm 388 from engagement with the detent-plate 383 to allow the latter to spring upwardly to the position shown in Fig. 21. The end of the detent-finger 380 thus will be positioned to ride along the inclined portion 386 of the plate 383 to adapt it to snap into the opening 382 in the plate. When the sliding movement of the shaft 329 is reversed to cause it to move toward the left the detent-finger 380 will engage the edge of the opening 382 to rock the lever 372 to the position shown in Fig. 21 to remove the end of the latch-pin 370 from the recess 393 and keyway 391 in the shaft so as to uncouple the carriage 328 therefrom. As the carriage 328 is returned to its inoperative position at the right the finger 498 on the slide 493 will be engaged by the plate 359, see Fig. 25, to shift the slide and its leg 500 toward the right to release the detector-member 103, see Fig. 29. The frame-member 107 will thus be allowed to tilt rearwardly to its initial position shown in Fig. 15 so that the detector-member will engage the feeding yarn-strand y, see also Fig. 3.

When the supply of the winding yarn-strand y becomes exhausted the various mechanisms will operate in a manner similar to that explained above. When the detector-element 103 detects exhaustion of the supply it will act to set the end-finder 325 in motion to cause it to swing down into position adjacent the slub-catcher, see Fig. 67d. As the nozzle 326 of the end-finder 325 swings into this position it will actuate the lever 307, see Figs. 52 and 63, to unlatch the shaft 280 and the detector-frame 285 will then tilt downwardly. Due to the absence of any yarn-strand lying across the detector-plate 244 the detector-fingers 288 will drop through the openings 245 in the plate to the position shown in Figs. 54 and 59. As the detector-frame 285 is released its arm 290 which supports the end of the reserve strand y' will drop to the position indicated by dash-lines in Fig. 56 to carry the strand into position to be picked up by the end-finder nozzle 326, see Fig. 54. As the end-finder 325 completes its swinging movement toward the device 230 it will engage the arm 314 of the resetting-frame 312 to rock the latter to the position shown in Fig. 53 to reset the parts with the arm 290 held in raised position by the engagement of the finger 283 with the latch 301, see Fig. 62. The operator may then remove the empty supply-bobbin s from the holder 225 and replace it with a full bobbin, after which the strand from the latter is drawn upwardly and attached to the transfer-arm 290 to serve as a reserve in the manner explained previously.

The winding operation continues in the manner explained above until the winding package P reaches a predetermined size, at which time the sizing-member 185 will ride off from the knock-off member 190, see Figs. 38 and 39. The member 190 then will be rocked to the position shown by full lines in Fig. 39 to cause its end 200 to to engage between the abutments 69 and 75 on the collar 68 and sleeve 74, see Fig. 40. The rotation of the shaft 65 thus will cause the sleeve 74 to be shifted to move the clutch-shifter 78 so as to disengage the clutch-member 46 from the clutch-member 22 and concurrently therewith the brake-shoe 90 will be applied thereto to arrest the winding operation. Arrestment of the winding operation while the yarn-strand remains unbroken will indicate to the operator that the package is completed. The operator may then swing the arm 14 upwardly to the position shown in Fig. 41 to remove the full package P from the cop-holder 6 and thereafter place an empty cop-tube C thereon. The yarn-strand then is attached to the tube C and the winding operation restarted by depressing the starting-handle 206 in the manner explained previously. The present sizing device thus is an improvement over those of previous machines of similar type in which the package upon attaining its predetermined size is raised automatically from the driving drum which continues to rotate. In machines in which the package is disengaged from the driving drum to arrest the winding operation, the yarn-strand is liable to be broken by the moving parts of the mechanism and the operator, thinking that the stopping is due to breakage of the yarn, sometimes ties the ends of the strand together and restarts the winding operation. Consequently, short lengths or "ends" of the yarn may be wound into the package before it is observed that the package has reached the required size. With the present sizing device there is no danger of the yarn breaking since the drive-roll remains at rest and therefore the winding of short lengths of yarn into the package is avoided.

It will be observed from the foregoing specification that the present invention provides an automatic winding machine adapted to wind cops, cones and other forms of packages at a high rate of production. It is to be particularly noted that in the present improved winder the mechanisms of each winding unit are operated individually from a shaft and cam common to all the units whereby to simplify the machine by reducing the number of its parts to a minimum. By providing an end-finder and knot-tying device at each winding unit no time is lost in conveying or transferring these devices to a particular winding unit, or in other cases conveying the different winding units to a single end-finder and knotter, so that a maximum rate of production of the machine can be maintained.

It will be observed further that by the present improvement means are provided for detecting exhaustion of the yarn supply and transferring a reserve supply-strand into position to be retrieved automatically by the end-finder. The winding units are thus adapted for continuous automatic operation until the packages reach their predetermined size and no time is lost in manually tying up reserve supply strands.

It will be observed still further that the present invention provides means for automatically arresting the winding operation when the strand is broken or its supply is exhausted by first stopping the rotation of the driving-drum or roll to arrest the rotation of the package and subsequently reversing the direction of rotation of the package to enable the end-finder to retrieve and unwind the end of the strand from the package. Through this provision a single drive-roll serves as the means for rotating the package in both winding and unwinding direction. This provision constitutes an important improvement over machines previously in use in which the package is shifted from one driving-drum to another to reverse its direction of rotation and thus in the present machine the danger of injuring the yarn or damaging the package is avoided.

While the invention is herein shown and described as embodied in a preferred form of construction, by way of example, it is to be understood that modifications may be made in the structure and arrangement of the mechanism without departing from the spirit or scope of the invention. Therefore, without limiting myself in this respect, I claim:

1. In a winding machine, means for supporting a package for rotation, driving means for rotating the package in one direction to wind yarn thereon, a second driving means for rotating the package in the opposite direction to unwind the yarn therefrom, and clutch-means for disconnecting one of the driving means to arrest the rotation of the package and connecting the other driving means to rotate the package in the opposite direction to unwind the yarn therefrom.

2. In a winding machine, means for supporting a package for rotation, means for rotating the package, high-speed means for driving the package-rotating means to rotate the package in one direction to wind yarn thereon, low-speed means for driving the package-rotating means to rotate the package in the opposite direction to unwind the yarn therefrom, and means for disconnecting one of the driving means from the package-rotating means and connecting the other driving means thereto to rotate the package.

3. In a winding machine, means for supporting a package for rotation, means for rotating the package in one direction, means for rotating the package in the opposite direction, clutch-means for connecting one of the driving means to rotate the package and disconnecting the other driving means therefrom, and means operative upon breakage of the yarn or exhaustion of its supply for operating the clutch-means.

4. In a winding machine, means for supporting a package for rotation, a drive-roll for rotating the package by peripheral contact therewith to wind yarn thereon, said drive-roll having means for traversing the yarn on the package during its rotation, two separate continuously-operating driving means for rotating the drive-roll in opposite directions, and means for connecting the drive-roll to either one of the driving means and disconnecting it from the other alternate driving means.

5. In a winding machine, means for supporting a package for rotation, a drive-roll for rotating the package by peripheral contact therewith to wind yarn thereon, said drive-roll having means for traversing the yarn on the package during its rotation, continuously-operating driving means, means for connecting the drive-roll to the driving means, and means operative upon breakage of the yarn or exhaustion of its supply for actuating the last-named means to disconnect the drive-roll from the driving means.

6. In a winding machine, means for supporting a package for rotation, a drive-roll for rotating the package by peripheral contact therewith to wind yarn thereon, said drive-roll having means for traversing the yarn on the package during its rotation, continuously-operating driving means, a clutch connecting the drive-roll to the driving means, a brake for stopping the drive-roll, and means operative upon breakage of the yarn or exhaustion of its supply to operate the clutch to disconnect the drive-roll from the driving means and apply the brake.

7. In a winding machine, means for supporting a package for rotation, a drive-shaft, a drive-roll mounted for rotation independently of the drive-shaft and having a clutch-face thereon, said drive-roll being adapted to rotate the package by peripheral contact therewith, a clutch-member rotatable by the drive-shaft and engageable with the clutch-face on the drive-roll, and means for operating the clutch-member to engage it with or disengage it from the clutch-face on the drive-roll.

8. In a winding machine, means for supporting a package for rotation, a drive-shaft, a drive-roll mounted for rotation independently of the drive-shaft, said drive-roll being adapted to rotate the package by peripheral contact therewith, a clutch-member rotatable by the drive-shaft and engageable with the drive-roll, means for operating the clutch-member to engage it with the drive-roll or disengage it therefrom, and centrifugally-operated means for positively connecting the clutch-member and drive-roll for rotation as a unit when the drive-roll attains a predetermined speed.

9. In a winding machine, means for supporting a package for rotation, a drive-roll for rotating the package by peripheral contact therewith, means for driving the drive-roll to rotate the package in one direction to wind yarn thereon, means for driving the drive-roll to rotate the package in the opposite direction to unwind the yarn therefrom, and means for disconnecting one of the driving means from the drive-roll and connecting the other driving means therewith.

10. In a winding machine, means for supporting a package, a drive-roll for rotating the package by peripheral contact therewith, means for driving the drive-roll at high speed to rotate the package in one direction to wind yarn thereon, means for driving the drive-roll at less speed to rotate the package in the opposite direction to unwind the yarn therefrom, and means for disconnecting the high-speed driving means from the drive-roll and connecting the low-speed driving means therewith.

11. In a winding machine, means for supporting a package for rotation, a drive-roll for rotating the package by peripheral contact therewith, driving means for rotating the drive-roll at high speed in one direction to wind yarn on the package, driving means for rotating the drive-roll at less speed in the opposite direction to unwind the yarn from the package, and means operative upon breakage of the yarn or exhaustion of the supply to disconnect the high-speed driving means from the drive-roll and connect the low-speed driving means therewith.

12. In a winding machine, means for supporting a package for rotation, a drive-shaft, a drive-roll mounted for rotation on the drive-shaft, said drive-roll being adapted to rotate the package by peripheral contact therewith, a clutch-member keyed to the drive-shaft and engageable with the drive-roll, a second drive-shaft, a clutch-member on the second shaft engageable with the drive-roll, and means for simultaneously shifting the clutch-members to disengage one from the drive-roll and engage the other therewith.

13. In a winding machine, means for supporting a package for rotation, a high-speed drive-shaft, a drive-roll mounted for relative rotation on the drive-shaft and having a clutch-flange at one end thereof, said drive-roll being adapted to rotate the package by peripheral contact therewith, a clutch-member keyed to the drive-shaft and having a friction face engageable with the clutch-flange on the drive-roll for connecting the drive-roll and shaft for rotation as a unit, a low-speed shaft, a second clutch-member keyed to the low-speed shaft and having a peripheral face for driving engagement with the flange on the drive-roll, and means for simultaneously shifting the clutch-members to disconnect the high-speed shaft from the drive-roll and connect the low-speed shaft therewith.

14. In a winding machine, means for supporting a package for rotation, a drive-shaft, a drive-roll mounted for relative rotation on the drive-shaft and having a clutch-flange thereon, said drive-roll being adapted to rotate the package by peripheral contact therewith, a clutch-member keyed to the drive-shaft and engageable with the clutch-flange on the drive-roll, a second drive-shaft adjacent the first-mentioned drive-shaft, a clutch-member on the second shaft engageable with the clutch-flange on the drive-roll, and means operative upon breakage of the yarn or exhaustion of its supply for simultaneously shifting the clutch-members to disengage the first-mentioned clutch-member from the clutch-flange on the drive-roll and engage the second-mentioned clutch-member therewith.

15. In a winding machine, means for supporting a package for rotation, a drive-shaft, a drive-roll mounted for relative rotation on the drive-shaft, said drive-roll being adapted to rotate the package by peripheral contact therewith, a clutch-member driven by the drive-shaft and engageable with the drive-roll, a second drive-shaft, a clutch-member driven from the second shaft and engageable with the drive-roll, a brake, and means for simultaneously shifting the clutch-members to disengage the first-mentioned clutch-member from the drive-roll and apply the brake and to thereafter release the brake and engage the second-mentioned clutch-member with the drive-roll.

16. In a winding machine, means for supporting a package for rotation, a high-speed drive-shaft, a drive-roll mounted for relative rotation on the drive-shaft and having a clutch-flange at one end thereof, said drive-roll being adapted to rotate the package by peripheral contact therewith, a clutch-member keyed to the drive-shaft and having a friction face engageable with the clutch-flange on the drive-roll for connecting the drive-roll and shaft for rotation as a unit, a low-speed drive-shaft, a second clutch-member keyed to the low-speed shaft and having a clutch-face for driving engagement with the flange on the drive-roll, and a cam operative upon breakage of the yarn or exhaustion of its supply for simultaneously shifting the clutch-members to disconnect the high-speed drive-shaft from the drive-roll and connect the low-speed shaft therewith.

17. In a winding machine, means for supporting a package for rotation, a drive-shaft, a drive-roll mounted for rotation independently of the drive-shaft, said drive-roll being adapted to rotate the package by peripheral contact therewith, a clutch-member driven from said drive-shaft and engageable with the drive-roll, a second drive-shaft, a second clutch-member driven from the second shaft and engageable with the drive-roll, means for operating the clutch-members, a detector maintained in one position by the feeding yarn and movable to another position upon breakage of the yarn or exhaustion of its supply, and a cam operated by the movement of the detector for shifting the clutch-members to disconnect one drive-shaft from the drive-roll and connect the other drive-shaft therewith.

18. In a winding machine, means for supporting a package for rotation, a drive-roll for rotating the package by peripheral contact therewith to wind yarn thereon, said drive-roll having means for traversing the yarn on the package during its rotation, continuously-operating driving means, a shiftable clutch-member for connecting the drive-roll with the driving means and disconnecting it therefrom, and stopping means responsive to the growth of the package being wound for operating the clutch-member to disconnect the drive-roll from the driving means when the package attains a predetermined size.

19. In a winding machine, means for supporting a package for rotation, a drive-roll for rotating the package by peripheral contact therewith to wind yarn thereon, said drive-roll having means for traversing the yarn on the package during its rotation, continuously-operating driving means, a shiftable clutch-member for connecting the drive-roll with the driving means and disconnecting it therefrom, said package-supporting means being movable away from the drive-roll during the winding, and means releasable by the package-supporting means when the package attains a predetermined size for operating the clutch-member to disconnect the drive-roll from the driving means.

20. In a winding machine, means for supporting a package for rotation, a drive-roll for rotating the package by peripheral contact therewith to wind yarn thereon, continuously-operating driving means, a shiftable clutch-member for connecting the drive-roll with the driving means and disconnecting it therefrom, stopping means responsive to the growth of the package being wound for operating the clutch-member to disconnect the drive-roll from the driving means when the package attains a predetermined size, and manually-operable starting means for resetting the stopping means and operating the clutch-member to connect the drive-roll with the driving means.

21. In a winding machine, means for supporting a package for rotation, a drive-roll for rotating the package by peripheral contact therewith to wind yarn thereon, continuously-operating driving means for rotating the drive-roll at high speed in one direction, continuously-operating driving means for rotating the drive-roll at low speed in the opposite direction, clutch-means cooperating with the drive-roll, means for shifting the clutch-means to disconnect one of the driving means from the drive-roll and connect the other driving means therewith, and means responsive to the growth of the package being wound for operating the clutch-means to disconnect the drive-roll from both the high-speed and low-speed driving means when the package attains a predetermined size.

22. In a winding machine, means for supporting a package for rotation, means for winding yarn on the package, end-finding means adjacent the package, and means for moving the end-finding means toward the package, traversing it lengthwise thereof to retrieve the end of the yarn-strand thereon and thereafter returning it to initial position.

23. In a winding machine, means for supporting a package for rotation, means for winding yarn on the package, a suction-tube adjacent the package having a nozzle at its end, and means for moving the suction-tube toward the package to position its nozzle against the periphery thereof, traversing it lengthwise of the package to retrieve the end of the yarn-strand thereon and thereafter retwining the suction-tube to initial position.

24. In a winding machine, means for supporting a package for rotation, means for rotating the package in one direction to wind yarn thereon, means for rotating the package in the opposite direction to unwind the yarn therefrom, end-finding means adjacent the package, means for moving the end-finding means toward the periphery of the package, traversing it lengthwise thereof while the package is being rotated in unwinding direction to retrieve the end of the yarn-strand thereon and thereafter retwining the end-finding means to initial position.

25. In a winding machine, means for supporting a package for rotation, means for winding yarn on the package, a knotter, end-finding means, and means for moving the end-finding means toward the package, traversing it lengthwise thereof to retrieve the end of the yarn-strand and position the retrieved end in the knotter and thereafter returning the end-finding means to its initial position.

26. In a winding machine, means for supporting a package for rotation, means for winding yarn on the package, a knotter adjacent one end of the package, a suction-tube adjacent the opposite end of the package and having a nozzle at its end, and means for moving the suction-tube toward the package, traversing it lengthwise thereof to retrieve the end of the yarn-strand and position the retrieved end in the knotter and thereafter returning the suction-tube to its initial position.

27. In a winding machine, means for supporting a package for rotation, means for rotating the package in one direction to wind yarn thereon, means for rotating the package in the opposite direction to unwind the yarn therefrom, a knotter adjacent one end of the package, a suction-tube adjacent the opposite end of the package and having a nozzle at its end, means for moving the suction-tube toward the package to position its nozzle against the periphery thereof, and means for traversing the suction-tube longitudinally of the package to retrieve the end of the yarn-strand while the package is rotated in an unwinding direction and thereafter positioning the end in the knotter.

28. In a winding machine, means for supporting a package for rotation, means for winding yarn on the package, end-finding means, a cam for operating the end-finding means to move it toward the periphery of the package, and a second cam for operating the end-finding means to traverse it longitudinally of the package to retrieve the end of the yarn-strand thereon.

29. In a winding machine, means for supporting a package for rotation, means for rotating the package to wind yarn thereon, end-finding means, means for moving the end-finding means toward the package and traversing it lengthwise thereof to retrieve the end of the yarn-strand, and means operative upon breakage of the yarn or exhaustion of its supply for arresting operation of the package-rotating means and actuating the operating means for the end-finding means.

30. In a winding machine, means for supporting a package for rotation, means for winding yarn on the package, means between the yarn supply and package-supporting means for guiding a yarn-strand to the package, end-finding means, and means for moving the end-finding means toward the guiding means to retrieve the end of the yarn-strand guided thereby.

31. In a winding machine, means for supporting a package for rotation, means for winding yarn thereon, means for guiding a yarn-strand feeding to the package, a knotter, end-finding means, and means for moving the end-finding means toward the guiding means to retrieve the end of the yarn-strand guided thereby and to thereafter move the end-finding means to position the end in the knotter.

32. In a winding machine, means for supporting a package for rortation, means for winding yarn on the package, means for guiding a yarn-strand feeding to the package, a knotter, a suction-tube having a nozzle at its end, and means for moving the suction-tube to engage its nozzle with the yarn-strand in the guiding means to retrieve the end thereof and thereafter position the yarn-strand in the knotter.

33. In a winding machine, means for rotating a package to wind yarn thereon, means for guiding a yarn-strand feeding to the package, a knotter, end-finding means movable longitudinally of the package and rotatable in the plane of its longitudinal movement, and means for operating the end-finding means to cause it to rotate as it is moved longitudinally to engage the yarn-strand in the guiding means to retrieve the end thereof and position said end in the knotter.

34. In a winding machine, means for rotating a package to wind yarn thereon, means for guiding a yarn supply strand feeding to the winding package, end-finding means movable toward the guiding means for the yarn supply strand to retrieve the end thereof, said package-rotating means normally being operative to wind yarn on the package and said end-finding means normally being inoperative, and means operative upon breakage or exhaustion of the yarn supply strand for arresting operation of the package-rotating means and initiating operation of the end-finding means.

35. In a winding machine, means for rotating a package to wind yarn thereon, means for guiding a yarn supply strand feeding to the package, a single end-finding member, and means for operating the end-finding member to cause it to move toward the guiding means to find the end of the yarn supply strand and to move toward the package to retrieve the end of the strand on the winding package.

36. In a winding machine, means for supporting a package for rotation, means for rotating the package in one direction to wind yarn thereon, means for rotating the package in the opposite direction to unwind the yarn therefrom, means for guiding a yarn supply strand feeding to the package being wound, end-finding means, and means for operating the end-finding means to move it toward the guiding means to retrieve the end of the yarn supply strand and thereafter to traverse the package while the latter is rotated in an unwinding direction to retrieve the end of the strand on the package.

37. In a winding machine, means for rotating a package to wind yarn thereon, means for guiding a yarn supply strand feeding to the package being wound, a knotter, end-finding means, and means for operating the end-finding means to move it toward the guiding means for the yarn supply strand to retrieve the end thereof and to cause it to traverse the winding package to retrieve the end of the strand thereon and to thereafter move it to position the retrieved ends in the knotter.

38. In a winding machine, means for rotating a package to wind yarn thereon, means for guiding a yarn supply strand feeding to the package being wound, a knotter, movable end-finding means for retrieving the end of the yarn supply strand and the end on the package and positioning said ends in the knotter, means for traversing the end-finding means longitudinally of the package, means for engaging it with the yarn supply strand, means for positioning the end-finding means at the knotter, and means operating simultaneously with the last-named means for moving the end-finding means laterally with respect to the package.

39. In a winding machine, means for rotating a package to wind yarn thereon, means for supporting a yarn supply package, a slub-catcher between the supply package and the package being wound acting when closed to guide the yarn-strand feeding to the winding package and adapted to be opened to release the strand, said slub-catcher being adapted to break the strand upon occurrence of a slub or enlargement thereon, end-finding means movable toward the slub-catcher to retrieve the end held therein, means operative upon breakage of the yarn or exhaustion of its supply to arrest the operation of the package-rotating means and initiate operation of the end-finding means, and means for opening the slub-catcher to release the yarn-strand during the operation of the end-finding means.

40. In a winding machine, means for rotating a package to wind yarn thereon, means for supporting a yarn supply package, a slub-catcher between the supply package and the package being wound and adapted to be opened to release the yarn-strand, said slub-catcher when closed being adapted to break the strand upon occurrence of a slub or enlargement thereon, a tension-device between the supply package and the package being wound for applying tension to the feeding yarn-strand, said slub-catcher and tension-device being adapted to guide the feeding yarn-strand, end-finding means movable toward the slub-catcher to retrieve the end of a broken strand held therein, means operative upon breakage of the yarn or exhaustion of its supply for arresting operation of the package-rotating means and initiating operation of the end-finding means, and means for opening the slub-catcher and tension-device to release the yarn-strand during operation of the end-finding means.

41. In a winding machine, means for supporting a package for rotation, a drive-roll for rotating the package by peripheral contact therewith to wind yarn thereon, driving means, clutch-means for connecting the drive-roll to the driving means and disconnecting it therefrom, a knotter, end-finding means for retrieving the end of a supply yarn-strand and the end of the strand on the package and positioning said ends in the knotter, means for operating the knotter to unite said ends, means operative upon breakage of the yarn or exhaustion of its supply for operating the clutch-means to arrest the winding operation and initiate operation of the end-finding means, and means operative after the ends of the yarn-strands have been united by the knotter for operating the clutch to connect the drive-roll to the driving means.

42. In a winding machine, means for supporting a package for rotation, a drive-roll for rotating the package by peripheral contact therewith, means for driving the drive-roll to rotate the package in one direction to wind yarn thereon, means for driving the drive-roll to rotate the package in the opposite direction to unwind the yarn therefrom, clutch-means for disconnecting one of the driving means from the drive-roll and connecting the other driving means therewith, a knotter, end-finding means for retrieving the end of the supply strand and the end of the strand on the package and positioning the retrieved ends in the knotter, means for operating the knotter to unite said ends, means operative upon breakage of the yarn or exhaustion of its supply for operating the clutch-means to rotate the package in an unwinding direction and initiate operation of the end-finding means, and means operative after the ends of the yarn-strands have been united by the knotter for operating the clutch-means to rotate the package in winding direction and discontinue operation of the end-finding means.

43. In a winding machine, means for supporting a package for rotation, means for rotating the package to wind yarn thereon, a knotter adjacent one end of the package, end-finding means for retrieving the end of the yarn-strand on the package and the end of the supply strand, means for transferring the retrieved ends of the yarn-strand to the knotter, means for operating the knotter to unite said ends, and anti-stitch means adapted to engage the yarn-strand between the package and end-finding means to prevent the yarn from being drawn across the end of the package.

44. In a winding machine, means for supporting a package for rotation, means for rotating the package to wind yarn thereon, a knotter adjacent one end of the package, end-finding means for retrieving the end of the yarn-strand on the package and the end of the supply strand, said end-finding means acting to transfer the retrieved end of the strand to the knotter, anti-stitch means positioned between the ends of the package and adapted to engage the yarn-strand between the package and end-finding means to prevent the yarn from being drawn across the end of the package, and a second anti-stitch means for positioning the feeding yarn-strand between the ends of the package as the winding operation is started.

45. In a winding machine, means for rotating a package to wind yarn thereon, means for guiding a yarn supply strand to the package being wound, movable end-finding means for retrieving the end of the supply strand and the end of the strand on the winding package, operating means for the end-finding means normally disconnected therefrom, and means operative upon breakage of the yarn or exhaustion of its supply to connect the end-finding means with its operating means.

46. In a winding machine, means for rotating a package to wind yarn thereon, means for guiding a supply strand to the package, means adjacent the guiding means for supporting a reserve supply strand, end-finding means for retrieving the end of the first-mentioned yarn-strand when the latter is broken at the guiding means, and means operative upon exhaustion of the feeding supply strand to move the reserve strand toward the guiding means into position to be engaged by the end-finding means.

47. In a winding machine, means for rotating a package to wind yarn thereon, means between the yarn supply and the package for guiding the yarn strand to the package, a movable member adjacent the guiding means for supporting a reserve supply strand, and end-finding means for retrieving the end of the strand at the guiding means, said movable member being operative upon exhaustion of the feeding strand to shift the reserve strand toward the guiding means into position to be engaged by the end-finding means.

48. In a winding machine, means for rotating a package to wind yarn thereon, means between the yarn supply and the package for guiding the yarn-strand to the package, means adjacent the guiding means for supporting a reserve supply strand, and end-finding means for retrieving the end of a broken supply strand at the guiding means, said strand-supporting means being controlled by the feeding supply strand and movable upon exhaustion thereof to shift the reserve strand toward the guiding means into position to be retrieved by the end-finding means.

49. In a winding machine, means for rotating a package to wind yarn thereon, means for guiding a supply strand to the package, means for supporting a reserve supply strand, end-finding means for retrieving the end of a broken supply strand at the guiding means, means controlled by the feeding yarn-strand and actuated upon exhaustion thereof to move the reserve yarn-strand into position to be retrieved by the end-finding means, means for returning said last-named means to inoperative position after the reserve strand has been retrieved, and means for threading the reserve strand into the guiding means.

50. In a winding machine, means for rotating a package to wind yarn thereon, a slub-catcher for guiding the yarn supply strand to the package being wound and breaking the strand upon occurrence of a slub or enlargement thereon, means for supporting a reserve supply strand adjacent the slub-catcher, and end-finding means for retrieving the end of a strand at the slub-catcher, said reserve strand supporting means being operative upon exhaustion of the feeding yarn supply strand to move the reserve strand toward the slub-catcher to adapt it to be engaged by the end-finding means.

51. In a winding machine, means for rotating a package to wind yarn thereon, a tension-device, a slub-catcher between the tension-device and package adapted for breaking the feeding strand upon occurrence of a slub or enlargement thereon, means for supporting a reserve supply strand adjacent the feeding strand, and end-finding means for retrieving the end of the strand between the tension-device and slub-catcher, said reserve strand supporting means being controlled by the feeding strand and operative upon exhaustion thereof to move the reserve strand into position between the tension-device and slub-catcher to adapt it to be engaged by the end-finding means.

52. In a winding machine, means for rotating a package to wind yarn thereon, means between the yarn supply and the package being wound for guiding the yarn-strand to the package, means for supporting a reserve supply strand adjacent the guiding means, and end-finding means for retrieving the end of a broken strand at the guiding means and the end of the strand on the package, said reserve strand supporting means being controlled by the feeding supply strand and operative upon exhaustion thereof to move the reserve strand toward the guiding means to adapt it to be engaged by the end-finding means.

53. In a winding machine, means for rotating a package to wind yarn thereon, means between the yarn supply and the package being wound for guiding the yarn-strand to the package, means for supporting a reserve supply strand adjacent the guiding means, a knotter, end-finding means for retrieving the end of the strand at the guiding means and the end of the strand on the package and positioning said ends in the knotter, and means operative upon exhaustion of the feeding supply strand for actuating the reserve strand supporting means to position said strand at the guiding means to adapt it to be engaged by the end-finding means.

54. In a winding machine, means for rotating a package to wind yarn thereon, means between the yarn supply and the package being wound for guiding the yarn-strand to the package, means for supporting a reserve supply strand adjacent the guiding means, end-finding means for retrieving the end of the strand at the guiding means and the end of the strand on the package, said end-finding means normally being inoperative, means operative upon breakage or exhaustion of the feeding strand to initiate operation of the end-finding means, and means operative upon exhaustion of the feeding supply strand to actuate the strand-supporting means to position the reserve strand at the guiding means to adapt it to be engaged by the end-finding means.

55. In a winding machine, means for rotating a package to wind yarn thereon, means between the yarn supply and the package being wound for guiding the yarn-strand to the package, means for supporting a reserve supply strand adjacent the guiding means, a knotter, end-finding means for retrieving the end of the strand at the guiding means and the end of the strand on the package and positioning the retrieved ends in the knotter, means operative upon breakage or exhaustion of the feeding supply strand for initiating operation of the end-finding means, means operative upon exhaustion of the feeding strand for moving the reserve strand supporting means to position the reserve strand at the guiding means to adapt it to be engaged by the end-finding means, means for operating the knotter to unite the retrieved ends, and means for threading the reserve supply strand into the guiding means.

56. In a winding machine for simultaneously winding a plurality of yarn packages at separate stations, means at each station for supporting a package for rotation, means at each station for rotating the package, common driving means for the package-rotating means at the several stations operative to rotate the packages in one direction to wind yarn thereon, common driving means for the package-rotating means at the several stations operative to rotate the packages in the opposite direction to unwind the yarn therefrom, and means at each station for disconnecting one of the driving means from the package-rotating means and connecting the other driving means thereto to rotate the package at that particular station.

57. In a winding machine for simultaneously winding a plurality of yarn packages at separate stations, means at each station for supporting a package for rotation, means at each station for rotating the package high-speed driving means common to all the package-rotating means at the plurality of stations for rotating the packages in one direction to wind yarn thereon, low-speed driving means common to all the package-rotating means at the plurality of stations for rotating the packages in the opposite direction to unwind yarn therefrom, and means at each station for disconnecting one of the driving means from the package-rotating means and connecting the other driving means thereto to rotate the package at that particular station.

58. In a winding machine for simultaneously winding a plurality of yarn packages at separate stations, means at each station for supporting a package for rotation, common driving means for rotating the packages at the plurality of stations in one direction to wind yarn thereon, common driving means for rotating the packages at the plurality of stations in the opposite direction to unwind the yarn therefrom, clutch-means at each station for disconnecting one of the driving means and connecting the other driving means to rotate the package at a particular station, and means at each station operative upon breakage of the yarn or exhaustion of its supply for operating the clutch-means.

59. In a winding machine for simultaneously winding a plurality of yarn packages at separate stations, means at each station for supporting a package for rotation, a drive-roll at each station for rotating the respective package by peripheral contact therewith to wind yarn thereon, a single driving means common to all the drive-rolls for rotating the latter in one direction, a single driving means common to all the drive-rolls for rotating the latter in the opposite direction, and means at each station for disconnecting one of the driving means from the drive-roll and connecting the other driving means therewith.

60. In a winding machine for simultaneously winding a plurality of yarn packages at separate stations along the machine, means at each station for supporting a package for rotation, a drive-roll at each station for rotating the respective package by peripheral contact therewith, high-speed driving means common to all the drive-rolls for rotating the latter in one direction, low-speed driving means common to all the drive-rolls for rotating the latter in the opposite direction, and means at each station operative upon breakage of the yarn or exhaustion of its supply for disconnecting the high-speed driving means from the drive-roll and connecting the low-speed driving means thereto.

61. In a winding machine for simultaneously winding a plurality of yarn packages at separate stations, means at each station for rotating a package to wind yarn thereon, end-finding means at each station for retrieving the end of the yarn-strand on the package, operating means common to all of said end-finding means, and means operative upon breakage of the yarn or exhaustion of its supply at any particular station for connecting the respective end-finding means with the operating means.

62. In a winding machine for simultaneously winding a plurality of yarn packages at separate stations, means at each station for rotating a package to wind yarn thereon, means at each station for guiding a yarn supply strand to the package, movable end-finding means at each station for retrieving the end of the yarn supply strand and the end of the yarn-strand on the winding package, continuously-operating driving means for the plurality of end-finding means, and means operative upon breakage of the yarn or exhaustion of its supply at any particular station for connecting the respective end-finding means with the driving means.

63. In a winding machine for simultaneously winding a plurality of yarn packages at separate stations, means at each station for rotating a package to wind yarn thereon, means at each station for guiding a supply strand to the package being wound, a knotter at each station, and end-finding means at each station for retrieving the end of the yarn supply strand at the guiding means and the end of the yarn-strand on the package and positioning said ends in the knotter.

64. In a winding machine for simultaneously winding a plurality of yarn packages at separate stations, means at each station for rotating a package to wind yarn thereon, means at each station for guiding a yarn supply strand to the package, a knotter at each station, end-finding means at each station for retrieving the end of the yarn supply strand at the guiding means and the end of the yarn-strand on the package and positioning said ends in the knotter, continuously-operating driving means for the plurality of end-finding means, and means operative upon breakage of the yarn or exhaustion of its supply at any particular station for connecting the respective end-finding means with the driving means.

65. In a winding machine for simultaneously winding a plurality of yarn packages at separate stations, means at each station for rotating a package to wind yarn thereon, means at each station for guiding a supply strand to the package being wound, a knotter at each station, end-finding means at each station for retrieving the end of the yarn supply strand at the guiding means and the end of the yarn-strand on the package and positioning said ends in the knotter, and means actuated by the end-finding means to operate the knotter after the ends of the yarn-strands are positioned therein.

66. In a machine for simultaneously winding a plurality of yarn packages at separate stations, means at each station for rotating a package to wind yarn thereon, means at each station for guiding a supply strand to the package, a knotter at each station, end-finding means at each station for retrieving the end of the yarn supply strand at the guiding means and the end of the yarn-strand on the package and positioning said ends in the knotter, common operating means for the plurality of end-finding means at the different stations, and means operative upon breakage of the yarn or exhaustion of its supply at a particular station for connecting the respective end-finding means with the common operating means.

67. In a winding machine for simultaneously winding a plurality of yarn packages at separate stations, means at each station for supporting a package for rotation, means at each station for guiding a yarn supply strand to the package, means at each station for rotating the package to wind yarn thereon, means at each station for rotating the package in the opposite direction to unwind the yarn therefrom, movable end-finding means for retrieving the end of the yarn supply strand and the end of the yarn on the package, and means operative upon breakage of the yarn or exhaustion of its supply for disengaging one package-rotating means and engaging the other package-rotating means and operating the end-finding means.

68. In a winding machine for simultaneously winding a plurality of yarn packages at separate stations, means at each station for supporting a package for rotation to wind yarn thereon, means at each station for guiding a yarn supply strand to the package, means at each station for supporting a reserve yarn supply strand adjacent the guiding means, end-finding means at each station for retrieving the end of the yarn supply strand and the end of the yarn strand on the package, means at each station operative upon exhaustion of the feeding yarn supply strand for moving the reserve yarn-strand into position to be engaged by the end-finding means, common operating means for the end-finding means at the plurality of stations, and means at each station operative upon breakage of the yarn or exhaustion of its supply for connecting the respective end-finding means with the driving means.

69. In a winding machine, means for supporting a package for rotation, means for winding yarn on the package, a suction nozzle movable toward and away from the package to adapt it to retrieve the end of the yarn-strand thereon, suction means, and a flexible conduit connecting the suction means and nozzle and maintained under resilient tension to cause it to straighten when suction is applied to move the nozzle toward the package and yieldingly engage the periphery of the latter.

70. In a winding machine, means for rotating a package, means for driving the package-rotating means to rotate the package in one direction to wind yarn thereon, means for driving the package-rotating means to rotate the package in the opposite direction to unwind yarn therefrom, and means for disconnecting one of the driving means from the package-rotating means and connecting the other driving means thereto.

FRANK WILLIAM HIGGINS.